United States Patent
Genta

(10) Patent No.: US 8,838,413 B2
(45) Date of Patent: Sep. 16, 2014

(54) VALVE ACTUATOR FAULT ANALYSIS SYSTEM

(75) Inventor: Pablo Daniel Genta, Saudi Aramco (SA)

(73) Assignee: Saudi Arabian Oil Company, Dhahran (SA)

(*) Notice: Subject to any disclaimer, the term of this patent is extended or adjusted under 35 U.S.C. 154(b) by 623 days.

(21) Appl. No.: 13/068,557

(22) Filed: May 12, 2011

(65) Prior Publication Data

US 2012/0290261 A1 Nov. 15, 2012

(51) Int. Cl.
G06F 17/18 (2006.01)
G05B 23/00 (2006.01)

(52) U.S. Cl.
CPC .................................. G05B 23/00 (2013.01)
USPC ................. 702/179; 702/33; 702/183

(58) Field of Classification Search
USPC ............... 702/33, 179, 183; 701/101, 29.2
See application file for complete search history.

(56) References Cited

U.S. PATENT DOCUMENTS

| | | | |
|---|---|---|---|
| 4,694,390 A | 9/1987 | Lee | |
| 4,816,987 A | 3/1989 | Brooks et al. | |
| 5,099,436 A | 3/1992 | McCown et al. | |
| 5,115,672 A | 5/1992 | McShane et al. | |
| 5,319,572 A | 6/1994 | Wilhelm et al. | |
| 5,329,465 A | 7/1994 | Arcella et al. | |
| 5,442,555 A | 8/1995 | Reifman et al. | |
| 5,616,824 A | 4/1997 | Abdel-Malek et al. | |
| 6,016,204 A | 1/2000 | Budnik et al. | |
| 6,108,616 A | 8/2000 | Borchers et al. | |
| 6,176,247 B1 | 1/2001 | Winchcomb et al. | |
| 6,260,004 B1 | 7/2001 | Hays et al. | |
| 6,453,261 B2 | 9/2002 | Boger et al. | |
| 6,678,584 B2 | 1/2004 | Junk et al. | |
| 6,745,084 B2 | 6/2004 | Boger et al. | |
| 6,862,547 B2 | 3/2005 | Snowbarger et al. | |
| 6,880,567 B2 | 4/2005 | Klaver et al. | |
| 7,079,021 B2 | 7/2006 | Snowbarger et al. | |
| 7,089,086 B2 | 8/2006 | Schoonover | |
| 7,324,909 B2 | 1/2008 | Yasukawa et al. | |
| 7,440,832 B2* | 10/2008 | Steen et al. ..................... | 701/51 |
| 7,516,043 B2 | 4/2009 | Junk et al. | |
| 7,729,789 B2* | 6/2010 | Blevins et al. .................. | 700/83 |
| 2009/0121868 A1 | 5/2009 | Flanders | |
| 2009/0222220 A1 | 9/2009 | Wilke | |

OTHER PUBLICATIONS

International Search Report and Written Opinion of the International Searching Authority, May 29, 2012.

* cited by examiner

Primary Examiner — Elias Desta
(74) Attorney, Agent, or Firm — Abelman, Frayne & Schwab

(57) ABSTRACT

A valve actuator fault analysis system for detecting, analyzing and reporting valve actuator performance characterized as deviations, malfunctions and failures. The fault analysis system includes an expert system that monitors the valve actuator and related components, such as the power supply and signal line, for determining causal factors of degraded and/or defective performance; generation of fault-analysis reports in a readable text format file; and methods for characterizing deviations, malfunctions and failures, for generating and concatenating event messages and for detecting and characterizing events that take place in valve actuators, peripheral systems and devices and displaying the results on a display device. The system can operate either in conjunction with, or be embedded in the hardware of a pneumatic valve positioner, an electrical valve actuator and/or similar devices, and can receive messages from external sources, process them, and produce fault-analysis reports in text format for display to the user.

30 Claims, 18 Drawing Sheets

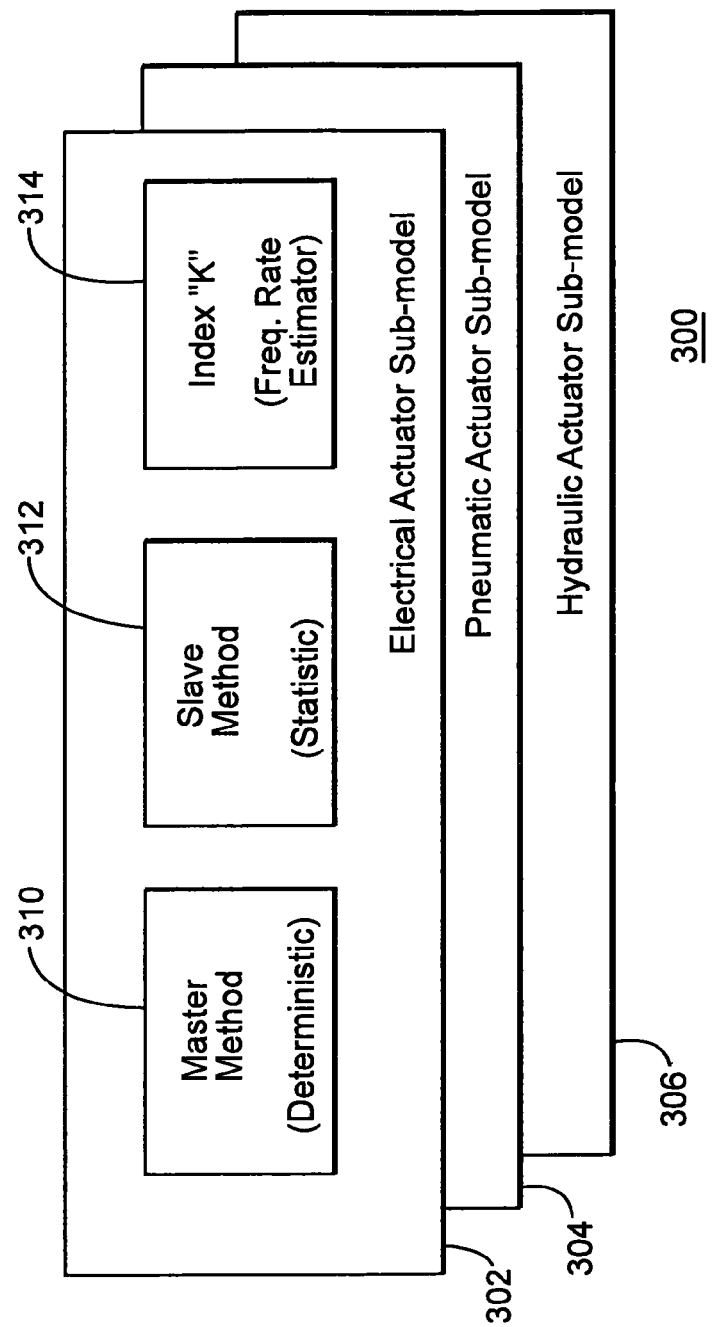

VALVE ACTUATOR FAULT ANALYSIS SYSTEM

FIELD OF THE INVENTION

The present invention relates to valve actuators, and more specifically to a fault analysis system for detecting and locating actuator malfunctions, performance deviations and failures, as well as causal factors of any such malfunction, performance deviation, or failure in order to facilitate the determination of adequate remedial actions.

BACKGROUND OF THE INVENTION

Valve devices regulate the flow of a fluid (gases, fluidized solids, slurries, or liquids) by opening, closing, or partially obstructing various passageways. The valve includes two or more ports which allow the flow of the fluid into and out of the valve. The valve includes a valve body that houses a valve member which interfaces with a valve seat formed along the interior surface of the valve body to form a leak-tight seal when the valve member is fully closed. A valve stem is joined to or contacts the valve member and is used to transmit motion to control the position of the internal valve member with respect to the valve seat. External to the valve body, the stem is attached to a handle or other controlling device, such as a valve actuator to thereby adjust the stem and positioning of the valve member relative to the valve seat.

Valve actuators are attached to the stem to control the position of the valve member. The actuators can be electro-mechanical actuators such as an electric motor or solenoid, pneumatic actuators which are controlled by air pressure, or hydraulic actuators which are controlled by the pressure of a liquid such as oil or water. Pneumatic actuators and hydraulic actuators require pressurized air or liquid lines to supply the actuator. More specifically, the primary function of a valve actuator is to transmit the necessary mechanical force to the valve stem to move the valve member in order to produce a predetermined effect on the fluid that passes through one or more ports of the valve body. Valve actuators can be provided with power and command signals suitable for operation under various environmental conditions (e.g., temperature and pressure) and applications.

DEFINITIONS

As used herein, the following terms have the indicated meanings and definitions:

1. A valve actuator "fails" when it can not accomplish its primary function.
2. A valve actuator "malfunctions" when it can not meet the performance range in one or more of the performance parameters specified by the manufacturer.
3. A valve actuator performance "deviates" when one or more performance parameters of the actuator depart or digress from the performance range specified by the manufacturer.
4. Input data refers to analog information, discrete (e.g., voltage powered on/off switch) information and/or digital (binary) data.
5. A variable refers to an input converted to data associated with engineering units of parameters of a physical process or a mathematical or text data. In other words, a variable is an abstraction that refers to an input converted to a data expression associated to engineering units of parameters of a physical process or a variable in the mathematical sense or a text data whenever such inputs intervene in any of the processes and methods of the present invention.

Events such as failures, malfunctions and performance deviations in valve actuators are the result of various causal factors that relate to the actuator materials, the operating conditions, usage conditions and the environmental conditions. If adequate and timely remedial actions are not taken to remove or mitigate these causal factors, new deviations, malfunctions and/or failures can occur.

These events can relate to each other throughout the operational history of the actuator. For example, a deviation in the supply voltage which powers the actuator can cause an electrical actuator to malfunction in a particular manner, which can eventually lead to a total failure if neglected. Similarly, performance deviations of the actuator, such as inaccurate closing positions can potentially lead to other identifiable malfunctions in other system components as well. The evolution of these problems and the relationship among the intervening variables is dynamic over the life-time of a valve actuator. In order to determine plausible causal factors of such problems, it is necessary to determine these relationships and the underlying causes that govern them.

Conventional actuator diagnostic systems focus on internal actuator problems without involving the peripheral or supportive infrastructure and operating conditions of the actuator, such as the condition of the power supply, command lines, environment and/or usage conditions. As a result, the diagnostic functions of conventional diagnostic systems and devices cannot provide useful information to determine the causal factors of the problems.

Typically, remedial actions are determined as a result of a decision-making process that considers available information regarding the event circumstances, as well as past records of operating conditions, including previous maintenance records of the actuator. Maintenance personnel investigating a particular fault of a specific valve actuator can face numerous difficulties in determining the most effective remedial actions. Such difficulties can be categorized as follows:

a. Inability to identify previous and ongoing performance deviations, malfunctions, and/or failures of the actuator and its peripheral components.
b. Inability to relate the cause-effect of an event to plausible causal factors.
c. Inability to accurately detect deviations in operating conditions, such as deviations in the power supply, command signals; and internal actuator variables, such as temperature, force/torque, and speed (RPM).
d. Inability to characterize deviations, malfunctions and failure events, such as the rate of change, frequency, range and origin of the events.
e. Inability to efficiently record relevant performance deviations, malfunctions, and failures in order to optimize the use of memory and data processing resources available in valve actuators and related peripheral components, such as an electro-pneumatic positioner.
f. Inability to establish a logical sequence of various events that occurred at different times and the inability to produce accurate descriptive data of the events in order to determine effective remedial actions.

The prior art has sought to address some of the aforementioned limitations. For example, U.S. Pat. No. 5,895,857 to Robinson is directed to a vibration signal peak detector to detect peak amplitude values which generally correlate to mechanical faults. However, a deficiency of the Robinson system is that it does not characterize signals or perform fault location based on signal arrival time.

The disclosure of U.S. Pat. No. 5,220,662 to Lipton is directed to a fault detection system in computer processing applications which describes faults by means of logic equations representing known system fault flag patterns. The fault flag patterns form symbols that may be represented by a logic equation. The fault detection system then detects for fault flag conditions that result in the same logic equations that match stored logic equations for known fault conditions. However, the system does not determine the cause-effect relationships between faults and their potential causal factors.

U.S. Pat. No. 5,074,145 to Hattori discloses a fault diagnostic apparatus to detect the operating condition of a pressure operated valve which employs a signal to excite an electromagnetic valve, and a control unit that measures an output signal from the valve to detect any abnormalities in the resulting pressure changes. However, the system does not provide means to determine the likelihood of an actuator to change its operational state from normal operating conditions to deviations, malfunctions and failures, or to identify their potential causes. Nor does the Hattori disclose any capability to learn new cause-effect relationships between states of actuator operation.

Other prior art valve actuators, diagnostic systems and similar devices are capable of providing some diagnostics and characterization of data, e.g., deviations in operating conditions that are related to malfunctions. However, none of the prior art contemplates a system, method or means to identify transition paths from a given state to any other state(s) of the actuator operation; or the capability to determine potential causes of such deviations, malfunctions and failures, or the ability to learn new states and transition paths from controlled experiments or actual operational experiences; or the ability to produce readable fault analysis reports. None of the prior art contemplates the use of an "expert system" based on deterministic and probabilistic models utilized to determine succession of events, and to determine through logical inference based on a physics model and statistical reliability-based model, or alternatively user-entered assignation rules, the potential causes of deviations, malfunctions and failures.

Additionally, none of the prior art provides specific relational data structure for recording events, assessing severity and frequency to produce, through a parsing method, a fault analysis report readable by the user. Furthermore, none of the prior art contemplates methods to establish the relationships between external variables of the environment where the actuator is placed, and events that occur internally within the valve actuator. Moreover, none of the prior art provides specific methods for forecasting plausible states of operation of an actuator and methods to learn transition paths from normal operation to deviations, malfunctions and failures, as well as to learn new states of actuator operation or specific methods for logging actuator events by optimizing the use of memory that is resident in the actuator.

SUMMARY OF THE INVENTION

The present invention broadly comprehends a fault analysis system that includes an expert system that provides a plurality of methods and routines to establish relationships between a plurality of events and plausible causal factors. The fault analysis system produces a fault analysis report in a readable text file for access by the user. The report describes the sequence of events and the causal factors that led to event(s). As part of the report, the system provides a list of effective remedial actions including replacement, repair, protection or removal of actuator component parts, actuator peripheral devices, including electro-pneumatic positioners and related devices, command and supply lines, and the like.

The system can detect deviations, malfunctions and failures of a plurality of pneumatic and hydraulic components of the conduit assembly that connects a valve actuator with its peripheral devices, such as an electro-pneumatic positioner, a pressure regulator and a solenoid valve.

The present system provides specific methods for solving the fault analysis problem in a comprehensive approach by incorporating an "expert system". The constitutive methods of the expert system are based on unique relational models designed to identify different transition paths that cause a valve actuator to drift from its normal operational state towards a performance deviation and ultimately into a fault state. These models determine the transition path(s) from various operating states of an actuator by utilizing deterministic and statistical methods.

This functionality identifies those states that are most related to malfunctions prior to their occurrence. The identification of operating states, root causes of failures and the determination of transition paths are program functions executed by the expert system, which provides capabilities for (i) monitoring, detecting and characterizing deviations of relevant variables associated with the actuator operation; and (ii) determining the causal factors of a failure, malfunction or deviation. Moreover, the identification of operating states enables other important resource optimization functionalities, such as optimization of usage of non-volatile and buffer memory capacity, as well as optimization of computing time in the microprocessor. Such optimizations enable the system to be implemented in an electro-pneumatic valve positioner with minimal impact on power consumption.

Another advantageous functionality of the present system includes the use of deterministic and probabilistic methods which coexist and complement each other when required. This flexibility in the system provides for future adaptation to the particular conditions where the valve actuator operates, as well as for dynamic changes that may occur over the actuator's operational life. Both models can be configured by the user on-line and off-line through relational tables, which can be imported into the system, or through a data entry menu provided on a suitable interface, which does not constitute a part of this invention. The relational tables can also be exported.

The expert system functions in two modes: an analyzer mode and a training-only mode. The analyzer mode enables the system to detect states of operation, such as a normal state, a derivation state, a malfunction state and a failure state of operation. The training-only mode (learning mode) allows the system to adjust, modify and remove transition paths already determined by the master (deterministic) or slave (statistical) methods. The training-only mode is a unique functionality of the system that can be used to develop and tune or adjust the expert system, for example, by conducting controlled experiments with a specific actuator model to determine failure modes and sequence of events (transition paths).

Another advantageous functionality of the system is that it provides means for detecting and characterizing deviations that permit identifying origin, dynamic properties, severity and range of the deviations. This characterization enables other unique methods such as identification of stationary states and recurrent deviations which both are used by the system when it operates in learning mode.

In another embodiment, the system is connected to an external synchronization signal including a global positioning system, which provides the time coordinates used to time-stamp the data received from the different inputs. In yet another embodiment, the system is implemented as a built-in hardware component of an electrical valve actuator or an electro-pneumatic positioner.

In yet another embodiment, means are provided for characterizing deviations in a specified valve actuator supply power, command signals, ambient conditions, usage conditions and/or actuator performance during operation.

In one embodiment of the present system, a plurality of methods is described for determining plausible causal factors for valve actuator performance deviations, malfunctions and failure(s).

In a further embodiment, a method is provided for concatenating messages describing valve actuator faults with messages describing possible causal factors and with messages received from external sources in order to produce cause-effect descriptive phrases that follow predetermined grammatical rules.

In one embodiment, the present invention includes A method for detecting and characterizing an occurrence of at least one event during operation of a valve actuator as one of a deviation, malfunction or failure, the method comprising the steps of: detecting a series of signals received from a plurality of sensors, where each signal represents a condition of a different operational variable associated with the actuator; determining from the signals one or more of the operational variables that caused the occurrence of the at least one event; characterizing the event as a deviation, malfunction or failure; determining at least one relationship between the one or more variables and the event; and communicating the at least one relationship through an output device.

In one aspect, the detecting step comprises the steps of: converting output signals from the plurality of sensors to a voltage signal; generating sequences of different signal patterns by means of a programmable signal generator; normalizing the voltage signal against the generated signal patterns; comparing the normalized voltage signal during a predetermined time period in order to determine the crossing amplitude level of the signals; recording each detected crossing level value together with a time stamp in order to produce a time series; and determining a signature and statistics of the time series.

In a further aspect, the step of generating sequences of different signal patterns by means of a programmable signal generator comprises: repeating specific operations of the actuator under predetermined fixed conditions; storing historical data for a plurality of variables and relational paths therebetween; and learning the states of operation of the valve actuator from the historical data.

In one embodiment, the step of determining from the signals one or more of the operational variables that caused the occurrence of the at least one event comprises the steps of: comparing the signature and statistics against predetermined patterns and values; and determining the origin, dynamic properties, severity and range of the at least one event for each normalized signal.

In one aspect, the step of characterizing the event as a deviation, malfunction or failure comprises the step of classifying each of the events and assigning at least one of a plurality of predetermined descriptive messages to each event. In another aspect, the step of determining the relationship between the one or more variables and the event comprises the steps of: identifying recurring events and identifying the trajectory of the events; and determining the state of operation of the actuator.

In one embodiment, the step of determining the state of operation comprises the steps of: classifying an event to be a failure when the actuator cannot function; classifying an event to be a malfunction when the an actuator parameter cannot meet a predetermined parameter range, and classifying an event to be a deviation when the actuator parameter is outside the predetermined range. In another embodiment, the step of determining the state of operation comprises concatenating event messages with messages describing possible causal factors and with messages received from external sources and producing textual phrases that follow predetermined grammatical rules. In yet another embodiment, the step of determining the state of operation comprises: identifying nodes of relational paths associated with the state of operation of the actuator; generating a table that assigns a unique representative text to each transition path formed between the nodes along the relational paths; and concatenating the event messages with the representative text according to the predetermined grammatical rules.

In one aspect, the step of identifying nodes comprises the steps of providing a state transition matrix having a plurality of variables associated with the actuator, each variable being characterized with metrics defining a normal state of operation, a deviation, a malfunction and a failure associated with the operation of the actuator, each variable representing a node; and identifying transition paths between the nodes that define the state of operation of the actuator. Further, the step of providing the state transition matrix can include defining the deterministic metrics associated with each variable based on physical sub-models that contemplate physical characteristics experienced by the actuator. In one aspect, the physical characteristics include heat-transfer, electrical variables and mechanical variables associated with the actuator.

In one embodiment, the step of providing the state transition matrix includes defining the statistical metrics associated with each variable based on statistical information including component failure rates. In one aspect, the method further includes comparing, for each variable, the deterministic and the statistical metrics; and selecting one of the deterministic or statistical metric for each node based on event frequency associated with the actuator.

In one aspect, the predetermined grammatical rule includes at least one of a subject element, a verb element, and a predicate element. In yet another aspect, the step of communicating the relationship through an output device comprises the step of communicating the state of operation of the actuator on an output device. In still another aspect, the step of communicating the state of operation comprises the step of displaying the state of operation of the actuator as text messages using a series of grammatical rules on a display device.

In one embodiment, the step of generating sequences of different signal patterns by means of a programmable signal generator comprises: repeating specific operations of the actuator under specific fixed conditions; storing historical data for a plurality of variables and relational paths therebetween; and learning the states of operation of the valve actuator from the historical data.

In another embodiment, the step of determining at least one relationship between the one or more variables and the event comprises the steps of: providing physical deterministic models, statistical models and event frequency models associated with variables and relational paths therebetween for the actuator and surrounding environment; comparing metrics associated with the variables of the actuator and surrounding environment as between the deterministic models and statistical models; selecting variable metrics as between the deterministic and statistical models based on event frequency; and determining cause and effect relationships between the states of operations based on the comparisons between physical deterministic models, statistical models and event frequency models.

In still another embodiment of the present invention, a method is provided for analyzing, detecting and recording an occurrence of at least one event during operation of a valve actuator. The method comprises the steps of: receiving a plurality of input signals from a plurality of sensors that monitor operation of the actuator and/or surrounding environment; identifying attributes of the plurality of input signals and classifying the attributes as a potential occurrence of the at least one event; and verifying the at least one event is characterized as one of a deviation, malfunction or failure associated with the actuator and/or surrounding environment.

In one embodiment, the receiving step comprises receiving input signals from each of the plurality of sensors over at least one of an analog input channel, a discrete input channel, and a digital data channel. In another aspect, the identifying step comprises determining if a state of operation associated with an input signal exceeds a predetermined alarm value over a predetermined time. In still another aspect, the verifying step comprises: characterizing the state of operation associated with an input signal as being degraded; searching a current state of operation database for all other states of operation related to the state of operation associated with the input signal; retrieving past events associated to the related states occurring within a predetermined time to the present time; comparing the state of operation associated with the input signal with operational values associated with the retrieved past events; and determining from historical data of the retrieve past events whether the state of operation associated with the input signal is a deviation, malfunction or failure associated with the actuator.

In one aspect the step of searching a current state of operation database comprises storing a new state of operation if a previous state of operation is not identified. In another aspect, the method further comprises the step of providing a textual report describing current and probable causes of the deviations, malfunctions and failures of the actuator.

In still another embodiment of the present invention, a fault analyzing system is provided for characterizing deviations in a specified valve actuator power supply, command signals, ambient conditions, usage conditions and actuator performance during operation of a valve actuator. In one aspect, the system comprises a memory for storing sensor signals associated with each of the valve actuator power supply, command signals, ambient conditions, usage conditions and actuator performance; a processor coupled to the memory; and an expert system program stored in the memory and executable by the processor, the expert system program operable to: a. calculate a first-order discrete derivative for a measured variable Sn associated with a state of operation of the actuator; b. calculate a discrete derivative for the measured variable Sn by utilizing a predetermined variable scan time; c. detect a deviation in measured value of the variable Sn as compared to a specified value of the variable Sn; d. determine an actuator operating signature according to predetermined criteria; e. calculate a trajectory signature of the deviation as a function of time; f associate messages with the trajectory signature of the deviation; and g. communicate the associated messages to an output device.

In one aspect, the specified value of the variable Sn includes a range of values associated with the variable Sn as defined statistically and/or deterministically during operation of the actuator, said range of values associated with the variable being stored in a data structure in the memory. In another aspect, the actuator operating signature is defined by a plurality of variables Sn each having a range of predetermined values. In still another aspect, the plurality of variables Sn are associated with at least one sub-model defined for the actuator, each sub-model having linked groups of variables defining different states of operation of the actuator. In another aspect, the messages associated with the trajectory signature of the deviation comprises concatenated messages describing valve actuator faults with messages describing possible causal factors and with messages received from external sources, thereby producing cause-effect descriptive phrases that follow predetermined grammatical rules.

BRIEF DESCRIPTION OF THE DRAWINGS

The teachings of the present invention can be readily understood by considering the following detailed description in conjunction with the accompanying drawings, in which:

FIG. 3A is a block diagram of a sub-model architecture for various types of valve actuators including electrical, pneumatic and hydraulic actuator submodels;

Figure 1:
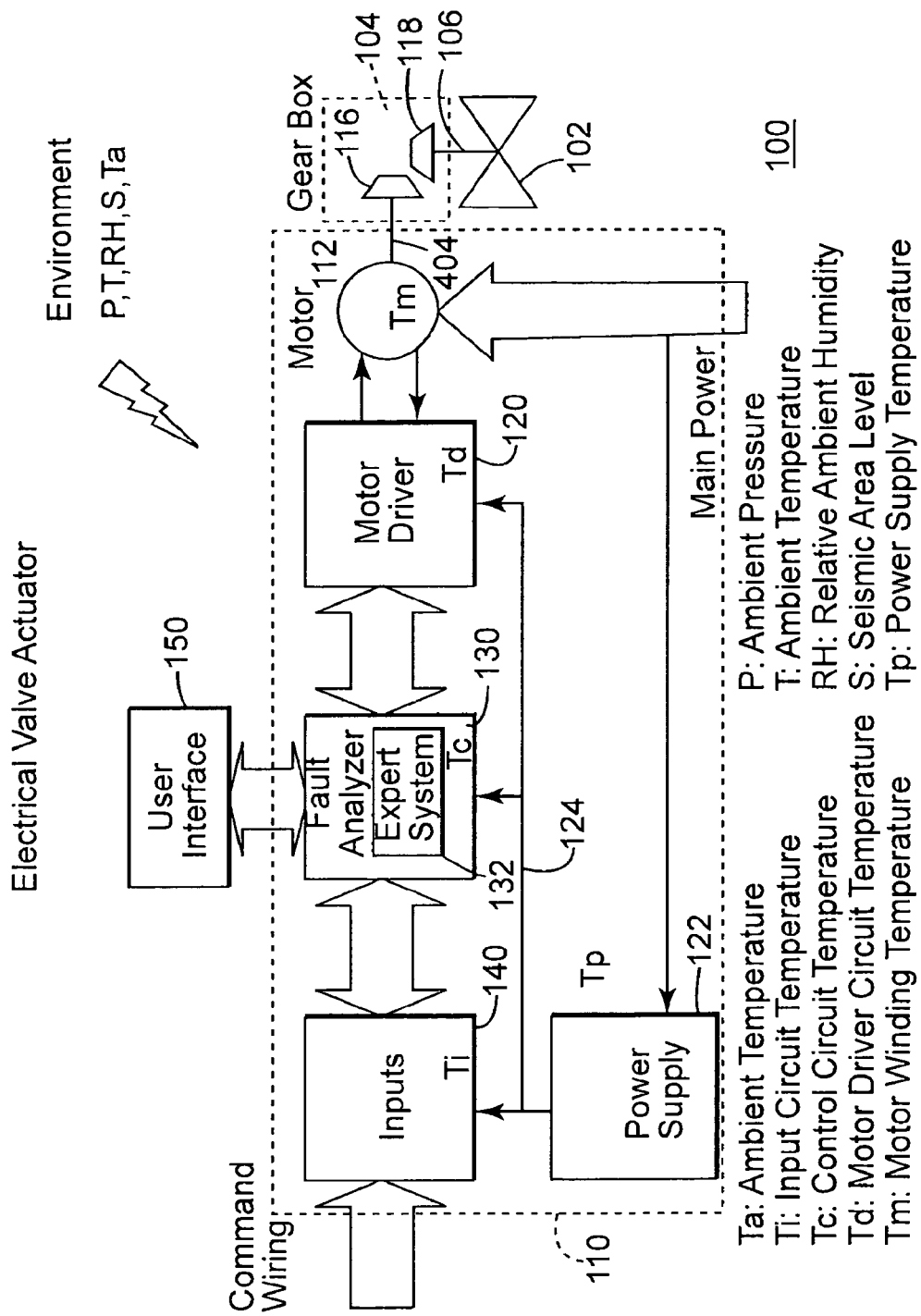
FIG. 1 is a block diagram of an embodiment of the fault analyzer system of the present invention with a fault analyzer configuration that is internal to an electric valve actuator of a valve system, the fault analyzer being suitable for monitoring and determining fault conditions and for identifying causal relationships thereof.

To facilitate an understanding of the invention, identical reference numerals have been used, when appropriate, to designate the same or similar elements that are common to the figures. Further, unless stated otherwise, the features shown in the figures are not drawn to scale, but are shown for illustrative purposes only.

DETAILED DESCRIPTION OF THE PREFERRED EMBODIMENTS

FIG. 1 is a block diagram of an embodiment of a valve actuator fault analyzer system 100 of the present invention configured with a fault analyzer 130 that is illustratively located internal to an electric valve actuator 110 of the system 100. For the purpose of convenience, the "Valve Actuator Fault Analyzer System" is in some instances referred to as the "fault analyzer system" or the "analyzer system". The fault analyzer 130 is suitable for monitoring and determining fault conditions of the actuator 110 and peripheral devices, as well as identifying causal relationships between the valve system components and the peripheral devices thereof. More specifically, the fault analyzer 130 provides specific methods, data structure, and measurement techniques (e.g., a dynamic level crossing detector illustratively shown in FIG. 8, and an analog wake-up routine illustratively shown in FIG. 11) to identify, determine nature, potential root-causes, forecast future states of operation, and determine tendencies of deviations, malfunction and failures of valve actuators; and to generate an automatic fault analysis report.

Figure 9:
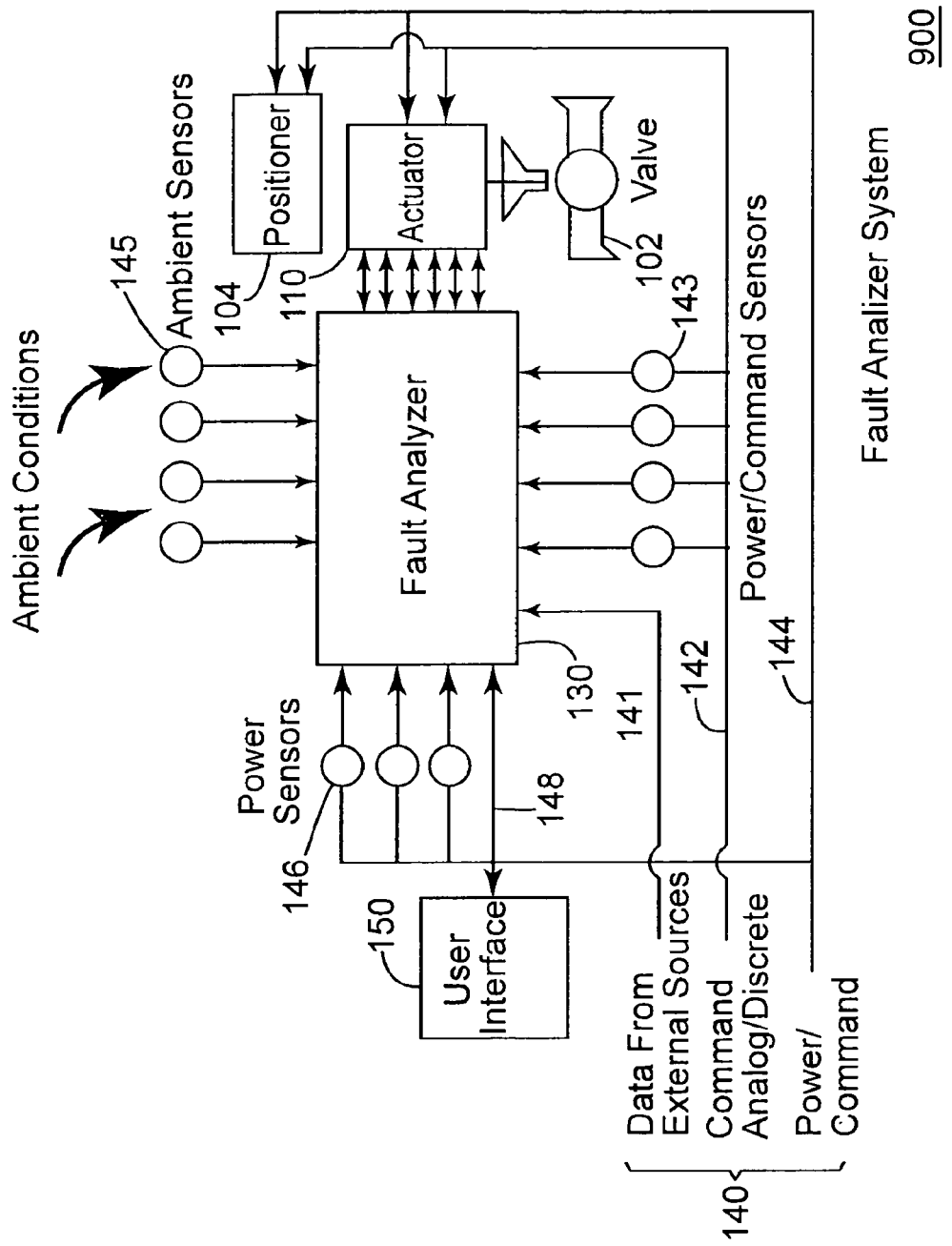
FIG. 9 is a block diagram of another embodiment of a fault analyzer system of the present system with a fault analyzer configuration that is external to an actuator of a valve system.
Figure 10:
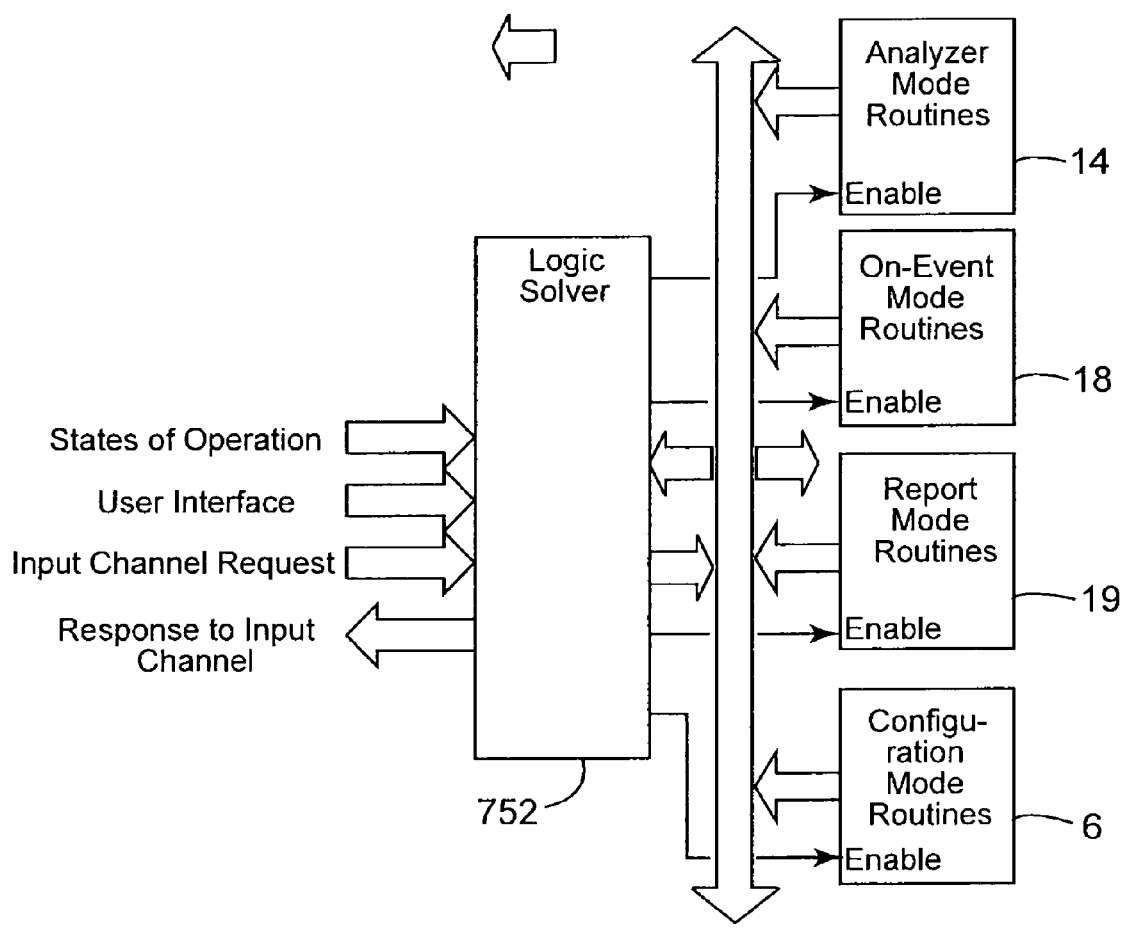
FIG. 10 is a block diagram representing various modes of operation forming the operational aspects of the present invention.

As described in further detail below, although the fault analyzer system 100 is illustratively shown as being internally configured with the actuator 110 of a valve system 100, a more general embodiment is illustratively shown in the FIG. 9 where the fault analyzer 130 is shown as a separate entity (i.e., external) from the actuator 110 and valve 102. The system 900 of FIG. 9 is preferably used for incorporation with electro-pneumatic actuators that include a positioner 104, which receives an electrical control current signal (e.g., 4-20 milliamps (mA)).

It is also noted that the external configuration of the fault analyzer 130 shown in system 900 can be used indistinctly for hydraulic, electro-hydraulic, pneumatic, electro-pneumatic and electrical (motor operated) actuators, among other type of actuating systems. That is, the embodiment illustrated by FIG. 9 is applicable whenever the actuator incorporates a valve positioner, regardless of whether the actuator is pneumatic, hydraulic or any other type actuator.

For sake of better understanding, the present invention is illustratively described primarily with respect to an electrical actuator as illustratively depicted in FIG. 1. Although the operation of the fault analyzer system is essentially the same for both the embodiments of FIGS. 1 and 9, distinctions between the internal and external configurations of the fault analyzer are described in further detail below for sake of clarity.

Referring now to FIG. 1, the valve actuator system 100 for controlling the opening and closing of a valve 102 is illustratively shown. The valve actuator system 100 is illustratively shown as an electric valve actuator 110, which comprises a motor 112 (e.g., induction motor) that turns one or more gears 104 that open or close the valve 102 based on the rotational direction (clockwise or counter-clockwise) of the motor 112 in a well known manner. As illustratively shown, the rotor 404 (FIG. 4) of the induction motor 112 rotates a first gear 116 coupled thereon, which in turn rotates a second gear 118 that is coupled to the valve stem 106 of the valve 102. The actuator motor 112 can receive power directly from a main power source, such as a voltage supply which provides power to the stator (shown as 402 of FIG. 4).

In a preferred embodiment, the fault analyzer (controller) 130 is provided to control the operation of the motor 112, as well as provide fault analysis in accordance with the present invention. The fault analyzer 130 can be any micro-controller that includes memory for storing data and programs which are executable by one or more processors (e.g., microprocessor). The programs include routines that monitor, analyze and display information pertaining to the state of operation of the actuator system 100, as described below in further detail. The controller 130 can receive operational conditions (i.e., variables) from various sensors. The sensors can be used to provide operational conditions of internal components, such as input circuit temperature (Ti), control circuit temperature (Tc), motor driver temperature (Td), motor winding temperature (Tm) power supply temperature (Tp), and the like. Additionally, external sensor inputs can include ambient temperature (Ta), ambient pressure (P), relative ambient humidity (RH), seismic area level (S), and the like. Various user interfaces 150, such as a keyboard, printer, display panel and the like can be provided to input various commands and/or display various messages regarding the state of operation of the actuator system 100.

A low-voltage power supply (LVPS) 122 can be used to provide power to one or more support circuits, such as one or more sensors (inputs) 140, the controller 130 and a motor driver 120. The controller 130 is electrically coupled to the motor driver 120, which regulates the rotational speed, torque, as well as the direction of rotation of the motor 112. Specifically, the motor driver 120 amplifies a low-current control signal 124 from the LVPS 122 to a proportionally higher-current signal to drive the motor 112 based on command signals received from the controller 130.

Referring now to an alternative embodiment 900 depicted in FIG. 9, whenever a valve positioner 104 is used to control the position of the valve 102, the fault analyzer 130 of the present invention resides externally in an independent hardware assembly that is separate from the actuator 110, the positioner 104, and the valve 102. In this embodiment, the fault analyzer 130, which incorporates a controller or microcontroller 130 and a non-volatile memory of identical functions to the ones described with respect to the embodiment of FIG. 1, receives position status, event logs, alarm logs, and actuator command status from the actuator 110, and all the actuator information available in the actuator resident memory, as well as information generated by the valve positioner 104. The fault analyzer 130 also receives inputs from power/command sensors 145 connected to the command, analog and/or discrete lines 142, ambient (environmental) sensor inputs 145, power sensors 143 from the power lines 144, and user interface 150 from the data channel 148. External data sources are read by the fault analyzer 130 through a digital data channel 141.

Method and Apparatus for Determining Causal Factors for Deviations, Malfunctions and Failures in Valve Actuators A. Expert System Referring again to FIG. 1, the fault analyzer can be a controller 130 which includes software programming hereinafter referred to as the "expert system" 132 that consists of a plurality of methods and routines for detecting and characterizing deviations, malfunctions and failures (i.e., "events"), identifying the state of operation of the actuator, determining transition paths between any state of actuator operation, forecasting potential future states of operation, and for producing a fault-analysis report. The events are specific to the states of operation of various components of the actuator.

Figure 3:
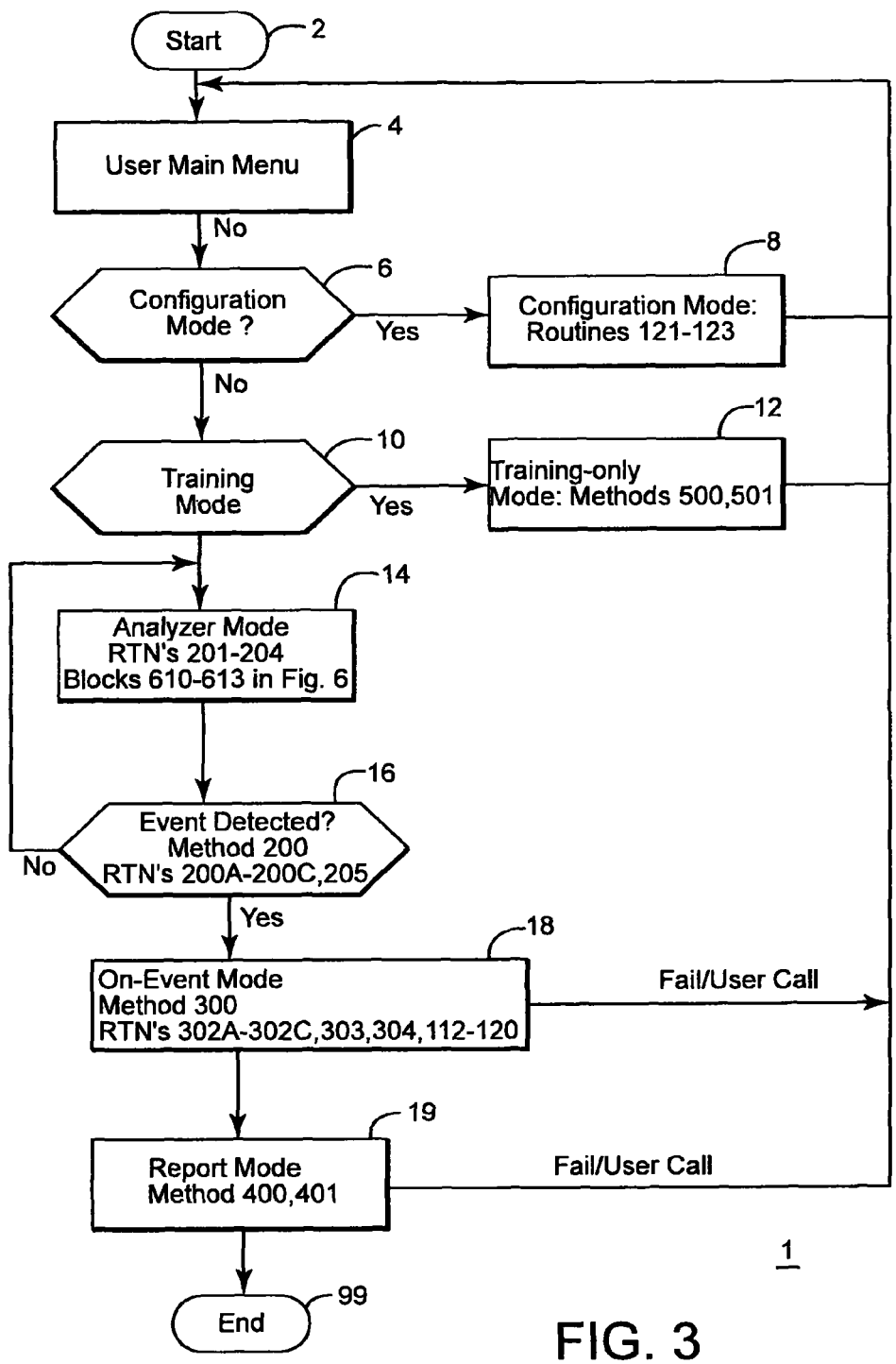
FIG. 3 is a flow diagram illustrating a sequence of various methods, routines and subroutines forming the operational aspects of the present invention.

Referring to FIG. 3, a flow diagram illustrating the execution by the main program of the different modes of operation of the expert system 132 is shown. The main program is executed by the fault analyzer 130. The main program is stored in a non-volatile memory and is executed by the processor or microcontroller for both the internal and external actuator models. At step 2, the selection of a mode of operation begins where user interface devices 150 that are electronically coupled to the expert system 132 are made available. The user is preferably required to login by providing a user name, password and/or other security information. The user interfaces 150 (FIG. 9) can include a display, keyboard, push button panel, mouse, printer and the like to access the expert system 132. Once the user is logged in or otherwise authenticated, the operation 1 proceeds to step 4, where a main menu is displayed to the user on the display to enable the user to select one or more modes of operation and a sub-model of the actuator as referred in FIG. 3A. If at step 6 the expert system's configuration mode is selected by the user, then at step 8, routines 121-123 are applicable, as described in further detail below. Alternatively at step 10, the user can select the training mode of operation, which at step 12, includes routines 500 and 501, as described below in further detail.

Before the Valve Actuator Fault analyzer can be used, the user must configure the states of operation and transition paths by downloading all the necessary data as described in more detail below with respect to the description of the deterministic/statistical (master/slave) methods (FIG. 3A). Alternatively, the user can run various training sessions in order for the system to learn various transition paths and states of operation, as described below in greater detail with respect to Method 501.

Figure 6:
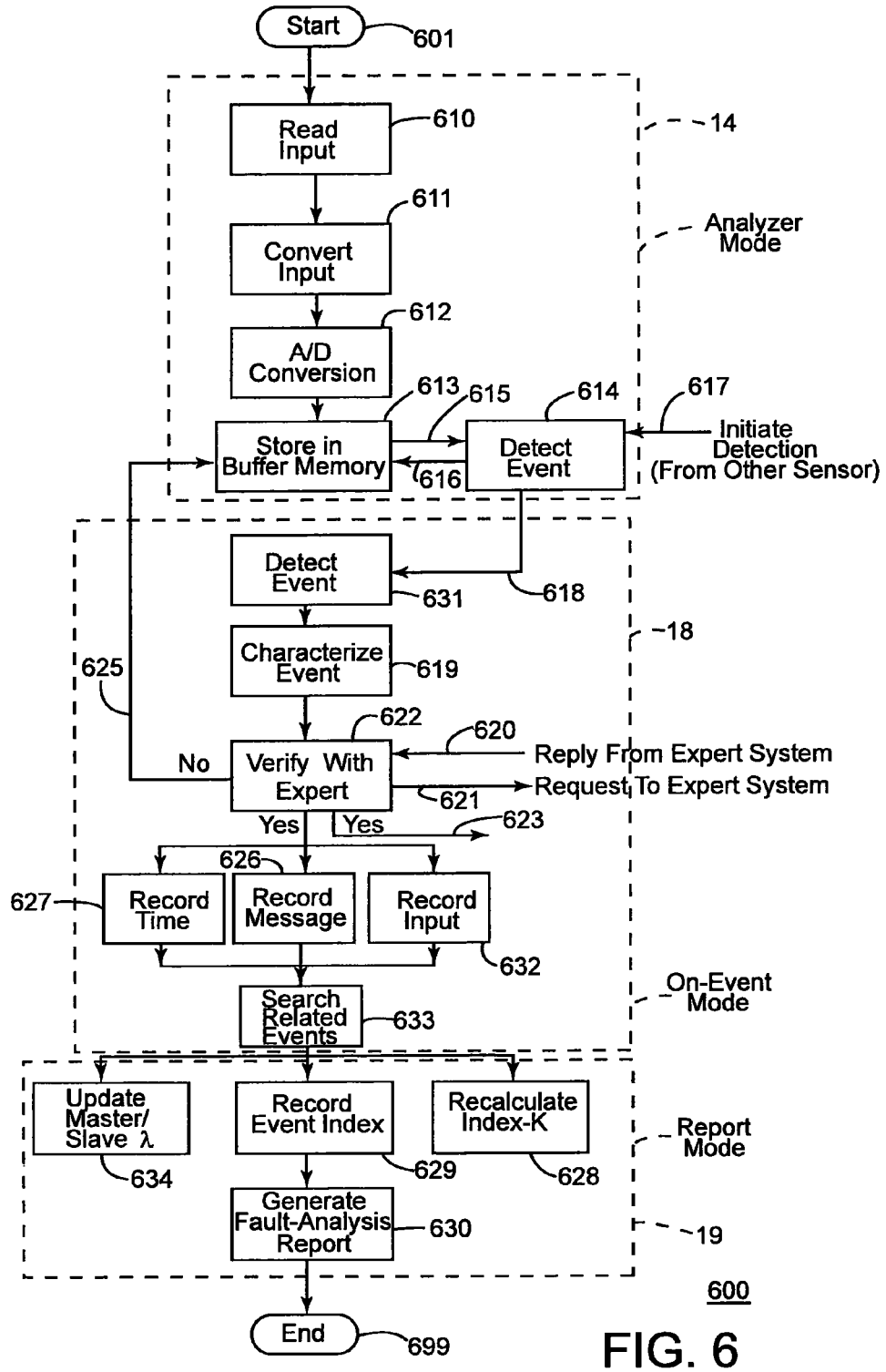
FIG. 6 is a flow diagram of a method for analyzing, detecting and recording events occurring with a valve actuator of the present system.

If the user does not select the configuration mode 8 or training mode 12, then at step 14 the user can alternatively select the analyzer mode of operation. Routines 201-204 and blocks 610 through 613 in FIG. 6 are associated with the analyzer mode of operation, as described below in further detail. After operating the expert system 132 in analyzer mode, if at step 16 no fault event is detected by any of the routines 200A-C and 205, the user can run the analyzer mode of operation 14 again. Otherwise, if an event is detected, at step 18, an "on-event" mode of operation is initiated by method 300, which includes routines 302A-C, 303, 304, as well as routines 112-120, as described below in further detail.

At step 19, the report mode of operation includes various reporting techniques, including various textural messages and/or graphical information shown on the display or printed out in report forms for the various parameters of the degraded, malfunctioning and/or failed components and the peripheral devices in the system 100. Methods 400 and 401 are associated with the report mode of operation 19, as described below in further detail.

Once the user has completed any of the routines associated with the configuration mode 8, training mode 12, analyzer mode 14 or report mode 19, the user can return to the main menu to continue the session or otherwise terminate access to the operation of the expert system 132. For example, at step 99, the user can manually log off from the expert system 132. Alternatively, the system will automatically log off if there is no activity by the user after a predetermined time.

As shown in the flow diagram of FIG. 3, if any of the routines occurring during the on-event mode of operation 18 or report mode of operation 19 fails, the main program will abort, and in one embodiment, the main program will return to the logical previous step or mode of operation. It is further noted that when the analyzer 130 is operating during any one of the configuration mode 6, training mode 10, or analyzer mode 14, the user can access the main menu to initiate another operating mode by terminating the present mode and switching to one of the other two modes of operation. For example, if the analyzer is currently operating in the configuration mode 6, the user can use the main menu to terminate the configuration mode 6 and initiate either the training mode 10 or analyzer mode 14.

Authorized users can access the expert system from different locations, including locally (i.e., in the field) at the device or component. Alternatively, a user can access the expert system 132 from a remote location, such as a central monitoring location.

Figure 2:
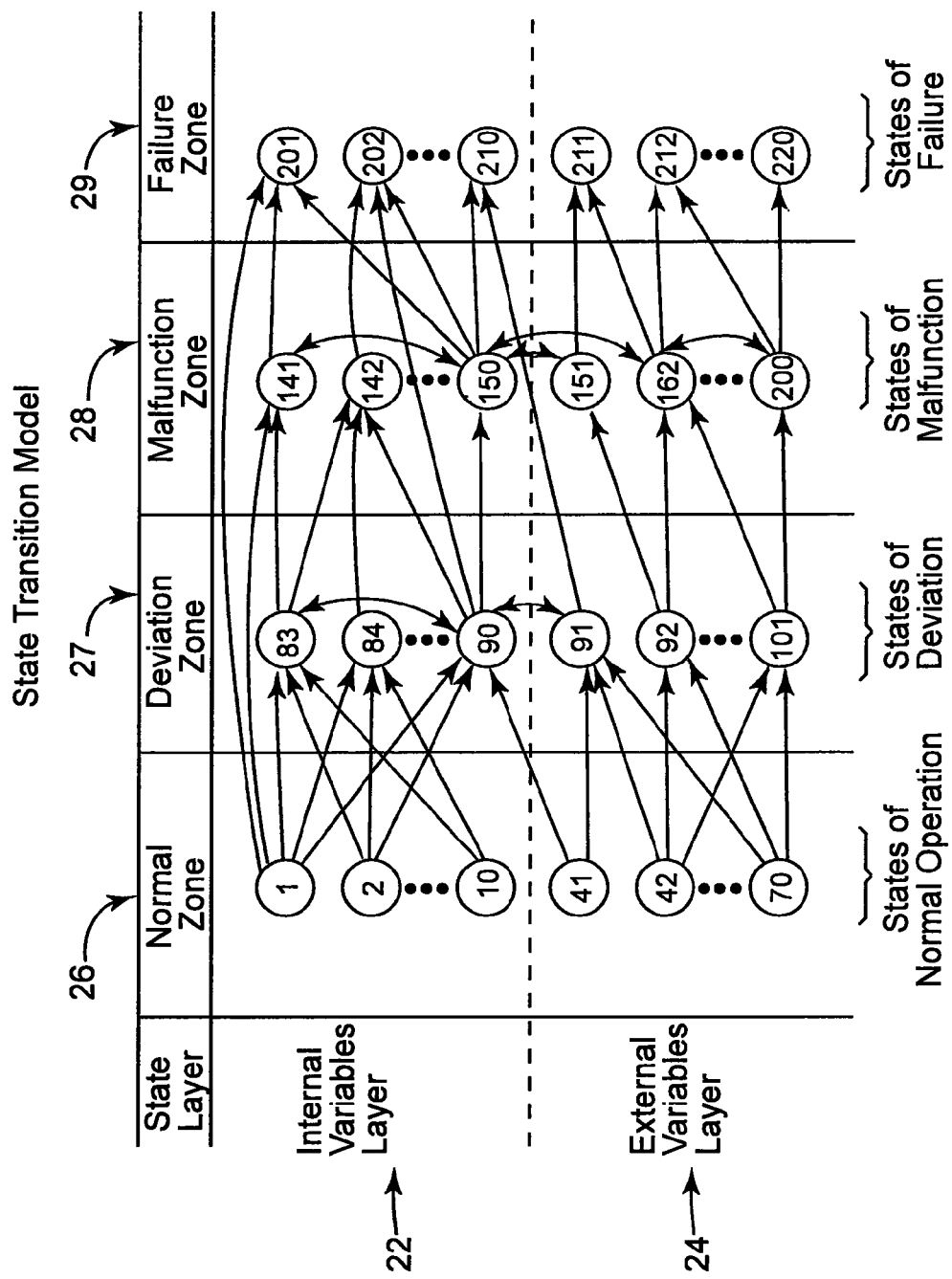
FIG. 2 is a data structure of a state transitional model showing relationships between different variables in various operational states of the present system.

Referring now to FIG. 2, a data structure of a state transitional model is shown. The data structure 20 shows relationships between different variables in various operational states of the present system. More specifically, the data structure 20 includes states of operation (also referred to as "states" or "nodes") and a set of relationships between the states, which is also referred to as "transition paths" or "paths". The states of operation and their transition paths between the nodes are governed by a set of logical rules which are part of the data structure of the expert system 132.

1. Expert System Data Structure

The data structure 20 of the expert system 132 consists of routines, variables, transition paths and logical relationships. In one embodiment of the present system, the data of the expert system 132 is stored in a non-volatile memory of the controller 130. Variables are grouped in states of operation, herein referred to as "states". Transition paths or "paths" represent the relationship between two states of operation, i.e., an origin state (e.g., $1^{st}$ node) and a destination state (e.g., $2^{nd}$ node). The transition paths are numeric values ranging from 0 to 1. Logical relationships control how the transition paths are established between states of operation.

Transition paths can be represented as elements of a matrix called Λ of m rows and n columns as shown below. Matrix Λ complies with the properties shown below:

$$\Lambda = \begin{bmatrix} \lambda_{11} & \lambda_{12} & \lambda_{13} & \dots & \lambda_{1n} \\ \lambda_{21} & \lambda_{22} & \lambda_{23} & \dots & \lambda_{2n} \\ \dots & \dots & \dots & \dots & \dots \\ \dots & \dots & \dots & \dots & \dots \\ \lambda_{m1} & \lambda_{m2} & \dots & \dots & \lambda_{mn} \end{bmatrix}$$

"m" rows and "n" columns, where:
$\lambda_{11}=0$; $\lambda_{11}=0$; ...; $\lambda_{ii}=0$ for i∈{1-m,n} ∈ IJ
if $\lambda_{ij}\neq 0$, then $\lambda_{jii}=0$ for i∈{1-m,n} ∈ IJ, j∈{1-m,n} ∈ IJ The transition path λ value is a real number having a range $0 \leq \lambda \leq 1.0$ that represents the likelihood (i.e., probability) that the actuator drifts from the original state of operation "$S_i$" towards the destination state of operation "$S_j$"; five (5) ranges of λ are defined, one for each degree of likelihood, as follows:

Range #1: "EVENTUAL" for $\leq \lambda < 0.2$
Range #2: "PROBABLE" for $0.2 \leq \lambda < 0.4$
Range #3: "LIKELY", for $0.4 \leq \lambda < 0.6$
Range #4: "VERY LIKELY" for $0.6 \leq \lambda < 0.8$
Range #5: "CERTAIN" for $0.8 \leq \lambda < 1 = 1$ In one embodiment, the Λ matrix is Markovian in a sense that $\Sigma^m j=1 \lambda_{ij}=1$ for every "i" from 1 to n

2. Operating Routines

Operating routines of the present invention are provided to perform various functions including calculating transition paths, analyzing events, and generating fault-analysis reports. These routines are discussed below in further detail with respect to the flow diagrams of FIGS. 6 and 7.

3. States of Operation

The expert system 132 classifies the states of operation of the actuator system 100 by layers and zones. In one embodiment, the state transition model is defined by four (4) zones of operation and two (2) layers of variables as illustratively shown in a State Transition Table 200 of FIG. 2.

Referring to FIG. 2, a State Transition Table 20 includes a plurality of rows and columns, where a first row 22 illustrates internal variables related to internal components, and a second row 24 illustrates external variables related to external components and environmental conditions associated with the actuator 100. For illustrative purposes only, the variables are shown as circled numbers 1-220, which are not considered limiting. Each variable represents a metric associated with an internal or external component or environmental condition. The variables are assigned to the zones or states of operation in accordance with their operating parameters and metrics. The zones or states of operation are defined as columns in the State Transition Table 20, which include a normal zone of operation 26, a deviation zone 27, a malfunction zone 28, and a failure zone 29.

More specifically, each state of operation consists of a set of variables. For example, in an electrical actuator, the state that represents "normal mechanical operation" 26 is described by a plurality of variables, such as rotational speed, torque, end-of-travel position and the relationships among them. A plurality of routines of the expert system 132 processes the variables according to their data type.

Each variable has a metric. For example, the internal layer variable "actuator torque" is denoted by a double precision floating point, while the variable "local/remote" is denoted by Boolean logic. The actuator torque is a positive real number illustratively denoted in Nm (Newton-meter). Similarly, the state for "normal control board operation" contains the variables: control board temperature, event summary and alarms summary. According to their respective data types, the variables have measurable parameters or metrics denoted by ranges, discrete values or descriptive messages.

As shown below in TABLE I, each variable can also be listed in a zone table. The illustrative zone table assigns a text message for each variable and it also indicates its zone and its layer. The zones are: "normal zone", "deviation zone", "malfunction zone" and "failure zone". The zone table can be stored in non-volatile memory of the controller 130.

TABLE I

Illustrative Zone Table

| Variable Index | Variable Tag | Zone | Layer | Message |
|---|---|---|---|---|
| 1 | V001 | Failure | External | "Supply Voltage" |
| 2 | X002 | Malfunction | Internal | "Valve Stem Position" |
| 3 | C001 | Malfunction | External | "Command current" |
| ... | ... | ... | ... |  |
| N | P005 | Malfunction | External/Internal | "Command pressure" |

In the above example,
"V001" is illustratively the tag for the supply voltage #001;
"X002" is the tag for the valve stem position #002;
"C001" is the tag for the command current signal #001; and
"P005 is the tag for command pressure signal #005.

4. Transition Path Properties

Transition paths, as shown by the arrows in FIG. 2, indicate potential changes in the variable metrics and have the properties of directionality, singularity and interconnectivity. These properties are described as follows:

a) Directionality

The transition path follows the left-to-right direction when the origin state and the destination state are located in different zones. The transition paths in FIG. 2 are illustrated by arrows where, for example, a given transition path established between a state located in a given zone, namely, zone #1, and other state located in another zone, namely, zone #2, must have the origin state in zone #1 and the destination state in zone #2.

In another embodiment, the state transition model can contain reversed relationships, for example, paths starting from any state located in the failure zone to any state located in the malfunction zone. Right-to-left relationships or reverse paths can reduce the number of states per zone.

In a further embodiment, the state transition model can be configured for top-down (internal to external) and bottom-up (external to internal) directions for transition paths. Alternatively, the model is configured for only top-down transitions within the normal operation zone.

A state of operation is defined as a collection of variables that meet specific conditions for a period of time known as the observation period. Such conditions and the observation period are pre-defined by the user through a configuration program menu of the Expert System 132. The expert system measures and processes the variables to determine whether a state of operation is activated or not. The determination process is executed by a State Detection Routine (117) during verification steps 622 through 634 of FIG. 6 described in further detail below.

Examples of variables of the actuator system 100 that can be monitored by the analyzer are torque, rotation speed, current consumption, pressure and internal temperatures. The normal (no-fault) values of these variables are known by the end-user through datasheets or through the analyzer if no fault has been detected by the analyzer at different values of such variables of the machine (i.e., actuator). Examples of attributes are color, weight, top flange size and electrical connections. Operational variables are the measuring parameters of performance of the actuator.

For example, the actuator remains at the state "normal supply voltage" as long as the variables of such state meet certain pre-defined conditions set by the user. When such variables diverge or depart from such predefined conditions for a period of time, the analyzer determines which deviation state the actuator has moved to by executing State Detection Routine 117 and the verification steps 622 through 634, which is described below in further detail with respect to FIG. 6. The analyzer cyclically executes State Detection Routine 117 and the verification steps 622 through 634 while in the analyzer mode 14 of operation.

b) Singularity:

States cannot be placed in two layers at the same time. In one embodiment, the state transition model includes two layers of variables: an internal layer and an external layer, as shown in FIG. 2. The internal variables relate to the actuator, such as actuator internal temperature, actuator torque and the actuator running-hours counter value. The external variables relate to conditions surrounding the actuator, such as the outside temperature surrounding the actuator and the variability of current from the actuator power supply.

c) Interconnectivity:

Each state can have transition paths to deviation, malfunction or failure zones, regardless of which variables are involved. The system is designed in such a manner that allows each state to have a transition path established with any other state of operation. However, states of operation located in the failure zone do not have transition paths established among themselves as shown in FIG. 2 of the present system.

5. Sub-Models

Referring to FIG. 3A, the expert system 132 provides a set of master (deterministic) 310, slave (statistical) 312, and Index-K routines 314 for each sub-model. The Index-K routine tracks event occurrences (frequencies) and performs an arbitration function, explained more in details below, between the transition paths, i.e., probabilities (X) calculated by the master and the slave methods. Regarding the expert system, $\lambda$ can be a probability (i.e., in the statistical sense) for the slave method, while for the master method $\lambda$ is a likelihood index. In both instances, $\lambda$ operates as a weighting factor between the states of operation, which can be depicted as a graph as illustratively shown in FIG. 2. Accordingly, Lambda is a weight factor in a graph that is associated with discrete mathematics.

In the preferred embodiment, the expert system 132 provides a plurality of state transition sub-models 300, e.g., one sub-model per type of valve actuator including one sub-model for an electrical actuator(s) 302, one for a pneumatic actuator(s) 304, and one sub-model for a hydraulic actuator(s) 306. In another embodiment, sub-models for an electro-hydraulic, a pneumatic-hydraulic and an electro-pneumatic actuator(s) are also provided.

The expert system 132 can operate only one sub-model at a time during configuration. The user can select, through a configuration menu, which sub-model is going be used. In another embodiment, the expert system 132 auto-switches to a sub-model by recognizing the signals received at the sensor inputs 140.

Referring below to TABLE II, the transition paths (arrows between variables in FIG. 2) are stored as a relational table that links each transition path to its origin and destination states along with the variable tags. Each sub-model has a relational table that links each transition path to its origin and destination states along with the variable tags.

The relational table shown in TABLE II includes information for each transition path, such as its origin and destination states, its state variables, and the logical rules assigned to it. In one embodiment, the relational table is stored in non-volatile memory, and can be accessed and modified by the user through the user configuration menu of the expert system 132.

Figure 13:
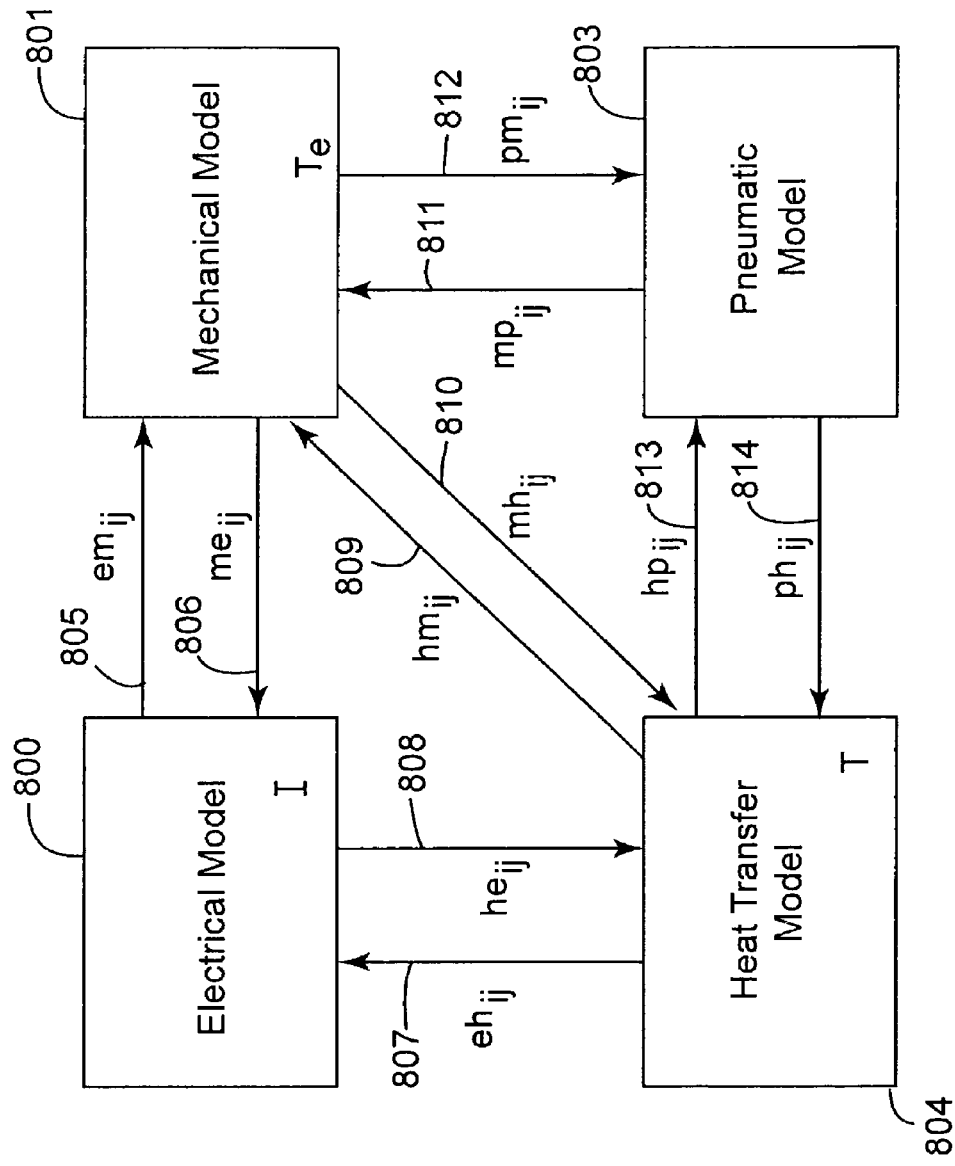
FIG. 13 is a block diagram illustrating sub-adjacent physical models of the actuator sub-models of FIG. 3A, and change ratio factors between variables of the physical models.

Referring back to FIG. 1, the block diagram represents the sub-model of the electrical valve actuator 302, and shows the main function blocks (e.g., input terminal board 140, controller 130, motor driver 120, motor 112 and the like), as well as relevant variables (Ti, Tc, Td, Tp, P, T, etc.) corresponding to deviations, malfunctions, failures and normal states of operation. A function block is formed by the main elements of a physical component of the actuator. Illustratively, three subjacent physical models are provided. For example, with respect to the motor 112 of the actuator 110, the three subjacent physical models include (i) a steady-state heat transfer (conductivity/convection/radiation) model, (ii) a mechanical torque/velocity model, and (ii) an electrical model which includes a description of the resistive, capacitive and inductive coupling of the main function blocks. In another embodiment, a pneumatic model and hydraulic models are also available. For example, FIG. 13 illustrates the four physical models described above.

For every function block, a predefined set of subjacent physical models are provided as well as the overall physical model of all the function blocks of the actuator as a whole.

Each physical model can be understood as a layer on which specific variables associated to the function block on that particular layer are linked through relationships in such a manner that the change in a variable produces a change in the linked one. Similarly, variables in one model are related to variables in another model.

Referring to FIG. 1, in each subjacent physical model, the expert system 132 calculates a specific set of factors $\delta ij$ which represent the relationships (change ratio) between one variable of the i-esim and another one in the j-esim function block or; depending on the user needs, relationships between variables of the constitutive components of a function block, for example between the temperature of a transformer and the temperature on a diodes-bridge rectifier, both mounted on the same power supply electronic board.

As an example of the relationships between variables of different physical models, referring to FIG. 1, temperature on

TABLE II

Illustrative Transition Paths Table

| Transition Path | Transition Path Index | Operation States Tag | Variables Tags | Logical Rules | Current Method Performance Message | Likelihood Message | Timer (hours) |
|---|---|---|---|---|---|---|---|
| $\Lambda_{12}$ | 12 | S1, S2 | X, P | 1→2, (1←2) = 0 | "EXCELLENT" | "CERTAIN" | 24 |
| $\Lambda_{13}$ | 13 | S1, S3 | X, C | 1→3, (1←3) = 0 | "VERY GOOD" | "PROBABLE" | 1 |
| $\Lambda_{14}$ | 14 | S1, S4 | C, V | 1→4, (1←4) = 0 | "POOR" | "CERTAIN" | 0.2 |
| ... | ... | ... | ... | ... | ... | | |
| $\Lambda_{23}$ | 23 | S2, S3 | P, X | 2→3, (2←3) = 0 | "GOOD" | "LIKELY" | 1 |
| ... | ... | ... | ... | ... | ... | | |
| $\Lambda_{34}$ | 34 | S3, S4 | P, C | 3→4, (3←4) = 0 | "BAD" | "CERTAIN" | 8760 |
| ... | ... | ... | ... | ... | ... | | |
| $\lambda_{mn}$ | Mn | Sm, Sn | P, V | m→n, (m←n) = 0 | "GOOD" | "EVENTUAL" | 8760 | the motor 112 is related to friction factor in the gear box 116. The user, through the configuration menu, can enter into the system the relationships between the last two variables. For such purpose, for every actuator sub-model, the expert system provides a data structure as shown in TABLE II-A below, which allows the user to enter the relationships among variables associated to a function block in a physical model with another variable in another physical model. The relationships among internal variables of each model are noted as R.xy, while the relationships between variables of different physical models are noted RI.xy, where "xy" are illustratively integers greater than one. In one embodiment, the relationships of TABLE II-A are pointers to software routines which the user is able to download in the local non-volatile memory of the analyzer.

Figure 12:
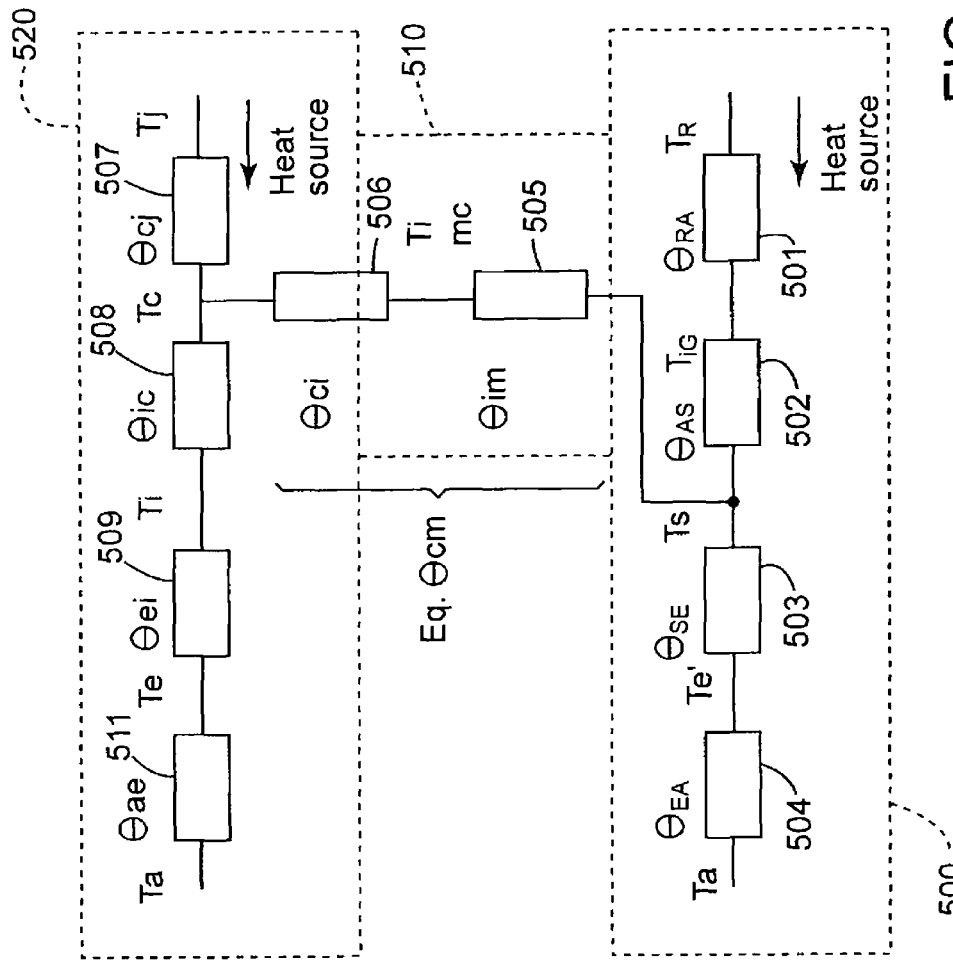
FIG. 12 is a block diagram of the thermal conductivity model for a motor operated electrical valve actuator in its enclosure.

Referring to FIG. 12, the block diagram represents a portion of the overall steady state heat-transfer model of an electrical actuator (motor operated) showing only the motor enclosure 500 (i.e., FIG. 1 shows the motor 112 which is inside the motor enclosure 500), the conduit 510 that connects the motor enclosure with the motor driver enclosure compartment 520. Generally the motor driver, contactor and control circuit are located in a separate compartment together with the power terminal and command terminal board.

In FIG. 12, various reference designations are shown including "Ta"—representing the ambient temperature, "Te"—representing the enclosure temperature, "Ti"—representing the inside-actuator enclosure air temperature, "Tc"—representing the motor driver board (electronic printed circuit board) surface temperature, and "Tj"—representing the average surface temperature of electronic components mounted on the motor driver board 120 (FIG. 1). The designation "Tr" represents the rotor temperature, "Tig" represents the inside gap air temperature, "Ts" represents the stator temperature, and "Te'" represents the motor enclosure temperature.

Referring again to FIG. 12, $\Theta_{cm}$, the equivalent thermal resistance between the stator and the motor driver board is calculated as $\Theta_{ci}+\Theta_{im}$. Normally in electrical valve actuators, the motor 112 is placed in a separated enclosure or compartment within the actuator enclosure. In other configurations the motor 112 can share space with electrical contactors and electronic cards inside a single enclosure. The designation $\Theta_{ci}$ 506 is the thermal resistivity between the electronic card surface and the air trapped inside the inner cavity or conduit that connects the motor 112 and the actuator electronic cards, while the designation $\Theta_{im}$ 505 is the thermal resistivity between the inner cavity air of the conduit or passage that connects the electronic boards compartment or enclosure with the motor enclosure or compartment and the motor chassis.

The designation $\Theta_{ci}$ can be derived by the sums of the thermal resistance as between the ambient air and enclosure temperature $\Theta_{ae}$ 511+the thermal resistance as between the enclosure temperature and the inside-actuator enclosure air temperature $\Theta_{ei}$ 509+the thermal resistance as between the inside-actuator enclosure air temperature and motor driver board $\Theta_{ic}$ 508+the thermal resistance as between the motor driver board and average surface temperature of electronic components mounted on the motor driver board 120 $\Theta_{cj}$ 507.

Similarly, the designation $\Theta_{im}$ can be derived by the sums of the thermal resistance as between the ambient air and the motor enclosure temperature $\Theta_{ea}$ 504+the thermal resistance as between the motor enclosure temperature and the stator temperature $\Theta_{se}$ 503+the thermal resistance as between the stator temperature and the inside gap air temperature $\Theta_{as}$ 502+the thermal resistance as between the inside gap air temperature and the rotor temperature $\Theta_{ra}$ 501.

Referring to FIG. 13, the block diagram represents four subjacent physical models, including an electrical model 800, a mechanical model 801, a pneumatic model 803, and a steady-state heat transfer model 804. Also shown are various relationships, 805 to 814 that link each model with another model. For example the electrical model 800 is linked bi-directionally with the heat transfer model 804 via paths 807 and 808, with the mechanical model 801 via directional paths 805 and 806, and so forth.

In valve actuators, and more prevalently in electrical actuators, a significant portion of failures are associated with thermal, power supply, electrical coupling/immunity and mechanical torque-related phenomena or occurrences. Referring to FIG. 9, for example, the user is able to download the relationships between variables for each actuator sub-model through a communication port 141.

TABLE II-A

Sub-Model Data Table

| FB # | Function Block Name | Internal Variables | Internal Relationship | Interface Physical Model | Interface Variables | Interface Relationship |
|---|---|---|---|---|---|---|
| 1 | Input Board | Ta | R.11 | None | None | None |
|   |   | V1 | R.12 |   |   |   |
|   |   | V2 | R.13 |   |   |   |
|   |   | V3 | R.14 |   |   |   |
|   |   | Tcib | R.15 |   |   |   |
|   |   | I | R.16 |   |   |   |
| 2 | Control Board | Ta | R.21 | None | None | None |
|   |   | V1 | R.22 |   |   |   |
|   |   | V2 | R.23 |   |   |   |
|   |   | Tccb | R.24 |   |   |   |
|   |   | I | R.25 |   |   |   |
| 3 | Motor Driver Board | Vin | R.31 | Mechanical | Em31 | RI.31 |
|   |   | Torque | R.32 |   | Em32 | RI.32 |
|   |   | Ta | R.33 |   | Em33 | RI.33 |
|   |   | Tcmd | R.34 |   | Em34 | RI.34 |
|   |   | I | R.35 |   | Em35 | RI.35 |
| 4 | Power Supply | Vin | R.41 | None | None | None |
|   |   | Torque | R.42 |   |   |   |
|   |   | Ta | R.43 |   |   |   |
|   |   | Tcps | R.44 |   |   |   |
|   |   | I | R.45 |   |   |   |

TABLE II-A-continued

Sub-Model Data Table

| FB # | Function Block Name | Internal Variables | Internal Relationship | Interface Physical Model | Interface Variables | Interface Relationship |
|---|---|---|---|---|---|---|
| 5 | Mechanical Worm gear | Torque r.p.m | R.51 R.52 | Electrical | Me51 Me52 | RI.51 RI.52 |
| ... | ... | ... | ... | ... | ... | ... |

Illustrative Heat Transfer Model for Electrical Actuator Motor

Figure 4:
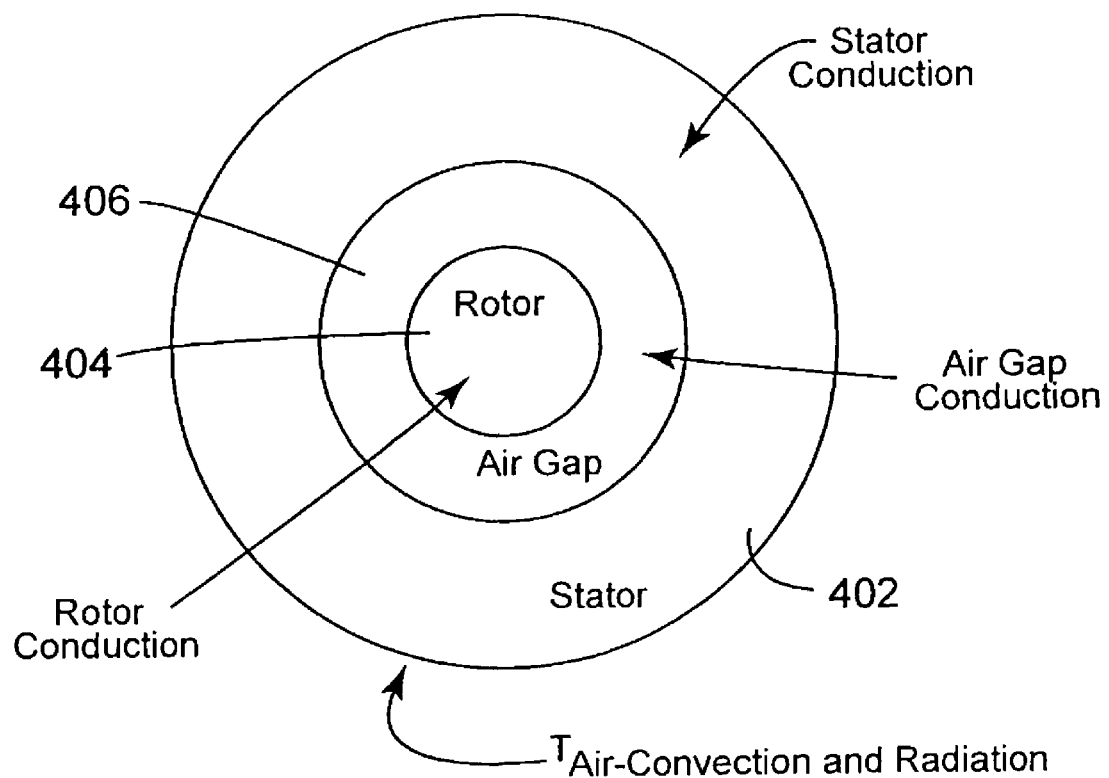
FIG. 4 is a block diagram of an induction motor heat transfer model.

Referring to FIG. 4, a heat transfer model of the motor 112 is illustratively shown. The electric motor 112 includes a stator 402 and a rotor 404. An air gap 406 is formed between the stator 402 and rotor 404 in a well known manner. These components conduct and radiate heat, which can be characterized as variables in a heat transfer model for the motor. The elements of the heat transfer model for an electrical actuator are illustratively shown in FIG. 12

For sake of illustration, each relationship δij between variables (in this case temperature) of the i-esim and j-esim function block in the heat transfer model is calculated as: $\delta_{ij} = \beta_{ij}$ Eq $\Theta_{ij} + \phi_{ij}\Theta_{ijC} + \omega_{ij}\Theta_{ijR}$, where $\beta_{ij}$ is a scalar with unit expressed as [thermal resistivity unit]$^{-1}$; and $\Theta_{ij}$ is the equivalent thermal resistance of the material between the i-esim and j-esim function blocks $\Theta_{ij}$.

The thermal resistance in uni-dimensional models is defined as $\Theta_{ij} = x/kA$, where k=overall heat transfer coefficient, W/(m$^2$ K);
A=heat transfer surface area, m$^2$;
x=thickness of the thermal conductor.

$\Theta_{ijC}$ is the resultant convection heat transfer coefficient multiplied by the area of transfer. $\Theta_{ijR}$ is the resultant radiation heat transfer coefficient multiplied by the area of transfer. $\phi_{ij}$ and $\omega_{ij}$ are scalar values.

$\delta_{ij}$ represents the physical relationship between the increase or decrease of temperature between two function blocks. The lower thermal resistivity between the i-esim and j-esim blocks, the higher connectivity they have with each other. Since the physical properties of the materials are assumed to be constant in the time, the value of $\lambda_{ij}$ does not change during the life time of the valve actuator.

Convection "$q_s$" is determined using the formula $q_s = hS(T_p - T_{ar})$.

Radiation "$q_r$" is determined using the formula $q_r = \gamma S\epsilon(T_p^4 - T_{ar}^4)$;

where "S" is the surface area of heat transfer, for example between the stator and rotor of an electrical motor, or the rotor outer surface; $T_p$ is the rotor surface temperature; $T_{ar}$ is the motor stator inner surface temperature; and "h" is the constant heat transfer coefficient.

It is noted that δ is the combined heat transfer relationship factor between any two blocks of the heat transfer model represented in FIG. 12. The heat transfer relationship factor δ is not the transition matrix coefficient defined above. Rather, the heat transfer relationship factor $\delta_{ij}$ is a real number ranging from 0 to 1. Each range has assigned a description, which is stored as text in a local non-volatile memory:
Range #1: "EVENTUAL" for 0≤δ<0.2
Range #2: "PROBABLE" for 0.2≤δ<0.4
Range #3: "LIKELY" for 0.4≤δ<0.6
Range #4: "VERY LIKELY" for 0.6≤δ<0.8
Range #5: "CERTAIN" for 0.8≤δ<1=1

Determining a State of Operation

The state of operation "Sn" is a Boolean variable defined as either 1 or 0, where "1" represents an activated state and "0" represents a deactivate state. When the variables that belong to any state of operation meet specific conditions, which can be predefined by the user through the configuration menu, the state of operation turns active. In the preferred embodiment of the present invention, the state activation is determined by a mathematical relationship, which is stored in non-volatile memory under the data structure shown below in TABLE III. The operators of the relationships are encoded. For example, if the relationship that defines the state of operation 1 (S1) indicates that the supply voltage must be equal or greater than 460 $V_{AC}$, the operator equal or greater ("≥") is illustratively encoded as "00-002-00", where the two zeros at the beginning and end means start and end of the code. Mathematical relationships and functions are encoded in order to facilitate parsing for the reporting mode and for facilitating the expert system determines the current state of operation. In another embodiment, the relationships indicated in TABLE III are pointers to software routines stored in a non-volatile memory. The pointers are encoded as routine names which the expert system interprets through an operating system and calls them for execution, as required.

In the case of electrical valve actuators, the value adopted by the state of operation that represents "normal motor running" is determined from the following Boolean logical conditions:

a) the torque T does not exceed the maximum motor stall torque;

b) the current torque value during the valve travel does not exceed close or open torque values for more than the time equivalent to 1% if the valve travel;

c) the count of high-torque level crossings counted from the start of valve travel does not exceed 3;

d) the threshold (e.g., voltage for hi-logic state measured at the input of the micro-controller) of the open and close commands are stable (not intermittent);

e) the motor does not reach hi-current alarm threshold typically specified by the manufacturer;

f) the motor winding temperature rate in travel does not exceed the historical average daily rate at rest plus 10% tolerance (pre-selectable by the user through the configuration menu); and h) the high-torque level crossings rate from start to end of valve travel does not exceed the historical average level crossing rate plus 10%;

The above listed conditions are represented by Boolean dependent variables of the measured variables, and such conditions are not considered limiting.

In addition to logical relationships, the state of operation takes into account other characterization of events made by Routines 301, 302, 302A, 302B, 302C, 303 and 304, as described below with respect to FIG. 6. The individual result of each routine is stored as a numerical value in the local memory of the expert system 132.

The expert system 132 provides by default a generic relationship for determining the current status of every state of operation, which is expressed as:

$$S_n = \text{Sign}|\Sigma^n j=1 \omega_j p_j + \Sigma^n j=1 a_i q_i + b_0|, \text{ where}$$

Sign (x) is a continuous function defined as:
Sign (x)=1, for x>0;
Sign (x)=0, for x≤90

$b_0$ is the bias factor, which can be positive or negative depending on whether the sign or the sigmoid function is used;

$\omega j$ is the j-esim weight factor of the parameter pj. This weight factor also includes a unit conversion such that all the summands are expressed in the same units; and qi is the i-esim Boolean dependent variable of the state logical conditions.

$p_j$ is the j-esim parameter characterized by block 619 of FIG. 6, as further described below with respect to Routines 301, 302, 302A, 302B, 302C, 303 and 304.

In yet another embodiment, the sign (x) function is replaced by the sigmoid function defined as:

$$Sigmoid(X) = \frac{1}{1 + e^{-\gamma x}}$$

where γ is the state-recognition threshold pre-set by the user for different states of operation.

The state of operation Sn is the n-esim state.

Referring to TABLE III below, in another embodiment the relationships and functions (e.g., states of operation) can be routinely implemented as a software program resident in non-volatile memory. For example, the relationship "Rel.10" is defined as:

if (0<=x<=100) and (3<=P=<15), then Rel.10:=TRUE where "x" is the valve position and "P" is the control pressure of a 3 to 15 psig that is sent to the actuator from a valve positioner.

The relationships can be stored in the non-volatile memory as programs. In the above expression, the variable labeled as "x" varies from 0% to 100% while "P" ranges from 3 to 15 psig. Both variables, namely "x" and "P", can be read directly from analog input sensors connected to the analog input channel. Each relationship can execute various types of functions including verifications of whether a variable value is found within a particular range.

Referring again to TABLE III, the current result of each of the "N" amount of functions executed by a discrete inputs relationship is stored, in a non-volatile memory, in a discrete status register of size "Q" (where "N" and "Q" are integers greater than zero). For example, the relationship "Rel.21" has an associated discrete status register DSR.21, which is defined as an array of Boolean variables.

Similarly, the relationships that utilize analog inputs have an analog status register, which stores the result of the functions executed in an analog status register. The current state register is formed by three registers: the state code, the results of verifications of the discrete variables, and the results of the verifications of the analog variables.

Referring to TABLE III, if the state S85 represents only a malfunction such that Rel.30 and Rel.31 are nil value and Rel.32 performs the following variable verifications:
IF (C==0) AND (O==0) AND (I>0.00) AND (T>0.00) THEN
S85:=1//TRUE
DSR 32 [1]:=0//FALSE
DSR 32 [2]:=0//FALSE
ASR 32 [1]:=1//TRUE
ASR 32 [2]:=1//TRUE
END IF
where,
  C: Close command boolean
  D: Open command Boolean
  I: motor current floating point
  T: motor torque floating point
  DSR [1-100]: boolean array [1-100]
  ASR [1-100]: boolean array [1-100]

The user can define the size of the discrete status register and analog status register as well. The state code is predefined by the user.

The discrete status register (DSR) 32 has as a first field DSR32[1] to represent the status of the variable "C" and the second DSR32[2] for "O". The ASR32 utilizes the first field ASR[1] to represent the result of the (I>0.00) and the second ASR[2] for (T>0.00).

Thus, as shown below, the current state register is formed by three registers including the code register, the DSR and the ASR. Each state register can have more than one DSR and more than one ASR associated to it.

TABLE III

| | Illustrative States Table | | | | | |
|---|---|---|---|---|---|---|
| | State | | Variable Zone Condition | | | |
| State Tag | State Code/Message | Variable Tag | Normal Zone | Deviation Zone | Malfunction Zone | Failure Zone |
| S1 | Code 1/ Message 1 | X, P | Code Rel.10 | Code Rel.11 | Code Rel 12 | Code Rel. 13 |
| S20 | Code 2/ Message 2 | X, C | Code Rel.20 | Code Rel.21 | Code Rel.22 | Code Rel. 23 |
| S85 | Code 3/ Message 3 | C, V | Code Rel.30 | Code Rel.31 | Code Rel 32 | Code Rel. 33 |
| ... | ... | ... | ... | ... | ... | ... |
| S17 | Code 10/ Message 10 | P, X, V | Code Rel.100 | Code Rel.101 | Code Rel 100 | Code Rel. 103 |
| ... | ... | ... | ... | ... | ... | ... |
| Sn | Code n/ Message n | P, C, X | Rel.n | Rel.n + 1 | Rel. n + 2 | Rel.n + 3 |

For each sub-model, a plurality of methods for calculating $\lambda$, is provided. The methods consist of a plurality of routines. The Expert System 132 can execute the routines of two or more methods concurrently. Routine 114 controls which routine(s) are enabled, which one(s) are disabled and when to switch from one routine to another, as described below in further detail. By using the value of $\lambda$ calculated by each method as inputs and the past values of $\lambda_{Rij}$, the expert system 132 calculates a resultant $\lambda_R$. The resultant $\lambda_R$ is stored in non-volatile memory.

In one embodiment of the present system, the expert system 132 utilizes three methods for calculating $\lambda_{Rij}$ which are designated the "master" method, the "slave" method and a transition path estimator termed the "Index-K" method, the latter being executed by routine 112, as described below in further detail.

Master Method

Figure 5:
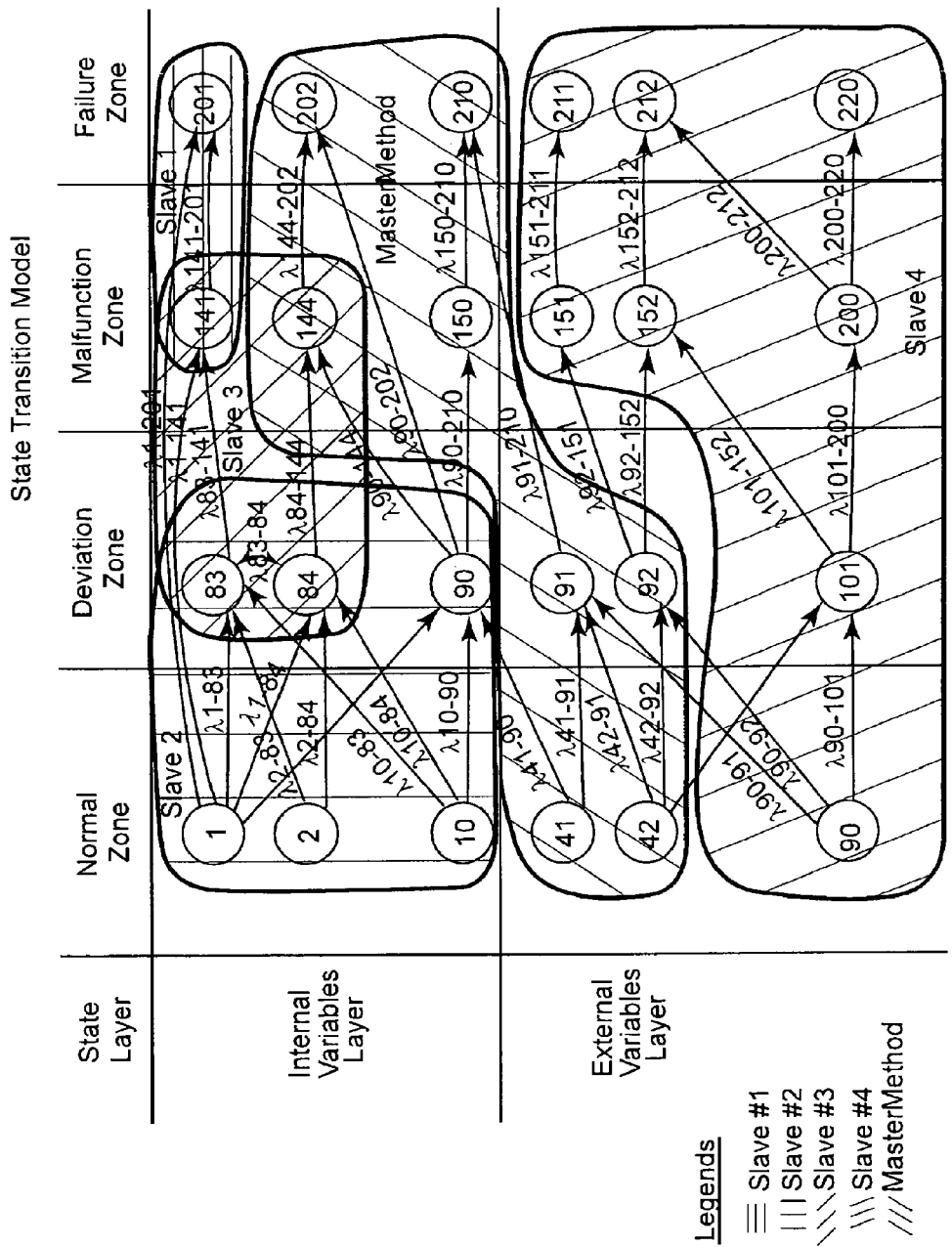
FIG. 5 is a state transitional model illustrating various configurations of deterministic and statistical routines which can co-exist in the same actuator.

The master method is based on the feed-forward graph structure depicted in FIG. 5. The master method allows the user, through the system's configuration menu, to enter known $\lambda$ values as weight ranges, which are alternatively called "likelihood" for the Slave Method. The weighted upper and lower range limits can also be set by the user. By default, the system provides five pre-defined ranges as follows:

Range #1: "EVENTUAL" for $0 \leq \lambda < 0.2$
Range #2: "PROBABLE" for $0.2 \leq \lambda < 0.4$
Range #3: "LIKELY", for $0.4 \leq \lambda < 0.6$
Range #4: "VERY LIKELY" for $0.6 \leq \lambda < 0.8$
Range #5: "CERTAIN" for $0.8 \leq \lambda \leq 1$ By means of the configuration menu for transition paths and states, the user has the capability to enter known states, transition paths and relationships which are already known based on past experience or taken from data previously specified by the actuator manufacturer.

TABLES IV-A and IV-B shown below illustrate the data structure used to store the data entered by the user. In order to facilitate the data inputting process, the user has the option to enter time-independent data and time-dependent data in different tables, e.g., TABLES IV-A and IV-B. The time-dependent data includes relationships of the end-of-life of components and relationship involving the usage of a particular component of the actuator, for example, the effect of high operating temperature in the life-time of electronic components. The user is able to enter in TABLES IV-A and IV-B as many transition paths per state as the user desires.

TABLE IV-A

Example Time-Independent Known-Failures/Malfunctions/Deviations

| State # | State Name | Description | Measured Variables (Sensor Inputs) | Relationship | $\lambda$ ij | Likelihood/ Weight |
|---|---|---|---|---|---|---|
| 1 | Motor Stalled | Required operating valve torque exceeds maximum motor torque | Torque | Rel20. Torque >= Maximum Stall Motor Torque | $\lambda$ 16<br>$\lambda$ 18 | 0.2<br>0.3 |
| 2 | Un-Commanded Actuator Action-Close | Actuator closes in absence of close command | Close command, position indication | Rel 30: If C <> TRUE and Xn<>Xn + 1 then Rel = TRUE | $\lambda$ 210 | 0.3 |
| 3 | Internal Battery Low | Battery voltage low | Vb | Rel34: if Vb < 8.5 v Rel34 = TRUE | $\lambda$ 343 | 0.4 |
| ... | ... | ... | ... | ... | ... | ... |

Illustratively shown in TABLE IV-A above, Xn indicates actuator stem position at time "n"; Xn+1 indicates actuator stem position at time n+1; and "C" indicates a close command in the form of a boolean variable.

TABLE IV-B

Time-Dependent Known-Failures/Malfunctions/Deviations

| State # | Name | Description | Variables | Relationship | $\lambda$ ij | Likelihood/ Weight |
|---|---|---|---|---|---|---|
| 15 | Motor end-of-life | Motor reaches end of life | Relay action Counter | Rel 50: If RC >=500,000 then Rel 50 = TRUE | $\lambda$ 1528 | 0.9 |
| 18 | Early end-of-life control board for temperature | Control board reaches early end-of-life due to long term high operating temperature | Tc | Rel 10: If Tc average >70 C then | $\lambda$ 1830 | 0.5 |
| 25 ... | ... | ... | ... | ... | ... | ... |

The user can select the master method by knowing the weight value (i.e. likelihood for the Slave Method) of each transaction path. The master method enables determination of adjacent states of the actuator. For each state of operation, failure $F_j$, malfunction $M_s$ and deviation $D_q$, equations 1a, 1b and 1c below respectively show the mathematical expressions of the master method.

In one embodiment of the present invention, the transition paths and the states of operation of the master method are arranged in a neural network architecture, where each state of operation, i.e., deviation Dq, malfunction Ms and failure Fj are expressed by equations [1a] through [1c] below.

Through the main menu the user can enter the values from each state. The user can enter new states by adding relationships as a software program stored in a non-volatile memory.

In one embodiment, a sign function (Sign (x)) is used for activating a state of operation, and can be used here for forecasting purposes.

Sign (x)=0 for x<0
  Sign (x)=1 for x≥0
  $F_{oj}$ is the bias for the j-esim Failure
  $D_{os}$ is the bias for thes-esim Deviation
  $M_{oq}$ is the bias for the q-esim Malfunction $$F_j = \text{sign} |\Sigma^n_{n=1} \lambda_{nj} N_n + \Sigma^m_{d=1} \lambda_{dj} D_d + \Sigma^p_{m=1} \lambda_{mj} M_m \pm F_{0j}| \quad \text{[Equation 1a]}$$

$$M_s = \text{sign} |\Sigma^n_{r=1} \lambda_{rs} N_r + \Sigma^m_{t=1} \lambda_{ts} D_t \pm M_{0s}| \quad \text{[Equation 1b]}$$

$$D_q = \text{sign} |\Sigma^n_{k=1} \lambda_{kq} N_k \pm D_{0q}| \quad \text{[Equation 1c]}$$

State Forecasting

The forecasting functionality is only available during training mode of operation 12 of FIG. 3. The purpose of this functionality is to allow the user to simulate the behavior of the actuator in future operating conditions such that the likelihood or proximity (i.e., temporally) to a deviation, malfunction or failure can be predicted based on the simulated scenario defined by time-series of inputs applied to the input channels.

The system provides through the main user menu a state forecasting functionality which is executed by the expert system 132. For this purpose the user selects forecasting mode, provides a time series of inputs in all the channels (i.e., analog, discrete and digital channels) and selects a time $\Delta T$ which represents a time in the future starting from the current time "To". The system estimates the future status of states at time To+$\Delta T$.

Figure 14:
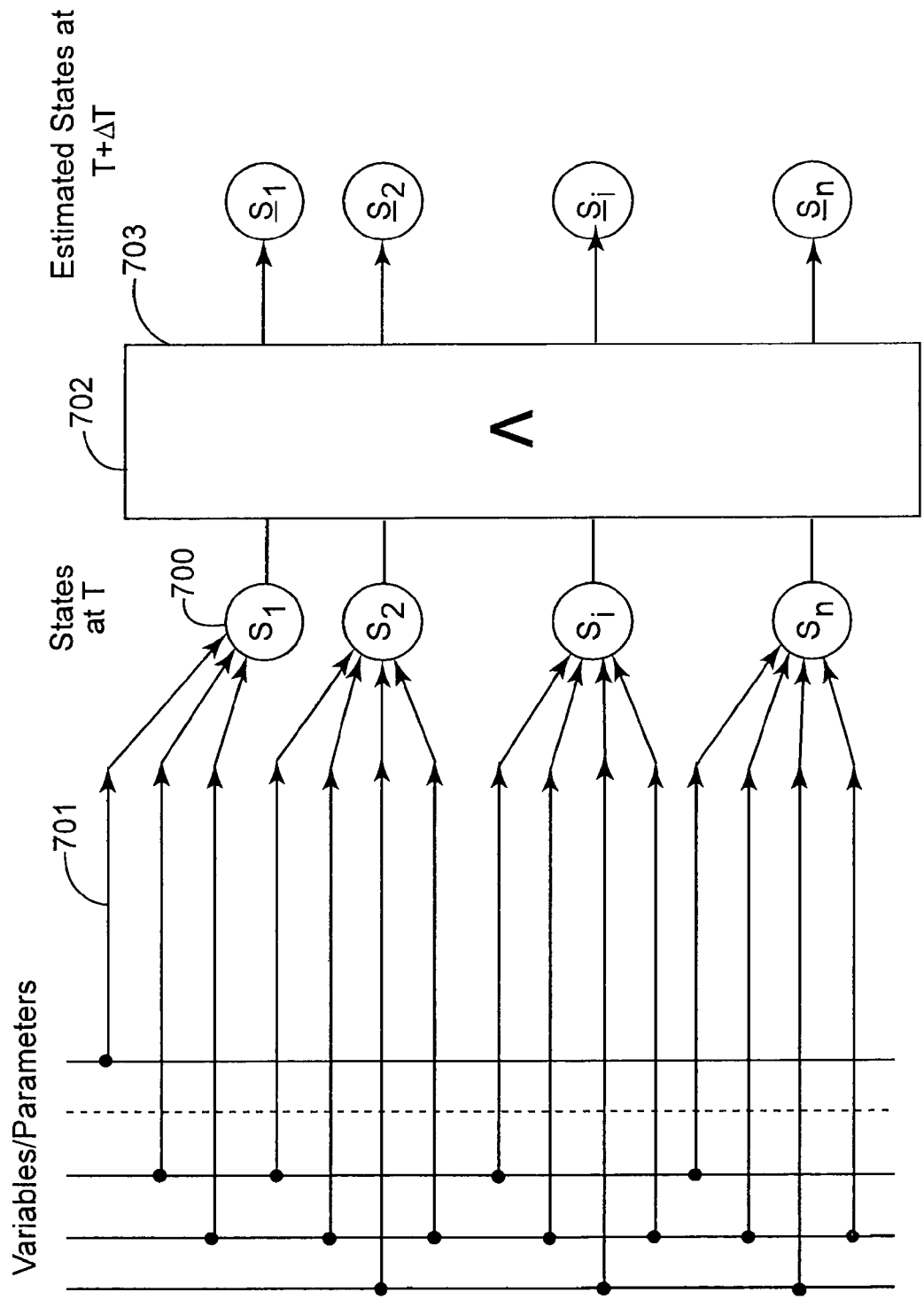
FIG. 14 is a block diagram illustrating data flow for forecasting future states of operation.

Referring to FIG. 14, the illustrative diagram represents the data flow from the variables and parameters 701 obtained from step 619 (FIG. 6) to the activation of states 700, and the forecast of future states 703 by using the transition matrix $\Lambda$ 702 (e.g., such as the transition matrix 200 illustrated in FIG. 2). While forecasting future states, the expert system first calculates the current state of operation based on the current status of all the variables of the system in all the active sub-models, for all active subjacent physical models. Next, the expert system calculates the new $S_{T+1}$ for the new set of inputs at time T+1.

Next, it stores the resultant $S_{T+1}$ in a non volatile memory and repeats the $S_{T+2}$ for the new set of input data at time T+2 until T+$\Delta T$. The stored $S_{T+n}$ are available in the non-volatile memory for further processing by the user.

Slave Method

Referring to FIG. 9, the slave method provides a probabilistic failure model for each of the function blocks (shown in FIG. 9) based on the failure rate of individual components of the actuator. In a preferred embodiment, the slave method is mainly used to estimate transition paths of the failure states due to the majority of information available for this method is related to the probability of failure of a component rather than its deviation from specifications or its malfunction. In the valve actuator industry, manufacturers provide the MTBF (mean time between failures) or probability of failure or failure rate for electrical, electronic, and some of the mechanical components of a valve actuator. Thus, from the data provided by manufacturers, the MTBF of each function block shown in FIG. 9 is estimated by the user.

The MTBF data for each function block is entered by the user from the configuration menu. TABLE V shows an example of the data structure offered to the user by the analyzer in the configuration menu to enter MTBF for each function block. By accessing the configuration menu, the user selects the related-states of operation for each function block of the actuator. The system provides the list of states available in the memory already defined by the user.

TABLE V

MTBF Data Entry Table

| Function Block# | Function Block name | MTBF [hours] | Related States |
|---|---|---|---|
| 1 | Control Board | 100,000 | S1, S4 |
| 2 | Input Board | 120,000 | S6, S7 |
| 25 | ... | ... | ... |

Once the available MTBF values of each of the function blocks are entered together with the related states of operation for each function block, the analyzer is ready to start calculating transition paths. For such purpose, the user must select from the configuration menu the option "START TP RUN", meaning start transition path calculation run. Once the process starts, the current state of operation is determined by running all the relationships of the related states listed in TABLE V, shown above.

Next, the probability of each related state listed in TABLE V and transition paths are calculated by applying a simple failure probability model for the function block diagram of FIG. 9 as described below:

Slave-Method λij Calculation

Similar to the master method, the slave method enables the determination of transition paths from the current state of operation by estimating the probability of the actuator to move from its current state Si to another state Sj. In this manner, each λij of the structure of FIG. 1 (or FIG. 9), is included under this method with a "likelihood" that the actuator changes its state of operation from state "i" to state "j". In this method, λij is calculated as a conditional probability as expressed below as:

$$P(Sj|Si) = \frac{P(Sj \text{ and } Si)}{P(Si)} = \lambda ij \quad \text{Equation [1d]}$$

meaning the probability that the actuator moves to the state "Sj", given that the actuator is currently found at the state of operation "Si". Only transition paths between specific states of operations defined by the sub-models are considered estimated by the slave-method.

Slave-Method State of Operation Probability Calculation

The probability that the actuator is found at a state Si (i.e., i-esim state) is understood as the probability that the function blocks that describe the state Si comply with the relationships that define state Si. Since the majority of states addressed by the slave method are defined as actuator failures, such relationships become failure conditions. Hence, the state Si is described, more specifically, by the probability of failure of individual actuator components. For example, assume "Si" is a motor driver failure, and the motor driver is formed by electromechanical components, which are linked to other components of the actuator as shown in FIG. 9. Hence, the state Si representing "motor driver failure" results from the probability of failure of various function blocks, which are interconnected in series or parallel configurations.

Thus, the probability of failure of the configuration (i.e., series or parallel) of the function blocks of the state Si is calculated through a reliability model of the function blocks. The reliability model takes into account the time-dependent nature of actuator component failures. In a preferred embodiment, the reliability model of the slave method is defined as follows:

$$R(t) = e^{-\mu t} \qquad \text{Equation [1e]}$$

where $\mu = 1/\text{MTBF}$ of the function block and "t" is the time. When "n" amount of function blocks are configured in series, the total reliability of the system formed by "n" function blocks is expressed as:

$$R(t) = \prod_{i=1}^{n} R(t)_i \qquad \text{Equation [1f]}$$

and when "n" amount of function blocks are configured in parallel, the total reliability of the system formed by "n" function blocks is expressed as:

$$R(t) = 1 - \prod_{i=1}^{n} (1 - R(t)_i) \qquad \text{Equation [1g]}$$

In another embodiment, the reliability calculations are based on the Weibull probability of failure distribution function instead of the exponential decaying function indicated above (see equation [1e]).

Once the reliability of the total system formed by several function blocks is calculated for the present time, the resultant probability of the state "Si" is calculated as $P(Si) = 1 - R(T_0)$, where $R(T_0)$ is the probability that the system formed by n function blocks work for a period of time $T_0$ starting since the time when the actuator was put in operation until the present time.

Next, the transition paths between the states defined by the sub-models, $\lambda ij$ are calculated by applying the expression set forth above in equation [1d] and by utilizing the activation of states as described above. The estimated transition paths values are stored in the non-volatile memory under the structure of TABLE III.

Index K Method

K is a matrix of m-rows by n-columns of identical structure to the $\Lambda$ matrix above. Each element of the matrix $K_{ij}$ represents the transition path between the i-esim state Si and the j-esim state Sj. $K_{ij}$ is one of the components of the resultant path $\lambda_{ij}$. The i-esim state Si and the j-esim state Sj are any two pairs of the states depicted in FIG. 1. The dimension of K is dynamic such that if a new state of operation is identified by the method 200 (described below) or added by the use, the dimension of K is modified to include all of the necessary new elements that reflect the new transition paths.

In another embodiment, the master method is based on deterministic equations that relate one state of operation to another state of operation, and the slave method is statistical. The relationship between the master method, slave method and $\Lambda_R$ can be expressed mathematically as follows:

$$\Lambda_{R[t]} = f(\Lambda_M, \Lambda_{S1}, \ldots, \Lambda_{Sn}, \Lambda_{R[t-1]}, \Lambda_{R[t-1]}, \Lambda_{R[t-2]}, \Lambda_{R[t-n]}, \ldots, K) \qquad [1]$$

where,

"f" is a mathematical relationship between transition paths of the master method, a plurality of slave methods from S1 to Sn, the past calculated values of transition paths, and the path estimator method;

$\Lambda_M$ is the $\Lambda$ matrix calculated by the master method;

$\Lambda_S$ is the $\Lambda$ matrix calculated by the slave method;

$\Lambda_{R\,[t-n]}$ is the n-esim past resultant $\Lambda$ matrix;

$\Lambda_N$ is the $\Lambda$ matrix calculated by the N-esim slave method, when there is more than one slave method; and K is the $\Lambda$ matrix calculated by Index-K estimator of routine 112.

FIG. 5 shows shaded areas representing the different possible configurations of master and slave methods which can coexist in the same actuator in different states of operation. FIG. 5 also shows how the coexistence of methods works in the system. Specifically, while using the deterministic technique, certain paths between states exist.

Similarly, while using a statistical technique, other paths may exist, and there can be overlap with the deterministic technique. There are specific routines to control how the overlap happens. For example, a penalty routine 114 controls how the overlapping occurs and the description below with respect to FIG. 7 further explains the overall interrelation between the master method, slave method and the Index K routine.

Operating Modes

In one embodiment, the expert system 132 has five (5) modes of operation, which were generally described above with respect to FIG. 3. The five modes of operation include:

Mode 1: Analyzer Mode (14).
    Mode 2: On-Event Mode (18)
    Mode 3: Report Mode (19)
    Mode 4: Configuration Mode (8)
    Mode 5: Training-Only Mode (12)

Referring now to FIG. 6, a flow diagram is shown of a method 200 for analyzing, detecting and recording events occurring with a valve actuator of the present system. The method 200 includes three of the five modes of operation described with respect to FIG. 3, including an analyzer mode 14, an on-event mode 18, and a reporting mode 19. The method 200 detects the events that take place in a valve actuator 100. If no event is detected, the expert system 132 operates in Analyzer Mode (Mode 1) 14.

When an event is detected at step 631 of method 200, the expert system 132 enables the On-Event mode (Mode 2) of operation 18. Once all the routines of the On-Event mode (Mode 2) 18 are executed and completed, the expert system 132 enables the Report Mode (Mode 3) 19 and disables the On-Event mode (Mode 2) 18. Finally, after executing and completing all the Report Mode (Mode 3) routines 19, the expert system 132 disables Report Mode (Mode 3) 19.

The expert system 132 can execute, in parallel, the routines of Analyzer Mode 14 and Report Mode 19, or On-Event Mode 18 and Report Mode 19. When the system is in Configuration Mode 8 (Mode 4), the other modes are disabled. The system operates in one more additional mode called Training-Only Mode 12 (Mode 5) which can be selected by the user through a configuration menu. When the system is in the Training-Only Mode 12 (Mode 5), the other modes are disabled.

Mode 1. Analyzer Mode

In Analyzer Mode 14 (Mode 1) of operation, three (3) types of inputs are processed by independent channels, which are:
a. the analog input channel,
b. the discrete input channel, and
c. the digital data channel.
a. The Analog Input Channel Referring to FIG. 6, in the analyzer mode 14, at step 610 the inputs are read. At step 611, the analog inputs are first normalized, and at step 612, converted to a digital word of N-bits. At step 613, the digital word is stored in a buffer memory. The capacity of the buffer memory is automatically adjusted by a Buffer Capacity Limit Routine. The Buffer Capacity Limit Routine determines the amount of events per unit of time and it adjusts the address of the last memory position of the input signal buffer according to the following expression:

$$M_i = \frac{q_i}{\Delta t} \overline{n_i} \overline{d_i}$$ Equation [2]

where $q_i$ is the amount of events at the input "i" per unit of time $\Delta t$; $n_i$ is the average amount of representative samples of the input "i" per event, and $d_i$ is the average time duration of the events at the input "i". A representative sample is one taken within the Shannon-Nyquist sampling period for the input "i". Alternatively, sampling rates that are higher than the ones required to meet Shannon-Nyquist can be used.

At step 614, a Wake-Up Routine determines whether or not event detection (at step 631) is activated and the input channel to activate. Typically, similar types of sensors, for example 4-20 mA, are connected to specific modules or channels. The Wake-Up Routine 204 (described further with respect to FIG. 11) will trigger the routine event detection and in turn will enable which input of the analog channel (e.g., electronic board or circuit) in which the event detection routine will be running. In FIG. 6, arrow 615 is the sensor signal converted to a digital word sent to the wake-up routine and arrow 616 is the read command to the buffer memory. Arrow 617 indicates the command to the detection wake-up 614 to initiate detection from another sensor. Arrow 618 indicates the activation command of event detection at step 631

The On-Event Mode

Once a potential event is detected by the wake-up routines (FIG. 11), the detection routines are enabled. Meanwhile, the routines of analysis mode 14 remain enabled in order to allow buffering input (step 613) in a temporary memory in advance of any potential event that may occur. As shown in FIG. 6, the Wake-up routine 614 activates the event detection 631 and characterizes the event at step 619 only when a suspicious or potential event (i.e., deviation, malfunction or failure) is sensed. The characterization of the event is verified at step 622 with the expert system 132 by sending a request to the expert system 132 via arrow 621 and receiving a reply from the expert system 132 at via arrow 620. If the expert system 132 does not verify the event, the input channels continue buffering data at 613 and the expert system 132 remains in analysis mode 14 as indicated by arrow 625.

Detection is the act of recognizing a pre-identified attribute of the signal but it is not a full characterization of it. Therefore, the expert system 132 first detects certain attributes of the signal and it passes the request to the expert system 132 that recognizes the full spectrum of attributes and triggers the detection in the other sensor channels. Since the detection is made in real-time, full characterization of the signal requires verification of its attributes by the expert system 132. If the expert system 132 verifies the event, then the detection is initiated to the other sensors at step 623, and at step 632 the input is recorded, at step 626 the message is recorded, at step 627 the time is recorded, and at step 633 the related events are searched.

Then, report mode 19 begins where the master/slave matrixes Λ are updated at step 634, an event index is recorded at step 629, and the Index-K is recalculated at step 628. The fault-analysis report is generated at step 630.

Figure 7:
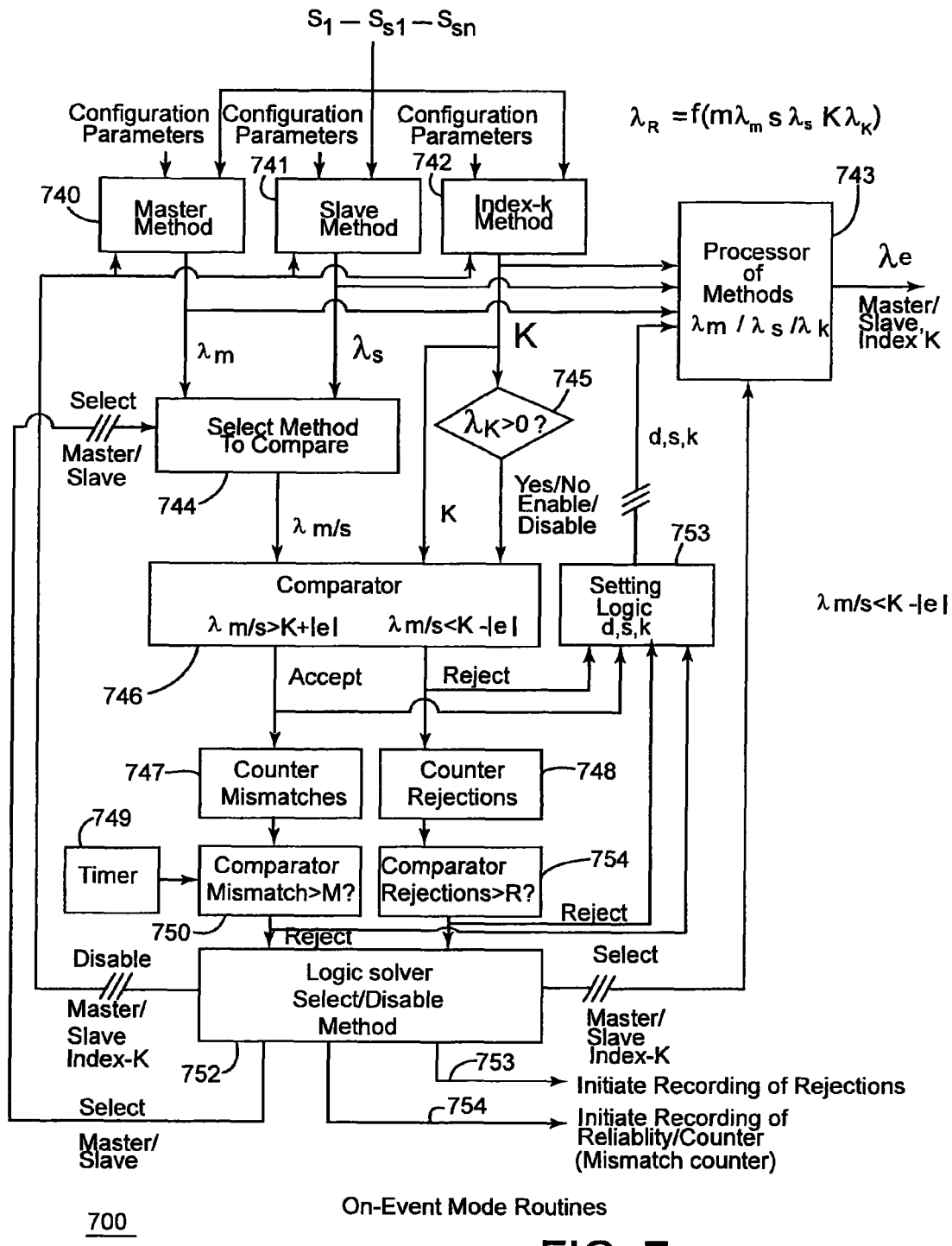
FIG. 7 is a block diagram of a decision tree for On-Event Mode routines of the present system.

Referring to FIG. 7, a flow diagram of a decision tree 700 for On-Event Mode routines 18 of the present system is illustratively shown. In particular, block 740 represents the execution of the master method, block 741 represents the execution of the slave method, and block 742 represents the execution of the index-K routine. Each of the blocks 740, 741 and 742 receives configuration parameters entered by the user through the configuration menu. Once blocks 740 through 742 complete the λ calculation, block 744 selects which method is going to be compared against the k value calculated by index-K. The selection for master or slave method is controlled by block 752. The initial state for the selector is the master method. Prior to starting the comparison between λ, as calculated by the master method 740 or the slave method 741 against k by the Index K method 742, block 745 verifies if k is greater than zero (0). This is done in order to ensure that sufficient events have occurred between the i-esim and j-esim states. Next, if k is greater than zero, the comparison function block 746 (i.e. comparator) is enabled.

The blocks 746 to 753 determine the validity of the selected method by accepting or rejecting the other methods based on pre-established criteria as discussed below in further detail. The diagram below shows the acceptance and rejection regions for lambda (λ) calculated by the selected method.

Acceptance Region (Until Timer 749 Reaches End-of-Observation Period)

$\lambda_k+|e|$–Acceptance region $\lambda_k$ $\lambda_k-|e|$–Rejection region

Rejection Region

Block 746 compares the lambda value calculated by the selected method in block 744 and provides an ACCEPT signal to the setting block 753 to indicate that the selected method is still considered valid whenever lambda of the selected method is greater than the Index K lambda. This normally occurs at the beginning of the functioning of the valve actuator analyzer 130 when lambda values obtained from Index K have low values, since no events have occurred yet and there is no operational history recorded. As the actuator 110 and valve 102 start to function (i.e., operate), the analyzer 130 gains experience in the sense that the transitions paths between detected states of operation are being counted and recorded by the index K routine, and thereby reflecting the actual history of the valve actuator 110. The selected method (whether being deterministic or statistic) is considered to be valid provided that each of the calculated lambda's is greater than λk+|e| and until the timer 749 reaches the value of "end-of-observation period" or the maximum of mismatches "M" is reached (lambda of the selected method is found above λk+|e||). M represents the maximum amount of tolerable "out-of-range" events for lambda calculated by the selected method. This is because the out-of-range events can be tolerated for the observation period of time until λk reaches more realistic values. It is expected that after a sufficient amount of time has passed, λk reaches the value that represents the most realistic calculation for the specific transition path between two states of operation. Conversely, when the lambda calculated by the selected method does not reach λk, the selected method does not fit the real-life operation. When the rejection condition reaches the maximum tolerable value R, the method is considered "rejected".

The block 746 triggers the count by one in the counter 749. For further verification, the block 750 counts the amount of mismatches or "out-of-range" events and rejects a method when the count is greater than the predetermined value "M". If M is exceeded, the block 750 sends a REJECT signal to the logic solver 752, which in turn selects the next available method.

Similarly, the block 748 counts the amount of rejections between lambda calculated by the selected method against the lambda calculated by Index K minus a tolerance or error noted as |e|, which can be set by the user through the configuration menu. A comparator 751 receives the count from counter 748 and compares it against a preset value "R", which can also be configured by the user. If the result of the comparison exceeds the value R, the method is rejected. The comparator block 751 sends a REJECT signal to the logic solver 752 which in turn selects the next available method.

When the rejection is reached the block 753 calculates the new settings for each method. Referring to block 753 of FIG. 7, the configuration parameters are collectively named as "d" for the deterministic method, "s" for the statistical method, and "k" for the Index-K method.

The new parameters are referred to the totality of the configuration parameters available for setting by the user from the configuration menu for each method. In the configuration method, the user can select and enter the value of the parameters desired to correct after the rejection of a method is reached. This can be illustratively accessed in the configuration menu as "SETTING AFTER METHOD REJECTION". This sub-menu allows the user testing new strategies for setting the master, salve and K methods with new values that did not work as expected.

Finally, the methods are calculated again by the processor of methods 743, which can be implemented as software or on a hardware microprocessor programmable unit in any of the embodiments of this system.

In a preferred embodiment, three methods are available. The logic solver 752 selects the next available method from a cyclic table by moving one position in the table. Each method is assigned to a number from 1 to 3. The user can configure which method has associated each table number to it. In another embodiment, several types of master and slave methods can be provided and the logic solver 752 can select from a greater number of methods.

(112) Index K Routine

The Index K routine is executed by block 742. It consists of counting the amount of consecutive occurrences $Q_{ij}$ of the states $S_i$ and $S_j$ within a predetermined time period which is stored in a timer in TABLE II. TABLE II provides one timer per $K_{ij}$ assuming that the states $S_i$ and $S_j$ were previously detected and characterized by the method 200. Next, the total number of occurrences of each one of the states up to the current date is calculated as follows $Q_i+Q_j$, where $Q_i$ the amount of occurrences of state $S_i$ and $Q_j$ is the amount of occurrences of the state $S_j$. Next, the value of the $K_{ij}$ of the states is calculated according to the following expression (Eq. 3):

$$K_{ij}=Q_{ij}/(Q_i+Q_j) \qquad \text{Equation [3]}$$

Auto-Swapping and Performance Measuring

Throughout the operational history of the valve actuator, the expert system 132 has the ability to swap the master and slave models with each other, as well as the slave methods to swap among themselves. The expert system 132 can perform swapping automatically when one method does not meet a pre-selected performance level. The performance of the methods is measured according to following parameters:

Reliability: is the amount of mismatches between $\lambda_{ij}$ and $K_{ij}$ within a predetermined time period provided that $K_{ij}$ is greater than zero. Reliability is used by the system to disable a method in a particular transition path if that method deviates from K during a period of time. Mismatch is the result of the comparison made by Routine 113.

Accuracy: is the distance between the resultant λ and $K_{ij}$. In one embodiment, distance $D_{ij}$ is calculated according to the following expression (Eq. 4):

$$D_{ij} = \left| \sqrt{\sum_{n=0}^{N} (\lambda_{ij(t-n)} - k_{ij(t-n)})^2} \right| \qquad \text{Equation [4]}$$

Accuracy allows transition-paths to be identified that need to be corrected when deviations between K and λ are detected. The corrections in the value of λ are made by the Accuracy Routine 113.

Stability: is the number of times that a calculation method was rejected in a particular $\lambda_{ij}$ during a given time period. Stability indicates the suitability of a method competing with one or more methods over a specific transition path during a predetermined period of time. Stability is measured by the following expression (Eq. 5):

$$\eta_{ij}=R_{ij}/\Delta t \qquad \text{Equation [5]}$$

where $R_{ij}$ is the number of rejections of a given method within the period of time Δt.

(113) Accuracy Routine

Referring to FIG. 7, processor 743 reads the value of $K_{i,j}$ and then compares its value against each $\lambda_{i,j}$ of the master and slave methods separately. The comparison is performed during a time interval predetermined by the user. If $\lambda_{i,j}$ of each method (master and slave) is greater than $K_{i,j}$ after the time interval has elapsed, the value of $\lambda_{i,j}$ of the method is set at $K_{i,j}$.

(114) Penalty Routine

Referring to FIG. 7 and Eq. 6 below, block 745 verifies that $\lambda_K$ is greater than zero and the selector 744 is switched to master method input. Next, block 746 compares $\lambda_M$ from 740 against K from 742. For example, if $\lambda_M$ is greater than K plus an absolute error margin greater than zero, which has been defined by the user, it is expected that more transitions from origin state to destination state will occur in the future; otherwise, the method is penalized by setting "m" at zero.

Next, the slave method is compared by changing the current input of selector 744 to the slave (statistical) method input which is done by the logic solver 752. The identical procedure is then repeated for "s".

If both methods are penalized, then "k" is set at 1, in turn both "m" and "s" set at zero value as shown in Eq. 6 below. For example, if $\lambda_{M_{i,j}}=0.2$, representing "EVENTUAL", and $K_{i,j}=0.5$, representing "VERY-LIKELY", the deterministic (master) method is disabled in the particular transition path from State $S_i$ to State $S_j$.

The logic solver 752 for selecting/disabling and/or methods determines which transition path and which method to disable. This solver 743 also sends the signal to the processor 743 in order to execute the following mathematical expression that relates $\lambda_D$, $\lambda_S$, and $\lambda_K$, and to select the acceptable method.

$$\lambda_R = f(m\lambda_M, s\lambda_S, k\lambda_K) \qquad \text{Equation [6]}$$

where the terms have the meanings defined above.

The settings of the multipliers "m", "s" and "k" are executed by the logic solver 753. In one embodiment, the logic executed by the solver 752 and processor 743 are executed by one or more microprocessor(s).

In the preferred embodiment, $\lambda_R$ is calculated according to the following expression (Eq. 7):

$$\lambda_R = (m\lambda_M + s\lambda_S + k\lambda_K)/3 \qquad \text{Equation [7]}$$

(115) Reliability Routine

Referring to FIG. 7, a plurality of counters symbolized in the block 747 keep the current count of mismatches between K and λ from each method. If the counter 747 exceeds the pre-set value M, then the method is disabled on that particular transition path and the method of the lowest count of mismatches is enabled. The logic solver 752 also sends the command to initiate recording in the local non-volatile memory of the current value in the counters 747 and 748 along with the value of the pair of indexes "i" and "j" of the transition path $\lambda_{ij}$.

(116) State Updating Routine

Routine 116 identifies the totality of active states utilized by all the calculation methods of the system. In one embodiment, this identification is performed by a bit-to-bit XOR gate that compares the ID code of every state against the state ID code of the other methods. TABLE VI includes the origin method, current method, descriptive message, identification code and the time of creation for each state.

TABLE VI

Updated State List

| State Tag# | Origin Method | Current λ Calculation Method | ID Code | Message | Creation Date/Time |
|---|---|---|---|---|---|
| S1 | Master | Master | 001MN | "Input Card Normal" | DD/MM/YY HH:MM:SS |
| S5 | Index-K | Index-K | 005KD | "Inner Temperature Deviation" | DD/MM/YY HH:MM:SS |
| S35 | Slave 1 | Slave 2 | 035S2 | "Input Card Malfunction" | DD/MM/YY HH:MM:SS |

The ID code is formed as follows:
[XXX] [Y] [Z]
XXX: State Tag#
Y: Current λ Method, Master, Slave, Index-K
Z: Event type, Normal, Deviation, Malfunction, Failure (118) Stability Routine The stability routine counts the amount of times that a method is rejected in a particular $\lambda_{ij}$ during a given time period. It is calculated according to the stability equation [5] above. This routine also counts the amount of times for other methods in the $\lambda_{ij}$ during the identical time period and produces a ranking of the most frequent methods. When the value of η exceeds a limit, the method is disabled for that $\lambda_{ij}$, a new value for the limit is set and becomes the master status.

(119) Performance Scoring Routine

This routine provides a performance indicator for $\lambda_{ij}$ as a summation of the values of accuracy, reliability and stability. It records the result of the summation in TABLE II as a performance scoring message for $\lambda_{ij}$, i.e., "EXCELLENT", "VERY GOOD", "GOOD", "POOR" and "BAD".

$$P = \sum_{n=1}^{3} \alpha_n p_n \qquad \text{Equation [8]}$$

(202) Message Detection Wake-Up Routine

In one embodiment, the communication port is serial RS-232. The communication port is scanned for a request-to-send (RTS) signal from the transmitting source. Once the RTS is received and the handshaking between the transmitter and the receiver is completed, Routine 201 (Message Reading Routine) is initiated. In another embodiment, other types of hardwired communication can be used. The messages along with their individual time stamps are stored in a buffer memory.

(203) Discrete Detection Wake-Up Routine

The discrete input channel functions the same with both normally closed and normally open contacts. The inputs are scanned by a multiplexer to detect the change in the contact current. Once a change is detected, Routine 200.C is initiated. The discrete inputs are stored in the buffer memory as a register of "N" bits, one bit representing each of the "N" discrete inputs. The discrete inputs are stored along with their time stamps in the discrete inputs register.

(204) Analog Detection Wake-Up Routine

Figure 11:
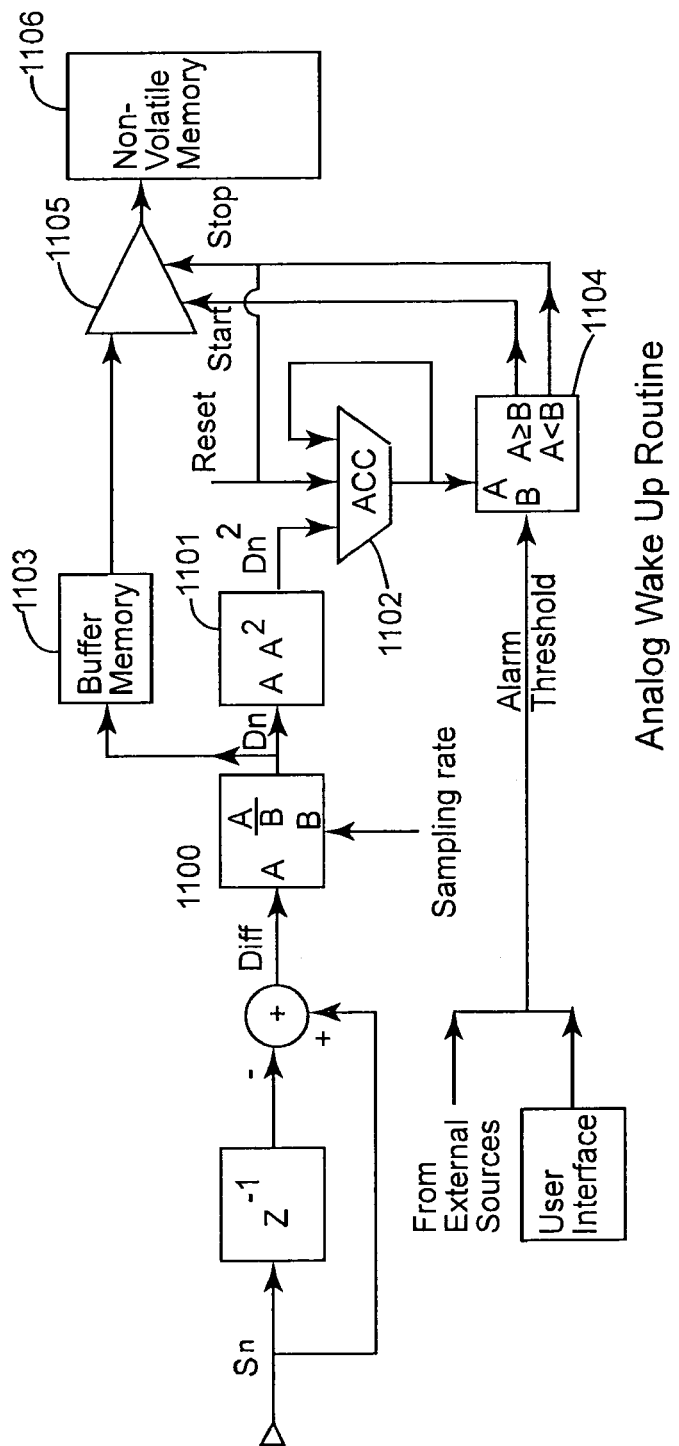
FIG. 11 is a block diagram of an analog wake-up routine of the present system.

Referring to FIG. 11, an accumulator 1102 is set at zero value. The derivative Dn of Sn (calculated value associated with the current state of operation) is calculated by block 1100. The calculated Dn is stored in a temporary buffer memory 1103. $Dn^2$ is then calculated by block 1101. The value of $Dn^2$ is summed to the current value of the accumulator 1102 and the result is stored in the accumulator 1102 again. The summation is repeated for the next freshly calculated $Dn^2$ until a predetermined N summation cycles are completed. The value of the accumulator is compared by block 1104 against a predetermined alarm value while the summation is in progress. If the accumulator value equals or exceeds a predetermined alarm value, then the previously buffered values of Dn are transferred in First Input First Output (FIFO) mode by block 1105 into a non-volatile memory 1106 for further access. The storage of Dn values stops when the Mk (output of the Accumulator 1102) value drops below the alarm value. Then the accumulator is set at zero and the summation cycle is restarted. In one embodiment, the user can enter the alarm value through the configuration menu. In yet another embodiment, the value is transmitted through a communication port from an external source.

Mode 2. On-Event Mode

During the on-event mode of operation 18, the expert system 132 executes routines for detecting and characterizing events.

(200) Method for Detecting Events

Referring to FIG. 6, event detection is performed at step 631, which determines whether or not an event took place in each input. Further, descriptive messages are generated indicating the type of event and the type of variable related to the event, the event duration, and the event start time. Event detection 631 includes processing three input types. The configuration of each input is provided in the configuration TABLE XIII. Step 631 processes each input by means of three processing channels: one for analog inputs, one for discrete inputs, and one for data message inputs received from external sources. These channels are identified as:
 1. Analog Channel;
 2. Discrete Channel; and
 3. Digital Data Channel.

One channel can handle a plurality of inputs of the same type. Each processing channel is activated by dedicated wake-up routines, namely Routine 202, 203 and 204 which run in analysis mode only. The wake-up routine 204 allows activation of the event detection and characterization (631 and 619 of FIG. 6). Otherwise, the input channels continue buffering data by the routines 202, 203 and 204 and the expert system 132 remains in analysis mode. Once a change in the status of the input channels (e.g. potential event) is detected by the wake-up routines, the detection routines are enabled. Meanwhile, the routines of the analysis mode 14 remain enabled in order to allow buffering input in a temporary memory in advance of any potential event that may occur.

(200A) Message Input Detection Routine (Digital Data Channel)

First, the message code assigned by the message reading routine 201 is read. Next, as shown above in TABLE VI, it determines whether the received message is a failure or a malfunction or a deviation or any other type by identifying which states are associated with each word contained in the message. This is achieved by determining which states are associated with the majority of words of the message. Next, it searches in TABLE VII (shown below) for the associated variable, layer and state of operation in order to initiate detection of the associated variable(s). If no sensors are connected to the inputs of the associated variables, detection of such variables is aborted. Otherwise, detection is initiated. Once detection in the associated variables is completed, the incoming message is written in a non-volatile memory along with the time stamp provided by routine 201, the descriptive messages provided by the detection routines of associated variables, a descriptive message indicating the type of event, e.g., "deviation", "malfunction" or "failure", and the event duration. If the duration could not be determined, the descriptive message is "UNKNOWN". If the event continues during the execution of this routine, the descriptive message is "CONTINUOUS".

(200B) Analog Input Detection Routine

Figure 8:
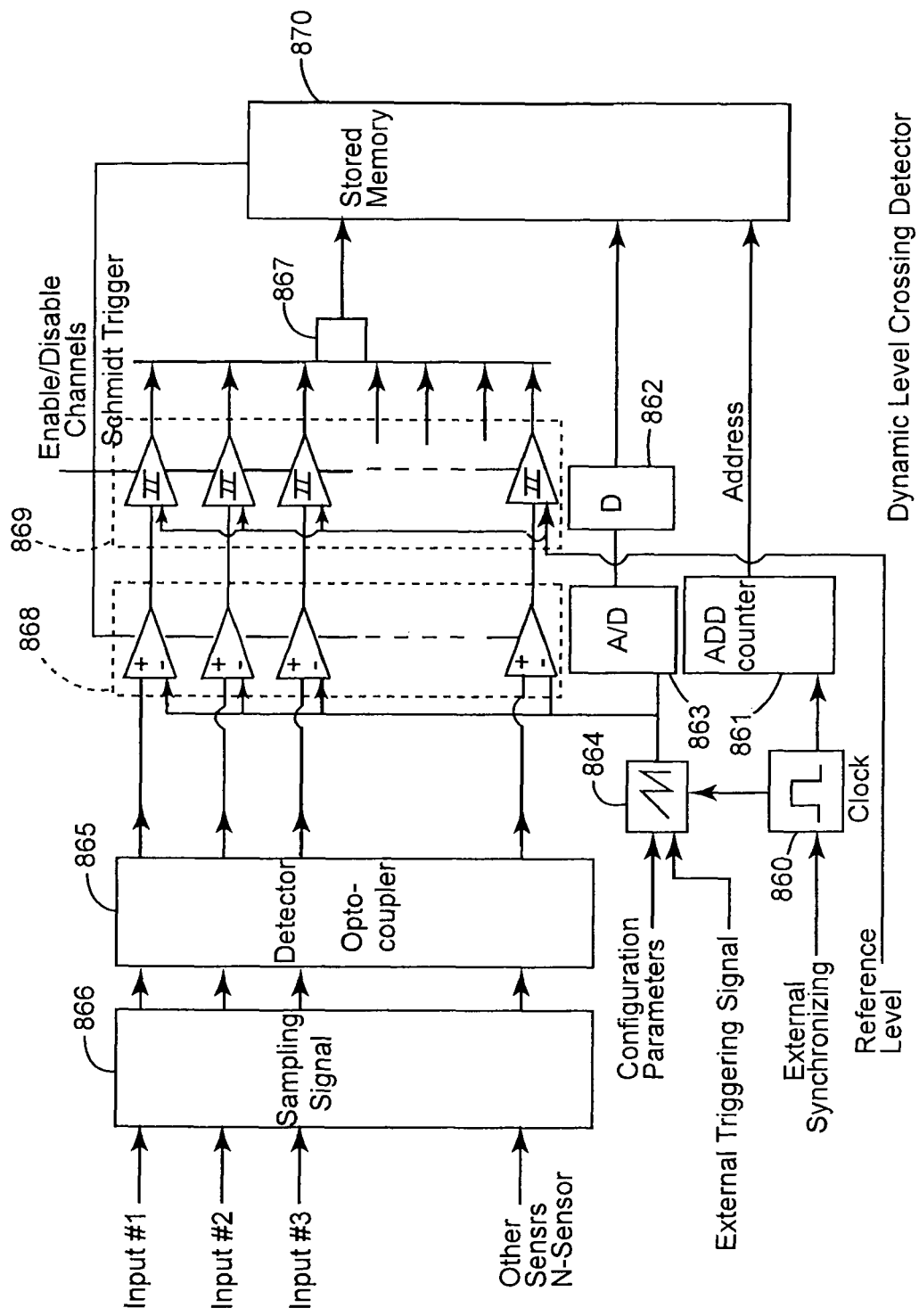
FIG. 8 is a block diagram of a dynamic level crossing detector of the present system.

This routine is activated by Routine 204 and executed by the analog processing channel of Block 631. First it receives the wake-up signal from Routine 204. Referring now to FIG. 8, the signal generator 864 is enabled and put in generator mode. Next, the generator 864 is set to produce a burst of a pre-set number of ramp pulses at a pre-set frequency. Next, Routine 205 (Dynamic Level Crossing) is initiated.

More specifically, the user enters at block 864 (signal generator) the type of sampling signal to be used for each input entered at the block 866. At block 866, the signal is scaled in a range from a low level digital signal to a high level digital signal, normally 0 volt to 5 volts or 1 to 10 volts or as required by the application. Thereafter, the scaled signal enters into the dynamic level crossing detector by the opto-coupler 865, which provides electrical isolation.

The enable/disable command line can enable one input at the time or all the inputs if required, depending on the user requirements, by enabling/disabling each analog operational amplifier as shown in block 868.

Each input signal is then compared by the block of operational amplifiers 868 having unitary gain. When the level of analog signal generated by 864 reaches the level of the input, the operation amplifier 868 sends a low level digital signal to the associated Schmidt trigger (negated) 869 which turns its output to a high voltage level. This allows the memory to be written. In turn, the latch 862 is activated (enable line not shown in the diagram) holding the data coming from the analog to digital converter 863. Meanwhile, the analog-to-digital converter 863 has made the converted digital word available at its output, as well as to the address cyclic counter 861, which positioned the memory ready for writing at the next available memory position. The output data is stored in memory 870. The next input is then activated by the enable/disable command line indicated on top of block 869. The clock 860 sends the clock signal to the blocks 863 and 864 for synchronization and it can be by-passed by an external synchronization signal as selected by the user.

(200C) Discrete Input Detection Routine

This routine determines whether the event is a deviation, malfunction or failure. In the message channel, the block 631 (FIG. 6) functions as follows: first, it synchronizes with Routine 201 by reading in TABLE VIII, the message codes assigned by the message reading routine 201. In the preferred embodiment, the user can select, from the configuration menu, if synchronization with routine 201 is required or not. Then, it determines whether the received message is a failure, a malfunction, a deviation or any other type as defined in TABLE VII. Then, it searches in TABLE VII for the associated variable type, layer and state of operation in order to initiate detection in the associated variable(s). If no sensors are connected to the inputs of the associated variables, detection in such variables is aborted. Otherwise, detection is initiated. Once detection in the associated variables is completed, the incoming message is written in a non-volatile memory along with the time stamp provided by routine 201 (described below), the descriptive messages provided by the detection routines of associated variables, a descriptive message indicating the type of event, e.g., "deviation", "malfunction" or "failure" and the event duration. If the duration could not be determined, the descriptive message is "UNKNOWN". If the event continues during the execution of this routine, the descriptive message is "CONTINUOUS".

(201) Message Reading Routine (Digital Data Channel)

The incoming messages are stored in a non-volatile memory along with the time when the message was received. The storage capacity of the buffer is sufficient to allow execution of the subsequent steps until a new message is read. This routine then searches for the first message stored in the buffer. The message is reformatted to include a single blank space separator between consecutive words. Next, the number of words is counted and the count is stored in TABLE VIII under column "message length". Next, every word of the formatted message is encoded. The encoding procedure consists in comparing the converted word against the words listed in the index TABLE VII, a form of dictionary. If the word is found in TABLE VII, the index of the word is retrieved. Next, the length of the message expressed as the number of words is calculated. The code is then formed by concatenating the index of the first word followed by the index of every consecutive word, followed by the type of message and message length. Once this last step is completed, the routine 201 starts searching for the next message stored in the buffer. If any word of the incoming message is not found in TABLE VII, the word is appended to the TABLE VII with the original spelling. The routine verifies the status of language stetting before including any word of the incoming message into TABLE VII. In another embodiment, the incoming message is received as a coded data frame within the data package structure of a communication protocol.

TABLE VII

Illustrative Index Table

| Index | Word | State(s) | Variable(s) | Layer(s) |
|---|---|---|---|---|
| 1 | VALVE | S1, S3, S4 | Torque, position | External |
| 2 | JAMMED | S2, S5 | Torque, position | External |
| 3 | FRICTION | S6, S8 | | External |
| 4 | CYCLING | S9, S10 | Pressure, position | Internal or External |
| 5 | LIMIT | S11, S12 | Pressure, position | Internal or External |
| 6 | POSITION | S13, S14 | Position | |
| 7 | STEM | S16 | Torque, Position | External |
| 8 | ACTUATOR | S17 | Torque, Voltage | Internal |
| 9 | SEAT | S19 | Position | External |
| 10 | CHECK | S20 | Position, Voltage | Internal, External |
| 11 | TORQUE | S21 | Torque | |
| 12 | ALARM | S23 | All | |
| 13 | MALFUNCTION | S24 | All | |
| 14 | EVENT | S26 | All | |
| 15 | PRESSURE | S34 | Pressure | |
| 16 | SUPPLY | S35 | Voltage | |
| 17 | TEMPERATURE | S37 | Temperature, | Internal |
| 18 | VOLTAGE | S24 | Voltage | Internal |
| 19 | HIGH | S25 | Temperature, Voltage | Internal or External |
| ... | ... | ... | ... | ... |
| Max | "UNKNOWN" | None | None | None |

TABLE VIII

Illustrative Message Encoding Table

| Incoming Message | Code Field | | | | | | Date/Time MM-DD-YY HH:MM:SS |
|---|---|---|---|---|---|---|---|
| | Index Word #1 | Index Word #2 | Index Word #n | Message Type | Message Length | Code Expression | |
| Valve Jammed | 01 | 02 | — | A | 2 | 0102A2 | 031106/10:01:42 |
| Limit Cycling | 05 | 04 | — | E | 2 | 0504E2 | 031506/10:01:43 |
| High Torque | 19 | 11 | — | A | 2 | 1911A2 | 11/01/06 10:01:50 |
| High Actuator Temperature | 19 | 08 | 17 | A | 3 | 190817A3 | 11/15/06 10:01:51 |

(117) State Detection Routine

A new state is added when a least one of the following conditions are met:
1. A variable or set of variables triggering the event detection routine occurs more than once within identical periods of time, e.g., preselected by the user in days;
2. A variable that triggers the event detection routine reaches a specific range of values independent of the value adopted by other variables;
3. A variable or set of variables triggering the event detection routine occurs more than once before or after another variable or set of variables; and/or
4. Referring to FIG. 6, if two or more parameters of the characterization method executed by Block 619 are found within the identical range of values.

Referring to FIG. 6, the expert system programming of the fault analyzer that executes routine 117 receives from line 621a request to detect the current state. The state detection starts by retrieving from memory all the relevant data of the event(s) detected by block 631 and characterized by block 619 (method 300). It then verifies whether or not the inputs related to the event(s), stored in TABLES VIII, IX and X, belong to any of the states of operations listed in TABLE III. It writes the resultant state tag, state ID code and state message in TABLE IX, which is stored in a non-volatile memory. If no state is recognized, a new state S[new] is added to the list. Next, it verifies in TABLE II whether the performance index of the master method is above the "poor" level. If it is above this level, it starts searching in TABLE II of the master method for all of the states related to the state identified, or newly added in the previous step. Routine 120 is then started, and once Routine 120 is completed, it records in TABLE IX the time when the state was detected, which is the time stamp of the first input that triggered the wake-up routine. Next, Routine 117 retrieves from TABLES VIII, IX and X the memory indexes of past events associated to the related states from a predetermined number of previous days up to the present date. The user can set the size of the historical files in days to be retained for future access by this routine through the configuration menu of the expert system 132. Finally, Routine 117 writes the memory indexes of the related past events for future access by the routines of Method 400 (report mode 19) in TABLE IX.

TABLE IX

State Verification

| State | | Variable/ Input Tag | Date/Time Detected State | Memory Index Related Events |
|---|---|---|---|---|
| Resultant State Tag | State Code/ Message | | | |
| S1 | Code 1/ Message 1 | X, P | [DATE], [HH:MM:SS] | AF108FF0, AF108FF0 |
| S20 | Code 2/ Message 2 | X, C | [DATE], [HH:MM:SS] | AF108FF0 |
| S85 | Code 3/ Message 3 | C, V | [DATE], [HH:MM:SS] | AF108FF0 |
| ... | ... | ... | [DATE], [HH:MM:SS] | AF108FF0 |

TABLE IX-continued

State Verification

| State | | Variable/ | Date/Time | Memory Index |
|---|---|---|---|---|
| Resultant State Tag | State Code/ Message | Input Tag | Detected State | Related Events |
| S17 | Code 10/ Message 10 | P, X, V | [DATE], [HH:MM:SS] | AF108FF0 |
| ... | ... | ... | [DATE], [HH:MM:SS] | AF108FF0 |
| Sn | Code n/ Message n | P, C, X | [DATE], [HH:MM:SS] | AF108FF0 |
| ... | ... | ... | [DATE], [HH:MM:SS] | AF108FF0 |
| ... | ... | ... | [DATE], [HH:MM:SS] | AF108FF0 |
| S[new] | Code m/ Message m | P, V, ..., N | [DATE], [HH:MM:SS] | AF108FF0 | where, Rel. i, for i∈[1 to m+3] is the mathematical relationship between the variables of the state.

The discrete inputs stored in the buffer memory of Routine 203 as discrete inputs registers are read in sequential FIFO (first input, first output) manner. Next, the status of each input is verified against the registers of the current states recorded by the state detection Routine 117 in order to determine if a deviation, malfunction or failure has occurred. The verification process includes of two steps: a) the identification of the variables associated to the current states, and b) the verification of discrete inputs of current state variables as defined in the relationships of TABLE III.

The identification of variables is performed by reading the field "variable" of TABLE III for the current states recorded in the current states registers. Next, the relationships defined for the current state variables are selected, and the selected relationships are executed for the inputs of the discrete input registers. The verifications are repeated for every discrete inputs register against every relationship involving discrete variables. After running the relationships for every discrete input, the discrete status register is updated. This discrete status register is compared illustratively using Boolean XOR logic against the current state discrete status register. The result of this is stored in an auxiliary register. The compliance level for each discrete input is calculated by counting the amount of "ones" of the auxiliary register and dividing the count by the amount of fields of the discrete status register.

If the compliance level for each variable is greater than a predetermined threshold (as defined by the user through the configuration menu) the discrete input register is transferred to the non-volatile memory along with its time stamp and a priority index and stored in TABLE X. If not, that discrete input register remains in the buffer memory. The priority index is assigned during calculation of the compliance level by a dynamic sort method applied to the compliance level.

TABLE X shows how the inputs DI002, DI004 and AI001 are associated to the variables "X"—valve position; "C"—close command; and "V"—power supply voltage and were found within a suspected state of malfunction with a priority index of 99 out of 100 and compliance indexes of 99%, 99% and 70% respectively.

In yet another embodiment, referring to TABLE III, these relationships and functions can be expressed as conditional sentences of a generic programming language, for example: Rel.10: if (0<x<100) and (3<P<IS) then Rel.10=TRUE, where "X" is the valve position indication and "P" is the control pressure illustratively in a range of 3 psig to 15 psig.

In the above expression the variable tag "X" varies from 0% to 100%, which are the limits of thresholds of the variable "X", while 3 psig to 15 psig represent the limits for variable "P". The variables "P" and "X" can be read directly from sensors connected to the inputs or from transducers that convert the sensed variables, for example, to an input of 0.5 volts or 4-20 mA.

In this embodiment, the relationships among the variables that define each state of operation can be expressed as a conditional sentence of a generic programming language as follows: If f (variable 1, variable 2, ... , variable N)=TRUE then Relationships K=TRUE, where "K" is the index of the k-esim relationship, for example, in Rel.10, K=10. The relationships are stored in the non-volatile memory as programs or routines.

(120) Event-Detection Activation Routine

This routine receives the start command from Routine 117 and sends the start command of event detection to the input channels of the related states previously identified by Routine 117, as shown in line 617 of FIG. 6. When event characterization is completed, the routine remains in stand-by until it receives the new start command from Routine 117.

(205) Dynamic Level Crossing Detection

The dynamic level crossing detection has an enable/disable command that allows selecting each of the N-channels as shown in FIG. 8 below. In one embodiment, the generator 864 produces an analog signal of predetermined type, frequency and peak values.

The signal generator 864 has two operating modes: generator mode and sampler mode. In generator mode, the generator signal is converted to a digital binary word by the "A/D" converter 863 and then compared by comparator array 868 against the input. The block array 869 shows a block of Schmidt Trigger gates. If the generator signal amplitude equals the input signal amplitude, the comparator output assumes true logic value and the digital word at the output of converter 863 is stored in a non-volatile memory, along with the current clock time value. In one embodiment, the generator can produce predetermined types of signals including triangular, squared, pulse, ramp and combinations of these. In sampler mode, the generator 864 is used with an external signal to start/stop the signal generator.

TABLE X

Discrete Event Input Table

| Memory Index | Discrete Input | Variable Tag | Event Type | Event Code | Priority Index | Date/Time MM-DD-YY HH:MM:SS | Compliance Level |
|---|---|---|---|---|---|---|---|
| AFI00000 | DI001 | X | D | 0D10A1 | 72 | 061106/10:10:20 | 60% |
| AEEE1110 | DI002 | X | M | 01B100 | 99 | 061206/11:30:00 | 99% |
| AEEE1111 | DI004 | C | M | 01B100 | 99 | 061206/11:30:00 | 99% |
| AEEE1111 | AI001 | V | M | 01B100 | 99 | 061206/11:30:00 | 70% |

(300) Method for Characterizing Events

Three types of inputs, i.e., analog (A), discrete (D) and message type (M), are processed by independent processing channels which are in series with the channels of the detection routines of the method 200. Method 300 consists of a plurality of routines that determines origin, dynamic properties, severity and range of the deviations detected by method 200 in previous stage.

(301) Origin Routine

The Routine 117 classifies the state as actuator, usage or external, and stamps a message in TABLE XI.

TABLE XI

Origin Verification

| State(s) | Origin Type | Message |
|---|---|---|
| S1 | Actuator | "Actuator Input board malfunction" |
| S5 | Usage | "Usage related failure" |
| S3 | External | "Supply Voltage deviation" |
| ... | ... | ... |
| Sn | Actuator | "Actuator Mechanical Failure" |

(302) Dynamics Routine

This routine determines basic dynamic properties including frequency and signal type of the event detected by the method 200. The dynamic properties considered are listed below in TABLE XII.

TABLE XII

Frequency and Type Classification

| | Range | Input Channel | Method(s) |
|---|---|---|---|
| Frequency Type | | | |
| Sporadic | ≤1 in T1 period | A, D, M | Routine 302.A |
| Erratic | >1 in T1 period | A, D, M | Routine 302.A |
| Cyclic AC | 45-65 Hz | A, D | Routine 302.A |
| Cyclic Non AC | >0.1 Hz and >65 Hz and <45 Hz | A, D | Routine 302.A |
| Signal Type | | | |
| Stationary | Yes/No | A, D, M | Routine 302.B |
| Noise Narrow Bandwidth | Bandwidth ≤ BW1 | A | Routine 302.C |
| Noise Wide Spectrum | Bandwidth ≥ BW2 | A | Routine 302.C |
| Pulse | Width ≤ T2 | A, D | Routine 302.B |
| Burst | Width ≤ T3 | A | Routine 302.B |
| Step up | Raise Time ≤ T4 | A | Routine 302.B |
| Step down | Fall Time <= T5 | A | Routine 302.B |
| Ramp growing | Raise Time > T4 | A | Routine 302.B |
| Ramp decaying | Fall Time > T5 | A | Routine 302.B |

Input type: A is analog, D is discrete and M is Message (302.A) Detection Rate

Routine 302.A reads from memory the events, time stamps and event duration recorded by the routines 200.A, 200.B and 200.C. Routine 302.A then counts how many events have occurred during the period of time T1. If up to one event has occurred during the T1 period, the event is classified as sporadic. If more than one event has occurred during the same period, this routine determines how many times per second the event occurred according to the range conditions specified in TABLE XII. Once the frequency has been identified, this routine writes a descriptive message for the event recorded by the detection methods indicating the frequency type identified in TABLE XII.

(302.B) Signal Type

Routine 302.B reads from memory the events, time stamps and event duration recorded by the routines 200.B and 200.C. Routine 302.B then counts the amount of recorded values between different analog levels ranging from the minimum analog signal level to the maximum analog signal level. The number of levels of this routine can be preset by the user through the configuration menu of the expert system 132. However, the system provides a default value which is not higher than the resolution of the A/D converter 612 of FIG. 6. The number of levels is compared against known values of signals of the types listed in TABLE XII.

If the number of levels can not be found in the range of known signals, this routine is aborted and routine 302.0 is initiated. Routine 302.B runs a non-parametric stationarity test. For example, by calculating a mean value estimator of the values recorded within consecutive time intervals of identical length and then comparing the value against known statistical distributions, for example, Gaussian distributions. Finally, Routine 302.B determines if there is stationarity in the recorded values and writes in memory a descriptive message as indicated in TABLE XII.

Once the signal type has been identified, this routine writes a descriptive message for the event recorded by the detection methods indicating the signal type as listed in TABLE XII.

(302.C) Noise Type

This routine reads from memory the events, time stamps and event duration recorded by the routines 200.B only. Routine 302.C reads the counts of the amounts obtained from routine 302.B along with the results of the stationarity test. If there is stationarity in the recorded values, this routine runs a test to determine if the signal is of narrow bandwidth.

(303) Severity Routine

This routine provides a severity index, which is calculated as follows:

Severity Level=(1—Proximity to failure); where proximity to failure is the amount of transition paths to reach the nearest failure state starting from the current state and divided by the total number of transition paths from the far left normal state to the far right failure state. Once the severity has been determined, Routine 303 writes in memory a descriptive message for the event recorded by the detection methods 200 according to the following levels:

For 0≤severity level<0.2: the message is "Minor";
For 0.2≤severity level<0.4: the message is "Mild";
For 0.4≤severity level<0.6: the message is "Moderate";
For 0.6≤severity level<0.8: the message is "Major";
For 0.8≤severity level≤1.0: the message is "Severe".

(304) Range Routine

Routine 304 reads from memory the events, time stamps and event duration recorded by the routines 200.B only and determines the minimum and maximum values recorded during a pre-set period of time.

Mode 3. Reporting Mode (400) Method for Generating Fault-Analysis Reports

The present invention includes generating fault-analysis reports that can be viewed by an end-user. The fault-analysis reports are generated by a routine that concatenates the descriptive messages generated by all the previous routines in such a manner that a readable text report can be generated. The routine records the fault-analysis report in a non-volatile memory.

(401) Fault-Analysis Report Routine

Generation of the fault-analysis report begins by retrieving the data and time from Routine 117, Routines 200.A, 200.B and 200.C from memory. Also retrieved are the type of event and the origin of the event as it was identified by Routine 301, the signal type, dynamics, frequency, severity and range by Routines 302, 302.A, 302.B, 302.C, 303 and 304.

Next, the paragraphs #1 and #2 are formed with the retrieved data as listed below:
PARAGRAPH #1: ON [DATE] AT [HH:MM:SS] A [DEVIATION/MALFUNCTION/FAILURE] TOOK PLACE IN THE [MODULE/PART/EXTERNAL/USAGE/ENVIRONMENT].
PARAGRAPH #2: THIS [DEVIATION/MALFUNCTION/FAILURE] HAS BEEN IDENTIFIED BY THE EXPERT SYSTEM AS [SIGNAL TYPE] OF FREQUENCY [FREQUENCY TYPE] WITH A RANGE VARYING FROM [MIN. VALUE] [UNITS] TO [MAX. VALUE] [UNITS].

The routine 401 forms paragraph #3 and #4 from the relevant past events obtained from Routine 117 which are available in TABLE I.
PARAGRAPH #3: THIS [DEVIATION/MALFUNCTION/FAILURE] HAS BEEN FOUND RELATED TO THE FOLLOWING EVENTS:
1) [DEVIATION/MALFUNCTION/FAILURE] THAT TOOK PLACE ON [DATE] AT [HH:MM:SS]
2) [DEVIATION/MALFUNCTION/FAILURE] THAT TOOK PLACE ON [DATE] AT [HH:MM:SS]
3) [DEVIATION/MALFUNCTION/FAILURE] THAT TOOK PLACE ON [DATE] AT [HH:MM:SS]
4)...
5)
N)...
PARAGRAPH #4: THE EXPERT SYSTEM HAS IDENTIFIED THAT THIS [DEVIATION/MALFUNCTION/FAILURE] ...
A)... HAS BEEN [EVENTUALLY/PROBABLY/LIKELY/VERY LIKELY/CERTAINLY] CAUSED BY THE FOLLOWING EVENTS:
1) [DEVIATION/MALFUNCTION/FAILURE] THAT TOOK PLACE ON [DATE] AT [HH:MM:SS] IN THE [MODULE/PART/EXTERNAL/USAGE/ENVIRONMENT].
2) [DEVIATION/MALFUNCTION/FAILURE] THAT TOOK PLACE ON [DATE] AT [HH:MM:SS] IN THE [MODULE/PART/EXTERNAL/USAGE/ENVIRONMENT].
B)... COULD NOT BE DETERMINED
3) [DEVIATION/MALFUNCTION/FAILURE] THAT TOOK PLACE ON [DATE] AT [HH:MM:SS] IN THE [MODULE/PART/EXTERNAL/USAGE/ENVIRONMENT].
4)...

Finally, routine 401 generates paragraph 5 based on the result of the previous paragraph 4.
PARAGRAPH #5: THE EXPERT SYSTEM RECOMMENDS ADOPTING THE FOLLOWING REMEDIAL MEASURES:
[INVESTIGATE/MITIGATE/REPLACE/REPAIR] 1)
[INVESTIGATE/MITIGATE/REPLACE/REPAIR] 2)
[INVESTIGATE/MITIGATE/REPLACE/REPAIR] 3)
[INVESTIGATE/MITIGATE/REPLACE/REPAIR] 4)

If the selection was (B), the selected measure(s) is "INVESTIGATE" for each of the related events listed in the previous paragraph. If the selection was (A), if the event is a deviation, malfunction or failure in external variables, the selected measure(s) are "INVESTIGATE" and "MITIGATE". If the event is a deviation in internal variables, but such event has not occurred more than a predetermined number of times, the selected measure is "REPAIR", otherwise it is "REPLACE".

Mode 4. Configuration Mode

The user can call any configuration routine by accessing the configuration menu. The configuration menu provides the user with access to the configuration tables of the expert system 132. When the user enters the configuration mode 8, the system also automatically executes auto-setting routines.

(121) Master-Slave Auto Setting

The user can select which $\lambda$ calculation method is the master. Once the master method is selected, the system automatically assigns to the other methods the status of slaves. If no selection takes place by the user, the system automatically assigns the status of master method to the one that provides the greatest number of $\lambda$, values and that has listed the greatest number of states of operation in TABLE VI.

(122) Auto-Labeling and Auto-Refreshing

This routine automatically assigns an individual message to each one of the transition paths $\lambda$, defined in each sub-model. The default messages are assigned according to the following rules:
For $0 \leq X < 0.2$, the assigned message is "EVENTUAL";
For $0.2 \leq X < 0.4$, the assigned message is "PROBABLE";
For $0.4 \leq X < 0.6$, the assigned message is "LIKELY";
For $0.6 \leq X < 0.8$, the assigned message is "VERY LIKELY"; and
For $0.8 \leq X \leq 1$, the assigned message is "CERTAIN".

The default messages are stored in the relational table of the model along with the calculated $\lambda$. These messages are later used by method 300 in order to generate the written fault-analysis report.

In one embodiment, a continuous value for $\lambda$ and a finite number of descriptive messages are provided. In yet another embodiment, the descriptive messages are expressed as numeric values which are written in the relational table instead of the messages.

(123) Input Auto-Designation Routine

The Input auto-designation routine assigns a descriptive message to each input according to the structure of TABLE XIII as shown below. The system provides one table per sub-model. TABLE XIII is stored in a non-volatile memory. The user can call this routine from the configuration menu of the expert system in order to modify any value in TABLE XIII.

TABLE XIII

| | Example | | | | | |
|---|---|---|---|---|---|---|
| | Variable Type | | | | | Current Event Type |
| Input # | 01 Mechanical | 02 Electrical | 03 Pneumatic | 04 Hydraulic | 05 Environment | 01/02/03 D/M/F |
| Input #1 | [Message 1] | None | None | None | None | [Message 1] |
| Input #2 | None | None | None | None | [Message 3] | [Message 1] |
| ... | None | None | None | None | None | [Message 2] |
| ... | None | [Message 2] | None | None | None | [Message 2] |

TABLE XIII-continued

Example

| | Variable Type | | | | | Current Event Type |
|---|---|---|---|---|---|---|
| Input # | 01 Mechanical | 02 Electrical | 03 Pneumatic | 04 Hydraulic | 05 Environment | 01/02/03 D/M/F |
| Input #n | None | None | [Message 3] | None | None | [Message 1] |
| ... | None | None | None | None | None | [Message 3] |
| Input #N | None | None | None | [Message 3] | None | [Message 1] |

For purpose of illustration, various types of messages can be entered in TABLE XIII by the user as follows:
Type Mechanical:
Message 1: "rotational speed"; Message 2: "linear speed"; Message 3: "torque", Message 4: "force"; Message 5: "position"; Message 6: "Travel time to close"; Message 7: "Travel time to open"; Message 8: "Travel time to shut-down position"
Type Electrical:
Message 1: "current consumption"; Message 2: "command voltage"; Message 3: "command current"
Type Pneumatic:
Message 1: "command pressure"; Message 2: "supply pressure"; Message 3: "output pressure".
Type Hydraulic:
Message 1: "command pressure range"; Message 2: "supply pressure range"; Message 3: "output pressure"
Type Environment:
Message 1: "internal temperature"; Message 2: "ambient temperature"; Message 3: "ambient pressure"; Message 4: "vibration level"; Message 5: "relative ambient humidity"
Event Type:
Message 1: "Deviation"; Message 2: "Malfunction"; Message 3: "Failure"

The illustrative messages listed above are for illustrative purposes only and are not considered limiting.
Mode 5. Training-Only Mode In training-only mode 12, the expert system 132 is trained to learn states and transition paths among them. In this operating mode, the expert system is trained to learn new states, incorporate new relationships to the existing states, as well as to determine the transition paths between the new added states and the existing ones. In a preferred embodiment, the usage of the Training-Only mode 12 has the primary objective that the Valve Actuator Fault Analyzer System learns states of operation of the valve actuator by repeating specific operations of the actuator under specific fixed conditions. The learning is performed internally in the Valve Actuator Fault Analyzer System by the expert system 132.

In a preferred embodiment, the learning process requires that the specific valve-actuator operations that are to be learned must also be performed a predetermined number of times. For illustrative purposes only, the user selects training of a specific state of operation of an electrical valve actuator such as, for example, "high motor current at 30° C. ambient temperatures". The user then selects the electrical actuator sub-model and the variables he or she wants to include in the training session. After the first trial run is completed, the user repeats the trial run again until the training is completed. Through the Training-Only setting menu, the user is able to access and modify the predetermined number of repetitions to be used for the training session.

For initiating the training-only mode 12 from the Training-Only setting provided by the main menu 4 (FIG. 3), the user selects the sub-model type which depends on the type of actuator. For example, hydraulic, pneumatic, electrical or electro-hydraulic sub-models are available for the user to select.

In a preferred embodiment, the user enters through the training-only menu whether the training session is considered to be a normal operation, deviation, malfunction or failure or unknown. When the training session is marked as unknown, an automatic assignment of the training results is made automatically by the expert system 132 at the end of the training session.

By selecting the appropriate sub-model undergoing the learning process, the expert system automatically selects the sub-model variables and links between them to be used for training purposes. Next, the expert system identifies the sub-model variables and the inputs associated to them that will be used for monitoring during the learning process.

The user is able to select through the Training-Only setting menu various types of inputs including digital data, discrete or analog inputs to add for learning purposes. The user can also select the duration of the test in time, the amount of repetitions and/or test runs.

(500) Method for Learning States of Operation and Transition Paths of the Expert System The method for learning states of operation and transition paths 500 can be implemented by the expert system during the Analyzer Mode 14 and On-Event Mode 18 of operation. The user selects Training-only mode 12 (FIG. 3) through the Main Menu 4 of the Valve Actuator Fault Analyzer System 100, and then selects the sub-model and the variables to be used during the training session. Each variable may have associated with it one or more physical inputs, i.e., digital data input, discrete input or analog input.

The expert system 132 activates the auto configuration of the wake-up routines, 202, 203 and 204. The analog input wake-up routine 204 selects the fast-scan generator 864 which provides a pulse wave signal. The pulse wave period and duty cycle can be selected by the user through the configuration menu. Referring to FIG. 8, the expert system adjusts the level of alarm value of the accumulator of routine 204 to a learning level, which is entered by the user previously. Next, routines 202 and 203 are initiated.

The inputs of the variables preselected by the user are stored in the buffers during routines 202, 203 and 204 along with the time-stamps. In the training-only mode 12, the routines 202, 203 and 204 utilize the buffered data.

The recorded inputs are arranged in increasing order by the time-stamps in such a manner that the inputs recorded within a specific time frame form a layer of data, which can be interpreted as a vector of N components, where N is the amount of vector components (or point in an N-dimensional array). The arrangement in data layers is stored in a data structure as illustratively shown in. TABLE XIV below. Referring to TABLE XIV, the designations X1, X2 and X3 represent discrete inputs, PI, P2 represent analog pressure inputs, V1, V3 represent analog voltage inputs, and designations C, O, and SP represent close, open and stop command, respectively. The vectors (N-dimensional points) are formed by layers of inputs recorded at consecutive time intervals "$\Delta T$". The user can set different time interval "$\Delta T$" from the Training Only setting menu.

In another embodiment, the user is able to preselect different curves formed by time intervals that change at specific time milestones during the training session. The ability to change the time interval provides the user with an increased selectivity of what inputs will be considered as simultaneous or not and increased flexibility to pre-process the inputs by adding filters interposing the sensor probe and the analyzer.

TABLE XIV

Example Vector Time-Layer Table

| Time HH:MM:SS <$\Delta T$<= HH:MM:SS | V# | X1 | X2 | X3 | ... | P1 | P2 | ... | V1 | ... | V3 | C | O | SP |
|---|---|---|---|---|---|---|---|---|---|---|---|---|---|---|
| 00:00:00-00:00:01 | 0 | 1 | 1 | 1 | | 3.1 | 90 | | 5.0 | | 12.0 | 1 | 0 | 0 |
| 00:00:01-00:00:02 | 1 | 1 | 0 | 0 | | 5.3 | 93 | | 5.1 | | 12.1 | 1 | 0 | 0 |
| 00:00:02-00:00:03 | 2 | 1 | 0 | 0 | | 3.2 | 85 | | 5.3 | | 12.2 | 1 | 0 | 0 |
| 00:00:03-00:00:04 | 3 | 1 | 0 | 0 | | 4.4 | 93 | | 5.7 | | 12.1 | 1 | 0 | 0 |
| 00:00:04-00:00:05 | 4 | 1 | 0 | 0 | | 3.8 | 89 | | 5.3 | | 12.0 | 1 | 0 | 0 |
| 00:00:05-00:00:06 | 5 | 1 | 0 | 0 | | 3.0 | 90 | | 5.4 | | 12.1 | 1 | 0 | 0 |
| 00:00:06-00:00:07 | 6 | 1 | 0 | 0 | | 3.5 | 91 | | 5.4 | | 12.2 | 1 | 0 | 0 |
| ... | N | 1 | 0 | 0 | | 3.6 | 87 | | 5.4 | | 12.2 | 1 | 0 | 0 |

Next, the distance between pairs of vectors (points) formed by 2, 3, 4 up to N components is calculated by taking into account the following considerations:

a. Only distances between two vectors whenever the difference in time between the time-layers of such two vectors is smaller than a predefined time difference, which is predefined by the user through the Training-Only setting menu.

b. Only distances between two vectors whenever there is a link established, as defined in the physical models, i.e., heat transfer model, mechanical and electrical models of the sub-model selected by the user, between one variable of one vector and another variable in the other vector; or whenever there is at least one link between a variable of a vector included in a function block of the physical model and another variable of the vector is included in another function block. If the variable has two links established, one directly connected to the variable and another one connected between two blocks where such variable is contained in one of the blocks, all the variables will be considered linked each other for the purpose of training and monitored accordingly.

c. For distance calculations, the N-dimensional vectors are formed in such a manner that each variable occupies the same position in both vectors. For example, for N=2, if a vector V0, taken at time T0, is formed by the variables (x1,x2,p1) in that order, then another vector taken at time T20 is "V20" and is formed by the same variables in the same order (x1,x2,p1).

d. Different variables are used to form different vector assemblies for distance calculation. For example, in one assembly the vectors are formed by (x1,x2,p1), in another assembly by (x1,x2,p2), in another one by (x1, V1,P2).

e. Only variables which are linked one to each other in at least one of the sub-models are used to form different vector assemblies.

f. Two vector assemblies cannot have more than one variable in common.

The distance between pair of vectors for N=2 is calculated according to the following expression:

$$D_{ij} = \sqrt{(x_{1i}-x_{1j})^2+(x_{2i}-x_{2j})^2} \quad \text{Eq: [9a]}$$

For N=3

$$D_{ij} = \sqrt{(x_{1i}-x_{1j})^2+(x_{2i}-x_{2j})^2+(x_{3i}-x_{3j})^2} \quad \text{Eq: [9a]}$$

For N=4

$$D_{ij} = \sqrt{(x_{1i} - x_{1j})^2 + (x_{2i} - x_{2j})^2 + (x_{3i} - x_{3j})^2 + (P_{1i} - P_{1j})^2} \quad \text{Eq: [9c]}$$

For N=Max $$D_{ij} = \sqrt{\begin{array}{l}(x_{1i} - x_{1j})^2 + (x_{2i} - x_{2j})^2 + \\ (x_{3i} - x_{3j})^2 + ... + (x_{MAXi} - x_{MAXj})^2\end{array}} \quad \text{Eq: [9d]}$$

The distances calculated for dimensions N=2, 3, 4, and M, where M is the maximum dimension of the vector, are arranged in a data structure shown in TABLE XV below. TABLE XV shows the distances calculated starting by the first vector taken at the time-layer 00:00:00. Identical data structures are arranged for distances calculated from the subsequent time-layers.

The distance calculation is performed for dimensions N=2, 3, and so forth until it stops at the distance that exceeds a learning limit, "DLL" (distance learning limit), which is predefined by the user. Beyond DLL, the distance is noted as "ool" "out of learning" in TABLE XV. Similarly, distances between vectors with a time gap longer than the Time-Difference Threshold "TDT" are also noted "ool".

The distances of TABLE XV are then sorted by increasing value, column by column, but keeping the original time stamp per column.

Next, the distances are examined column by column to filter those distances that are smaller than a learning window "LW", which is a real number predefined by the user. The distances that are filtered out are listed in a temporary data structure along with their time layer and vectors involved.

The process is repeated for the next time-layer and the consecutive vectors taken at time-gaps smaller than the TDT. New data set structures identical to TABLE XV are created and stored in the non-volatile memory.

TABLE XV

Vector Distance Table

| Time HH:MM:SS < ΔT <= HH:MM:SS | Dimension | | | |
|---|---|---|---|---|
| | 2 | 3 | 4 | M |
| 00:00:00-00:00:01 | $D12_2$ | $D12_3$ | $D12_4$ | ool |
| 00:00:01-00:00:02 | $D13_2$ | $D13_3$ | $D13_4$ | ool |
| 00:00:02-00:00:03 | $D14_2$ | $D14_3$ | $D14_4$ | ool |
| 00:00:03-00:00:04 | $D15_2$ | $D15_3$ | $D15_4$ | ool |
| 00:00:04-00:00:05 | $D16_2$ | $D16_3$ | $D16_4$ | ool |
| 00:00:05-00:00:06 | ool | ool | Ool | ool |
| 00:00:06-00:00:07 | ool | ool | Ool | ool |
| ... | ool | ool | Ool | ool |

The process of distance calculation and recording in data structures identical to TABLE XV is repeated for the different vector assemblies, which are formed by the linked variables of the sub-models.

The maximum and minimum values of the variables of the set of vectors are then filtered and stored in a temporary data structure for the different combinations of vector assemblies and for the different vector dimensions are calculated. This can be done by a simple minimum and maximum searching algorithm. Thereafter, the calculated distances along with the variable limits per vector and the time-stamps of the vectors are listed in the data structure of TABLE XVI.

TABLE XVI

Learning Window (LW) Table

| HH:MM:SS < ΔT <= HH:MM:SS | Distance Tags | Variable | Lower Limit | Upper Limit | Vector Assembly |
|---|---|---|---|---|---|
| 00:00:00-00:00:01 | $D12_2$ | x1 | 0 | 1 | (x1, x2) |
| | | X2 | 0 | 1 | |
| | | | 5.12 | 10.3 | |
| 00:00:04-00:00:05 | $D16_3$, $D13_3$ | X1 | 0 | 1 | (x1, x2, p1) |
| | | X2 | 0 | 1 | |
| | | P1 | 3.0 | 4.5 | |
| 00:00:02-00:00:03 | $D14_2$, $D12_2$ | x1 | 0 | 1 | (x1, v1) |
| | | V1 | 12.4 | 12.6 | (x1, v1) |

The grouping of distances within the selected LW boundaries, variable limits and vector assembly type per time-layer shown in TABLE XVI allows identifying vector regions in the various N-dimensional spaces.

The N-dimensional regions are defined by vectors within a boundary limit defined by LW. These regions have different densities of vectors. Density within the N-dimensional regions is defined as the amount of vectors per unit of N-dimensional space, named n-volume unit.

$Dn$-region=amount of vectors/n-volume unit

In the preferred embodiment, the n-volume unit is calculated for each dimension N as:

$$n-\text{volume} = \left[\prod_{i=1}^{N} (URLx_i - LRLx_i)\right] / Q_N \quad \text{Equation [10]}$$

where $URLx_i$ is the upper range limit of the variable $x_i$; $LRLx_i$ is the lower range limit of variable x, and $Q_N$ is the maximum amount of partitions of the N-dimensional volume.

In a preferred embodiment, $Q_N$ adopts a default value. In another embodiment, the user can preselect the amount of partitions of the N-dimensional volume (hypercube).

The vectors form different constellations within the regions of the N-dimensional spaces. These regions and their boundaries are used to establish the variable relationships which define the different states of operation.

The starting time of each time-layer for the variables is then listed in TABLE XVI and sorted in increasing order.

Next, the time difference between vector time-layers of TABLE XVI whenever such vectors have identical dimensions and assemblies is calculated. Next, the calculated time difference is used to sort vectors of identical assembly by increasing time-difference. As a result, the trajectories of the vectors as a function of time can be identified.

In a deterministic process where two variables are correlated by a physical law and where such variables vary in a predictable manner within a time frame, it is expected that repetitions of a particular experiment or test used for training will demark specific trajectories of the variables in the N-dimensional space. Such trajectories may be recognized by the Valve Actuator Fault Analyzer System as valid relationships among the variables, provided that a confidence level is reached. Such confidence level is determined by the density of vectors in the n-dimensional region within a certain boundary arbitrary selected around the trajectory.

The vectors resulting from the previous step are sorted by increasing time-layers. Thus, the different possible trajectories of the variables are identified.

Thereafter, the density of vectors (points) within the boundaries of the trajectory is calculated. The boundary of the trajectory is determined by the start and end time-layers of the vectors of the previous step. If the density is equal or higher than a predetermined value (e.g., 95%) of the maximum possible amount of vectors (points) "$MQV_R$" in the region of the trajectory, then the trajectory is accepted as valid and the sequence of vectors that form such trajectory is stored in the non-volatile memory. Otherwise the trajectory is rejected.

For a given vector assembly, the maximum possible amount of vectors in a given region is determined by calculating for each variable of the vector the amount of times each variable is found at least once within each of N-dimensional partitions centered in the trajectory of the region for the total amount of repetitions of the test or experiment.

For example, if the experiment used for training consists of an electrical actuator that closes a valve having 200 Kg stem weight in 15 seconds at 50° C. ambient temperature, such actuator will reach the end of travel at a specific torque value. If this experiment is repeated at identical conditions, the end of travel will be reached at a specific torque value plus/minus a tolerance. Similarly, the trajectory of the torque will follow a specific path plus/minus a tolerance. In this example, the maximum possible amount of the variable torque within the trajectory of this experiment results from dividing the torque curve in $Q_N$ partitions and calculating how many times per test run the variable Torque is found at least once inside the partition centered at the trajectory. For example if the partitions $Q_N$=3 and the variable Torque is found at least once inside these partitions centered at a specific trajectory for a total amount of 10 tests, then the maximum possible amount of vectors in the trajectory is 30, three vectors per test run.

The process of trajectory identification is repeated for the other groups of vectors for all the vector dimensions of the vectors listed in TABLE XVI. Further, the vectors found within valid trajectories along with the value of their variables, their upper/lower limits and time-layers are identified and stored in TABLE XVII.

TABLE XVII

Example Valid Trajectory Table

| V# | HH:MM:SS < ΔT <= HH:MM:SS | Variable | Lower Limit | Upper Limit | Vector Assembly |
|---|---|---|---|---|---|
| 0 | 00:00:00-00:00:01 | x1.value | 0 | 1 | (x1, x2) |
|   |   | X2.value | 0 | 1 |   |
| 2 | 00:00:02-00:00:03 | x1.value | 0 | 1 | (x1, v1) |
|   |   | V1.value | 12.4 | 12.6 | (x1, v1) |
| ... | ... | ... | ... | ... | ... |

Next, a multi-dimensional least-squares curve-fitting polynomial is used to fit the succession formed by the vectors of valid trajectories that are listed in TABLE XVII.

The new state is created by the vectors and the multidimensional polynomial relationships among the vector variables. The polynomial coefficients for each added state are stored in the non-volatile memory for future access by the various routines of the Valve Actuator Fault Analyzer System. The user is informed through the analyzer display that new states have been added and limits of the variables of the new states need to be defined.

(501) Method for Learning Transition Paths Between States of Operation

The user receives a notification message in the analyzer display indicating which variables and within what range the user needs to vary the inputs in order to start transition path learning. The expert system selects which variables need to be used for transition path learning by reading from TABLE XVII and sending the information to the analyzer display.

The user prepares the input sources to start the transition path learning session and selects START PATH LEARNING from the Training-Only Menu. For example, the user selects start path learning and, in turn, varies the control setting between 4 mA to 20 mA for an electro-pneumatic actuator positioning of a control valve. The analyzer then receives the position indication from the valve, temperature, 4-20 mA input control setting, and the inlet and outlet pressure of the valve.

Upon starting the path training exercise, the expert system verifies if the polynomial expressions of the new added states are still valid outside of the variable limits of TABLE XVI, and if the new states can be classified a priori by the expert system, as normal operation, deviation, malfunction or failure. In this manner, the expert system runs the polynomial expression of the new state for the range of the variables the user starts to vary, which may be outside of upper and lower limits listed in TABLE XVI, and then verifies if the variation in other variables (not modified yet) meets the previously recorded relationships of the existing states of operation. This verification is performed for relations of states that include at least one of the variables of the new added states. The verification process continues for the entire range of the variable while the user is moving up and down the scale of each variable. The user varies the input from a minimum to a maximum in steps defined previously by the user through the training-only setting menu.

The verification process stops when the variations in the input and other variables involved meet existing relationships. Then the new limits of the polynomial expression are set at the values where the verification process stopped. The new limits of the new added state are recorded in non-volatile memory.

If the existing relationships are not met by the variables outside their polynomial range, the polynomial expression (coefficients) is considered valid for the entire range of the variables until a new state is found. The new state is stored in TABLE III along with the relationships and their validity limits, and the classification.

At the same time the path training starts, the expert system verifies the change of every variable of the states of operation defined in TABLE III, designated for this purpose as dependent variables, against the change of every input (variable) varied by the user, designated for this purpose as independent variables. The expert system records the changes of both dependent and independent in the non-volatile memory. Next, the relationships listed in TABLE III of the related states are verified every time the dependent variables change. Only the relationships of the states related to the new states are considered. The states are considered related when at least the new states have more than one variable in common. The user is able to define how many variables any two states must have in common to be considered related.

While the dependent variables change, the distance between the changing dependent variable and the thresholds or limits of each relationship of the related states are calculated. Thereafter, the shortest distance to the threshold or limit that makes each relationship to adopt TRUE status is stored in non-volatile memory. For example, if state of operation S2 is defined by the following relationships:

Rel. 02.01
If y1<3 and y2>4 then Rel.02.01:=TRUE
Rel.02.02
If y3<=4 and y4<=2 then Rel.02.02:=TRUE
If Rel.02.01==TRUE and Rel.02.02:=TRUE then S2=1,
where y1, y2, y3 and y4 are dependent variables and x the independent variable.

While the user varies x from the lower limit to the upper limit in steps defined by the user, the other dependent variables will change accordingly. The distance between the value of the dependent variables at each step against the limits of Rel.02.01 and Rel.02.02 for y1, y2, y3 and y4 is calculated as follows:

$$D_{y1-y1L1} = \sqrt{\Sigma_i^M (y_{1i} - L_{1y1})^2} \qquad \text{Equation [11]}$$

Where "i" represents the i-esim step and L1y1 is the limit 1 of the dependent variable y1, in the case of the above example L1y1=3. M is the maximum amount of steps of change of the independent variable "x"

The distance from each dependent variable to its limits as defined in each relationship is calculated. The shortest distances from the variable to the nearest limit are only considered for next step calculation and stored in non-volatile memory. The greater distances are discarded.

The distance calculation process for dependent variables is repeated for each variable of the new state against the variables of the other related states. The user is able to select through the training-only setting menu is reverse relationships (from existing states to new ones) will be considered.

The reverse relationships are allowed if the analyzer data structure is built to support all the routines and methods as defined in this description. Next, the transition paths $\lambda_{ij}$ is calculated.

In a preferred embodiment and referring to FIG. 2, in order to estimate the transition path $\lambda_{ij}$ between the new state Si and the existing state Sj, the minimum distances from each variable to its nearest limit are used. $\lambda_{ij}$ is estimated as:

$$\lambda_{ij} \sqrt{\Sigma_p^M \Sigma_q^N (D_{minpq})^2} \qquad \text{Equation [12]}$$

where $D_{min\,pq}$ is the minimum distance between the independent variable "p" of state "i" and the dependent variable "q" of state "j"; and where M is the amount of independent variables, and N the amount of dependent variables. The estimated are then stored in TABLE II for future use. For those vectors of table not found within valid trajectories (vectors not listed in TABLE XVII), the relationships among the variables of the vectors are defined.

Figure 15A:
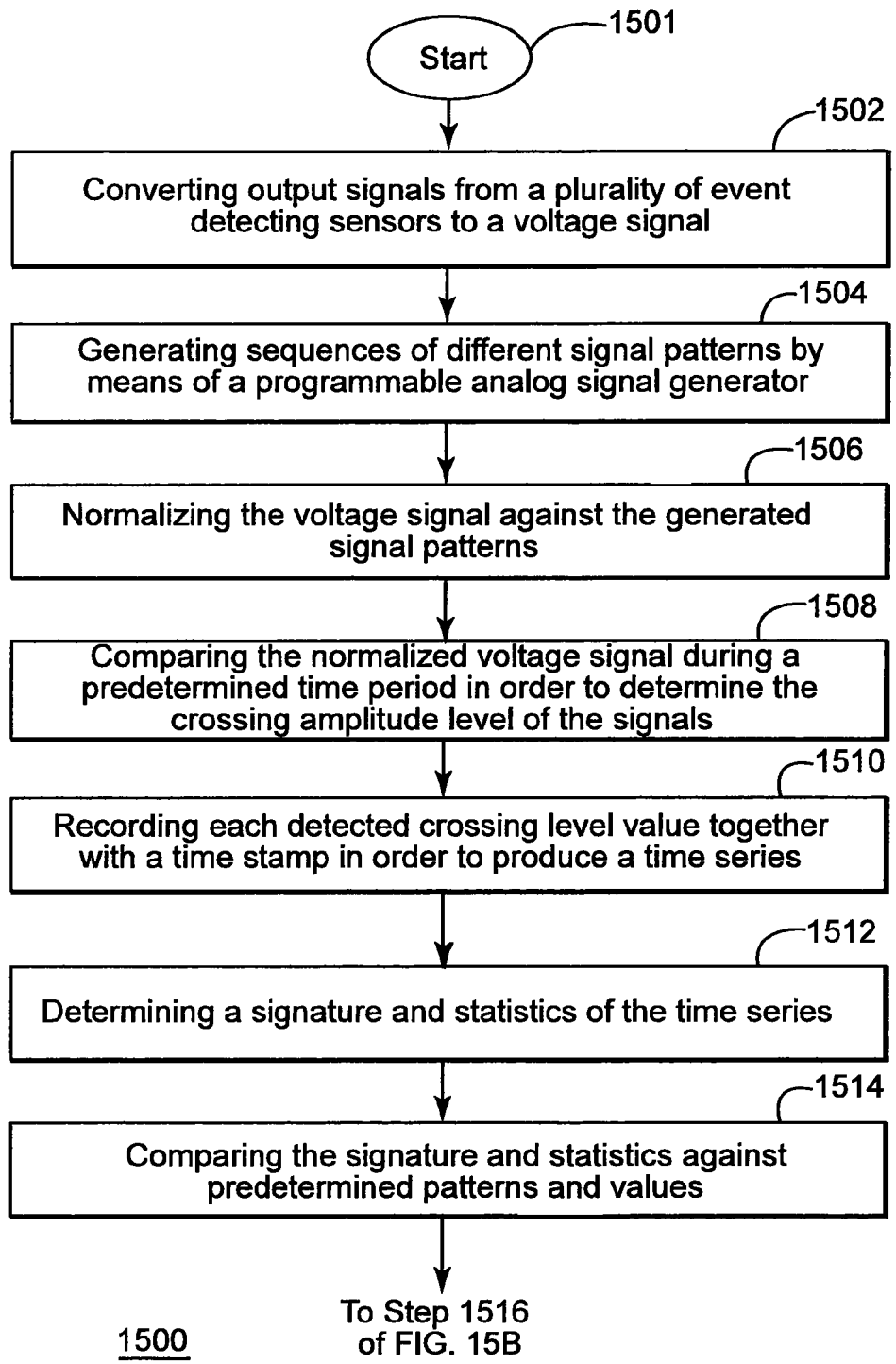
FIGS. 15A and 15B collectively depict a flow diagram of a method for detecting and characterizing at least one of a deviation, malfunction and failure event during operation of an actuator.
Figure 15B:
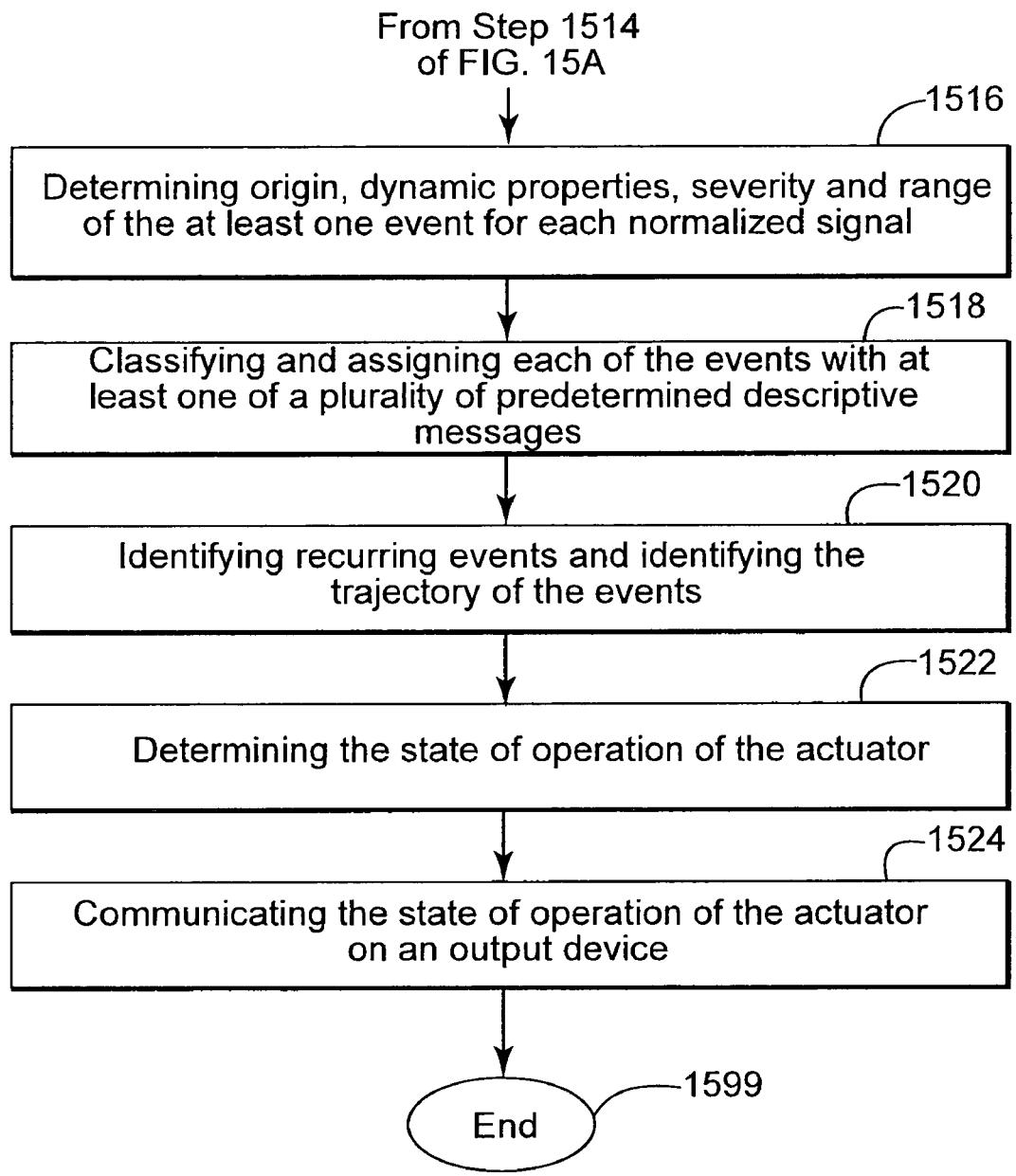

In summary, the present invention includes various methods and apparatus for detecting and characterizing at least one of a deviation, malfunction and failure event in actuator operation. Referring to FIGS. 15A and 15B, there is shown an embodiment of a method for detecting and characterizing at least one of a deviation, malfunction and failure event during operation of an actuator, such as a valve actuator. The method 1500 begins at step 1501 and proceeds to step 1502 where output signals from a plurality of event detecting sensors are converted to a voltage signal. At step 1504, sequences of different signal patterns are generated by means of a programmable analog signal generator, and at step 1506, the voltage signal is normalized against the generated signal patterns. At step 1508, the normalized voltage signal is compared during a predetermined time period in order to determine the crossing amplitude level of the signals, and at step 1510, each detected crossing level value together with a time stamp is recorded in order to produce a time series.

At step 1512, a signature and statistics of the time series is determined, and at step 1514, the signature and statistics are compared against predetermined patterns and values. It is noted that the signature of a signal is defined as a set of values adopted by specific signal parameters which reflect a specific signal property or characteristic utilized by the expert system to infer a condition or particular status of such signal and the associated deviations, malfunctions and failures. The signal signature recognition can be performed by a neural network pattern recognition routine included in the expert system.

In an embodiment of the present invention, the signals stored in the non-volatile buffer memory of the analog and discrete channels are processed by the expert system in order to recognize specific signal patterns associated to deviations, malfunctions and failures. The recognition is performed by a back-propagation neural network. The user can enter the specific signal patterns of concern based on his/her experience, weight factors of the network, biases, among other required configuration parameters.

At step 1516, the origin, dynamic properties, severity and range of the at least one event in the normalized signal(s) is determined. At step 1518, each of the events is classified and assigned with at least one of a plurality of predetermined descriptive messages.

At step 1520, recurring events and the trajectory of the events are identified. In this manner, at step 1522, the state of operation of the actuator can be determined, and at step 1524, the state of operation of the actuator can be communicated to an output device (e.g., displayed on a display device) to the user.

In one embodiment, the method 1500 classifies the event to be one of a failure when the actuator cannot function, a malfunction when an actuator parameter cannot meet a predetermined parameter range, and a deviation when the actuator parameter is outside the predetermined range.

In an embodiment, the state of operation of the actuator is displayed as words on a display panel 150 using a series of grammatical rules. The grammatical rules refer to the specific language grammar rules that the expert system is programmed to operate by. For example, if the language selected by the user is English, then the subject, verb and predicate can be placed in a specific order in the sentences as described in reporting Mode of operation 19. The method 1500 then proceeds to step 1599, where the method ends.

Figure 16:
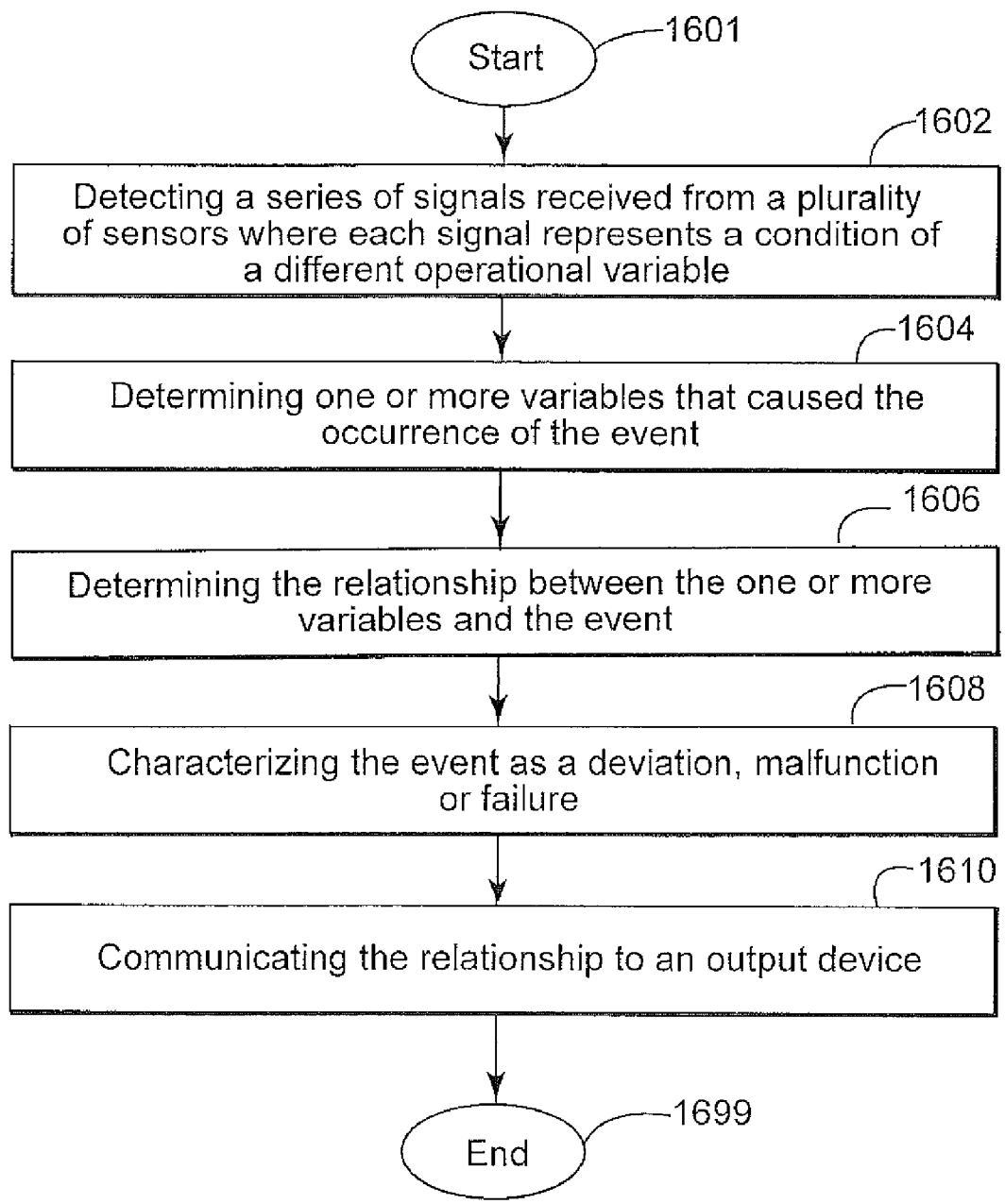
FIG. 16 depicts a flow diagram of a method for concatenating event messages with messages describing possible causal factors and with messages received from external sources in order to produce textual phrases in accordance with predetermined grammatical rules.

Referring to FIG. 16, in yet another embodiment of the present invention, a method is provided for determining causal factors for actuator performance deviation, malfunction and failure event. The method 1600 starts at step 1601 and proceeds to step 1602 where a series of signals received from a plurality of sensors is detected, where each signal represents a condition of a different operational variable. At step 1604, one or more variables are determined that caused the occurrence of the event. At step 1606, the relationship between the one or more variables and the event is determined, wherein the at least one relationship includes a time-related succession of intermediate states of operation associated with the valve actuator that are interconnected by cause-and-effect relationships and transition paths which are quantified by temporal and likelihood factors. At step 1608, the event is characterized as a deviation, malfunction or failure, and at step 1610, the relationship is communicated to the user on an output device (e.g., displayed on a display panel). At step 1699, the method 1600 ends.

Although the present invention was shown and described with references to the preferred embodiment, such is merely illustrative of the present invention and is not to be construed as a limitation thereof, and various modifications of the present invention will be apparent to those skilled in the art. It is therefore not intended that the present invention be limited to the disclosed embodiment or details thereof, and the present invention includes all variations and/or alternative embodiments within the spirit and scope of the present invention as defined by the claims that follow.

I claim:

1. A method for detecting and characterizing an occurrence of at least one event during operation of a valve actuator as one of a deviation, malfunction or failure, the method comprising the steps of:
    detecting a series of signals received from a plurality of sensors, where each signal represents a condition of a different operational variable associated with the actuator;
    determining from the signals one or more of the operational variables that caused the occurrence of the at least one event;
    determining at least one relationship between the one or more variables and the event, wherein the at least one relationship includes a time-related succession of intermediate states of operation associated with the valve actuator that are interconnected by transition paths, which are quantified by cause-and-effect relationships and temporal and likelihood factors;
    characterizing the event as being one of a normal mode of operation, a deviation, malfunction or failure; and
    communicating the at least one relationship through an output device.

2. The method of claim 1, wherein the detecting step comprises the steps of:
    converting output signals from the plurality of sensors to a voltage signal;
    generating sequences of different signal patterns by means of a programmable signal generator;
    normalizing the voltage signal against the generated signal patterns;
    comparing the normalized voltage signal during a predetermined time period in order to determine the crossing amplitude level of the signals;
    recording each detected crossing level value together with a time stamp in order to produce a time series; and
    determining a signature and statistics of the time series.

3. The method of claim 2, wherein the step of generating sequences of different signal patterns by means of a programmable signal generator comprises:
    repeating specific operations of the actuator under predetermined fixed conditions;
    storing historical data for a plurality of variables and relational paths therebetween; and
    learning the states of operation of the valve actuator from the historical data.

4. The method of claim 1, wherein the step of determining from the signals one or more of the operational variables that caused the occurrence of the at least one event comprises the steps of:
    comparing the signature and statistics against predetermined patterns and values to identify a present operating zone and the operational variables indicative of states of operation; and
    determining the origin, dynamic properties, severity and range of the at least one event for each normalized signal.

5. The method of claim 1, wherein the step of characterizing the event as being one of a normal mode of operation, a deviation, malfunction or failure comprises the step of classifying each of the events and assigning at least one of a plurality of predetermined descriptive messages to each event.

6. The method of claim 1, wherein the step of determining the at least one relationship between the one or more variables and the event comprises the steps of:
    identifying recurring events and identifying the trajectory of the events; and
    determining a state of operation of the actuator.

7. The method of claim 6, wherein the step of determining the state of operation comprises the steps of:
    classifying an event to be a failure when the actuator cannot function;
    classifying an event to be a malfunction when the an actuator parameter cannot meet a predetermined parameter range, and
    classifying an event to be a deviation when the actuator parameter is outside the predetermined range.

8. The method of claim 6, wherein the step of determining the state of operation comprises concatenating event messages with messages describing possible causal factors and with messages received from external sources and producing textual phrases that follow predetermined grammatical rules.

9. The method of step 7, wherein the step of determining the state of operation comprises:
    identifying nodes of relational paths associated with the state of operation of the actuator;
    generating a table that assigns a unique representative text to each transition path formed between the nodes along the relational paths; and
    concatenating the event messages with the representative text according to the predetermined grammatical rules.

10. The method of claim 9, wherein the step of identifying nodes comprises the steps of providing a state transition matrix having a plurality of variables associated with the actuator, each variable being characterized with metrics defining a normal state of operation, a deviation, a malfunction and a failure associated with the operation of the actuator, each variable representing a node; and identifying transition paths between the nodes that define the state of operation of the actuator.

11. The method of claim 10, wherein the step of providing the state transition matrix includes defining the deterministic metrics associated with each variable based on physical sub-models that contemplate physical characteristics experienced by the actuator.

12. The method of claim 11, wherein the physical characteristics include heat-transfer, electrical variables and mechanical variables associated with the actuator.

13. The method of claim 11, wherein the step of providing the state transition matrix includes defining the statistical metrics associated with each variable based on statistical information including component failure rates.

14. The method of claim 13, further comprising:
    comparing, for each variable, the deterministic and the statistical metrics; and
    selecting one of the deterministic or statistical metric for each node based on event frequency associated with the actuator.

15. The method of claim 9, wherein the predetermined grammatical rule includes at least one of a subject element, a verb element, and a predicate element.

16. The method of claim 1, wherein the step of communicating the relationship through an output device comprises the step of communicating the state of operation of the actuator on an output device.

17. The method of claim 16, wherein the step of communicating the state of operation comprises the step of displaying the state of operation of the actuator as text messages using a series of grammatical rules on a display device.

18. The method of claim 2, wherein the step of generating sequences of different signal patterns by means of a programmable signal generator comprises:
    repeating specific operations of the actuator under specific fixed conditions;
    storing historical data for a plurality of variables and relational paths therebetween; and
    learning the states of operation of the valve actuator from the historical data.

19. The method of claim 1, wherein the step of determining at least one relationship between the one or more variables and the event comprises the steps of:
    providing physical deterministic models, statistical models and event frequency models associated with variables and relational paths therebetween for the actuator and surrounding environment;
    comparing metrics associated with the variables of the actuator and surrounding environment as between the deterministic models and statistical models;
    selecting variable metrics as between the deterministic and statistical models based on event frequency; and
    determining cause and effect relationships between the states of operations based on the comparisons between physical deterministic models, statistical models and event frequency models.

20. A method of analyzing, detecting and recording an occurrence of at least one event during operation of a valve actuator, the method comprising the steps of:
- receiving a plurality of input signals from a plurality of sensors that monitor operation of the actuator and/or surrounding environment;
- identifying attributes of the plurality of input signals and classifying the attributes as a potential occurrence of the at least one event;
- determining at least one relationship between the identified attributes and the at least one event, wherein the at least one relationship includes a time-related succession of intermediate states of operation associated with the valve actuator that are interconnected by transition paths, which are quantified by cause-and-effect relationships and temporal and likelihood factors; and
- verifying the at least one event is characterized as one of a deviation, malfunction or failure associated with the actuator and/or surrounding environment.

21. The method of claim 20, wherein said receiving step comprises receiving input signals from each of the plurality of sensors over at least one of an analog input channel, a discrete input channel, and a digital data channel.

22. The method of claim 20, wherein said identifying step comprises determining if a state of operation associated with an input signal exceeds a predetermined alarm value over a predetermined time.

23. The method of claim 20, wherein said determining step comprises:
- characterizing a state of operation associated with an input signal as being degraded;
- searching a current state of operation database for all other states of operation related to the state of operation associated with the input signal;
- retrieving past events associated to the related states occurring within a predetermined time to the present time;
- comparing the state of operation associated with the input signal with operational values associated with the retrieved past events; and
- determining from historical data of the retrieve past events whether the state of operation associated with the input signal is a deviation, malfunction or failure associated with the actuator.

24. The method of claim 23, wherein the step of searching a current state of operation database comprises storing a new state of operation if a previous state of operation is not identified.

25. The method of claim 20, further comprising the step of providing a textual report describing current and probable causes of the deviations, malfunctions and failures of the actuator.

26. A fault analyzing system for characterizing deviations in a specified valve actuator power supply, command signals, ambient conditions, usage conditions and actuator performance during operation of a valve actuator, the system comprising:
- a memory for storing sensor signals associated with each of the valve actuator power supply, command signals, ambient conditions, usage conditions and actuator performance;
- a processor coupled to the memory; and
- an expert system program stored in the memory and executable by the processor, the expert system program operable to:
  a. calculate a first-order discrete derivative for a measured variable Sn associated with a state of operation of the actuator;
  b. calculate a discrete derivative for the measured variable Sn by utilizing a predetermined variable scan time;
  c. detect a deviation in measured value of the variable Sn as compared to a specified value of the variable Sn;
  d. determine an actuator operating signature according to predetermined criteria;
  e. calculate a trajectory signature of the deviation as a function of time;
  f. associate messages with the trajectory signature of the deviation; and
  g. communicate the associated messages to an output device.

27. The system of claim 26, wherein the specified value of the variable Sn includes a range of values associated with the variable Sn as defined statistically and/or deterministically during operation of the actuator, said range of values associated with the variable being stored in a data structure in the memory.

28. The system of claim 27, wherein the actuator operating signature is defined by a plurality of variables Sn each having a range of predetermined values.

29. The system of claim 28, wherein the plurality of variables Sn are associated with at least one sub-model defined for the actuator, each sub-model having linked groups of variables defining different states of operation of the actuator.

30. The system of claim 29, wherein the messages associated with the trajectory signature of the deviation comprises concatenated messages describing valve actuator faults with messages describing possible causal factors and with messages received from external sources, thereby producing cause-effect descriptive phrases that follow predetermined grammatical rules.

* * * * *